(12) United States Patent
Matsumoto

(10) Patent No.: US 10,681,228 B2
(45) Date of Patent: Jun. 9, 2020

(54) DISPLAY DEVICE, CONTROL METHOD OF DISPLAY DEVICE, AND PROGRAM

(71) Applicant: Konica Minolta, Inc., Tokyo (JP)

(72) Inventor: Takuto Matsumoto, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/268,816

(22) Filed: Feb. 6, 2019

(65) Prior Publication Data

US 2019/0260886 A1    Aug. 22, 2019

(30) Foreign Application Priority Data

Feb. 19, 2018 (JP) ................... 2018-027218

(51) Int. Cl.
*H04N 1/00* (2006.01)
*G06F 3/0488* (2013.01)

(52) U.S. Cl.
CPC ..... *H04N 1/00411* (2013.01); *G06F 3/04883* (2013.01); *H04N 2201/0094* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,133,439 | B1* | 11/2018 | Brichter | G06F 3/0481 |
| 2014/0189523 | A1* | 7/2014 | Shuttleworth | G06F 3/0484 |
| | | | | 715/741 |
| 2017/0285831 | A1* | 10/2017 | Kunimoto | G06F 3/0414 |
| 2018/0300008 | A1* | 10/2018 | Rasanen | G06F 3/0416 |

FOREIGN PATENT DOCUMENTS

JP    2016-511854 A    4/2016

* cited by examiner

*Primary Examiner* — Helen Zong
(74) *Attorney, Agent, or Firm* — Osha Liang LLP

(57) ABSTRACT

A display device includes: an operation panel that displays various types of information and accepts an operation input; and a hardware processor that: displays an operation screen region on an operation panel; and detects, using a swipe-in operation detection region in a vicinity of an edge of the operation screen region among a plurality of edges of the operation screen region, a swipe-in operation from the vicinity of the edge to an inner side of the operation screen region while continuing a touching state with the operation panel.

31 Claims, 37 Drawing Sheets

FIG. 20
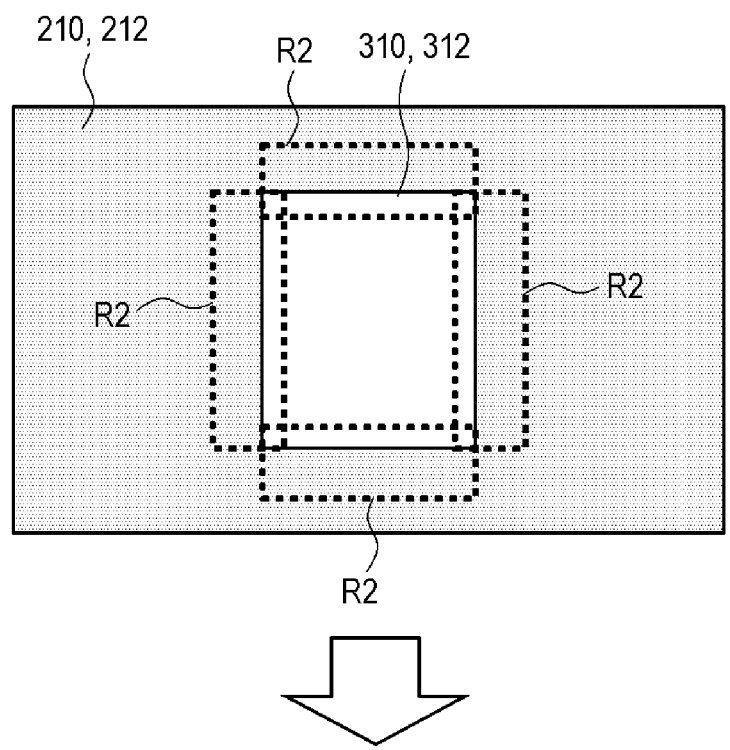
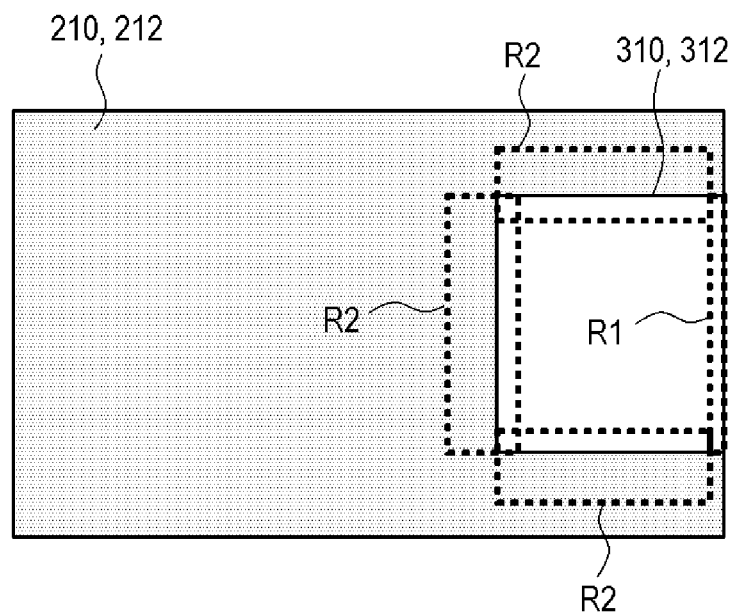

FIG. 40
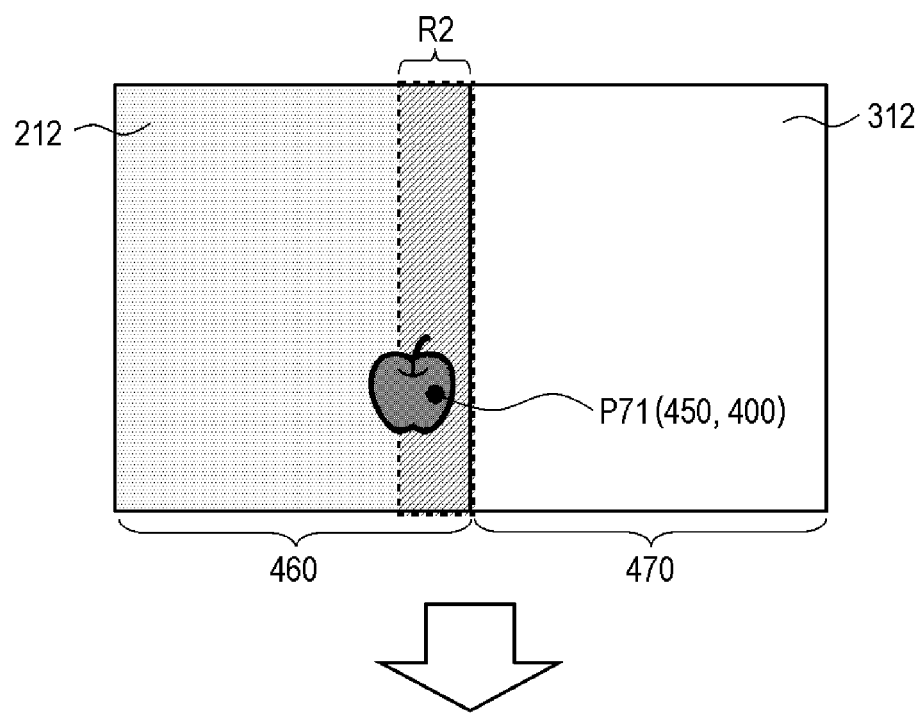
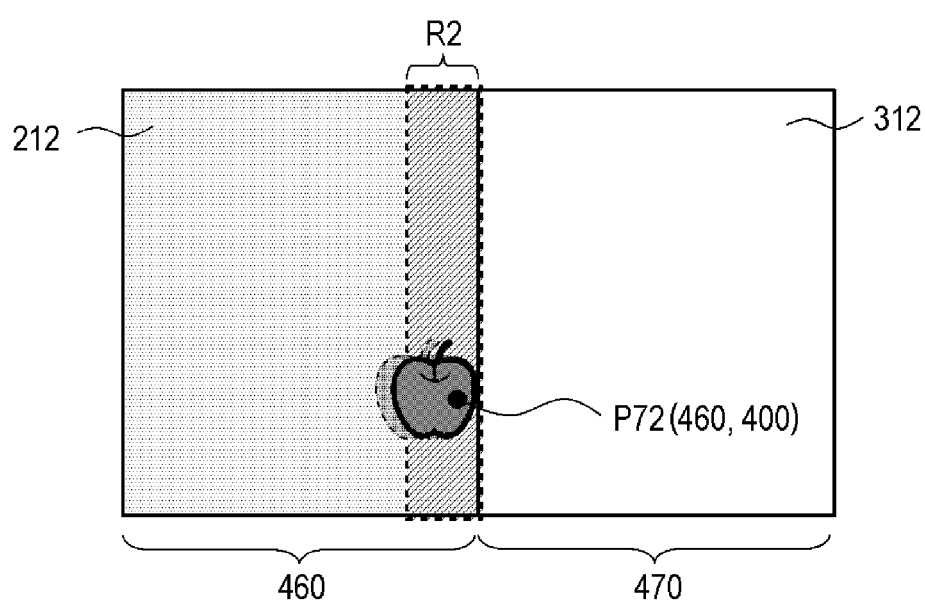

FIG. 46
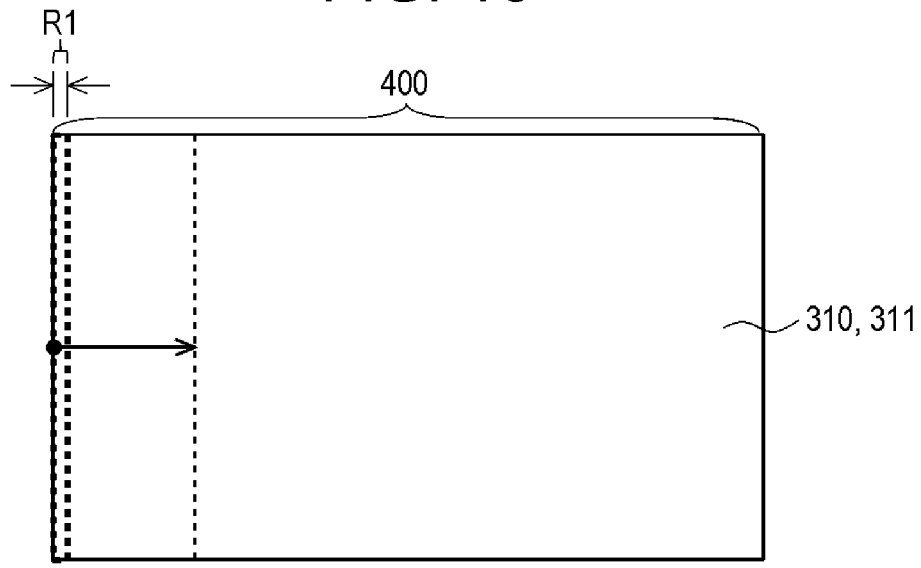
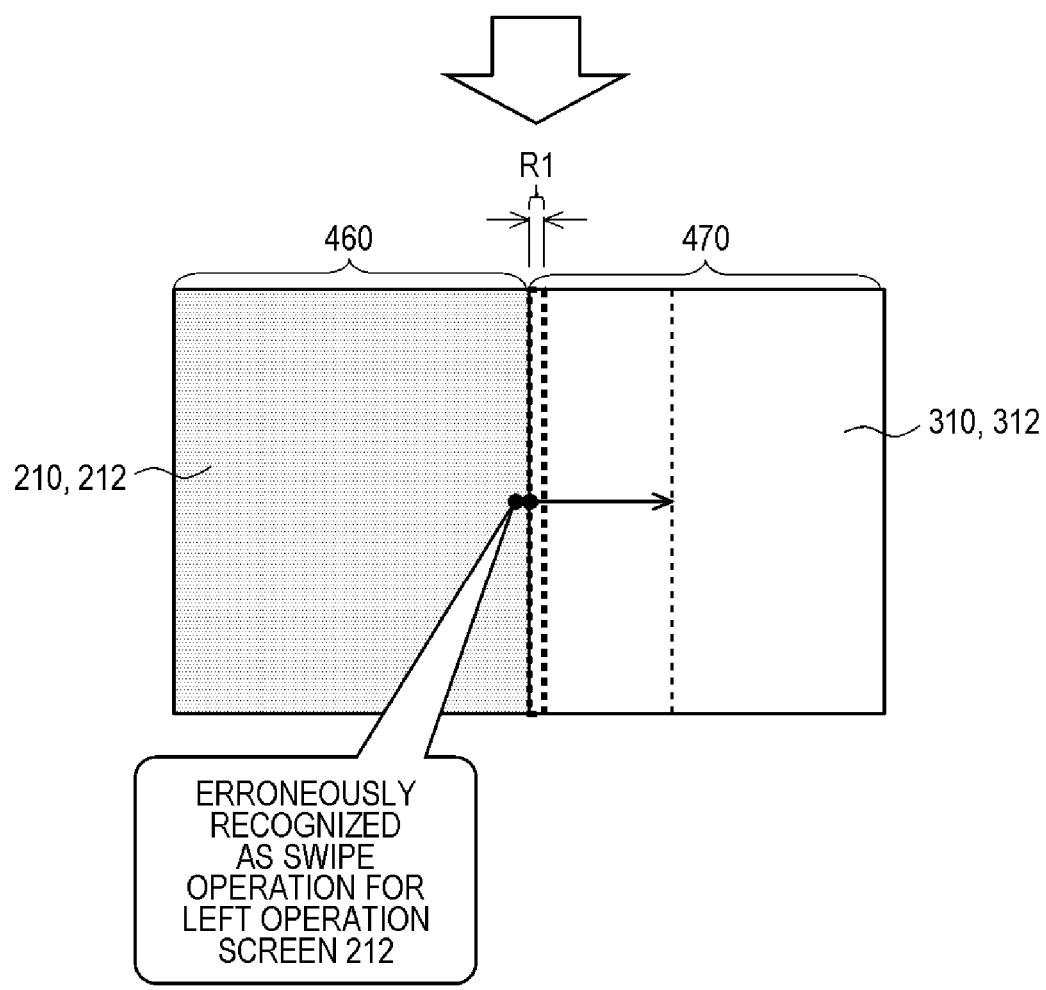

DISPLAY DEVICE, CONTROL METHOD OF DISPLAY DEVICE, AND PROGRAM

CROSS-REFERENCE TO RELATED APPLICATIONS

The entire disclosure of Japanese patent Application No. 2018-027218, filed on Feb. 19, 2018, is incorporated herein by reference in its entirety.

BACKGROUND

Technological Field

The present invention relates to a display device such as a multi-functional peripheral (MFP) and a technology relating to the same.

Description of the Related Art

In a display device including an operation panel (touch panel), it is possible to accept not only a tap operation and a swipe operation, but also an operation referred to as a "swipe-in operation" (refer to JP 2016-511854 A and the like). The "swipe-in operation" is an operation of moving an operation finger of a user from the vicinity of an edge of an operation screen region to an inner side of the operation screen region while continuing a touching state of the finger of the user with respect to the operation panel. As the "swipe-in operation", for example, in a situation where the operation screen region is displayed on an entire operation panel having a rectangular shape, an operation of moving the operation finger of the user from the vicinity of a left side of the operation panel (frame portion (bezel portion) and the like provided on the left side) to an inner side (right side) of the operation screen region while slipping on the operation panel is illustrated (refer to a left side in FIG. 45).

Note that the swipe-in operation is recognized in a distinguishing manner from the swipe operation. The "swipe operation" is the operation to move the operation finger of the user from a certain position (position other than the vicinity of the edge) in the operation screen region to another position in the operation screen region while continuing the touching state of the finger of the user with respect to the operation panel (refer to a right side in FIG. 45). The swipe-in operation is different from the swipe operation in that a start position of the operation is a position in the vicinity of the edge.

To the swipe-in operation, a response operation different from the response operation to the swipe operation might be assigned. For example, although a moving operation of an icon and the like is assigned to the swipe operation, a drawing display operation (display operation in which a swipe-in object is gradually drawn from a screen end to an inner side of the screen to be displayed) of the swipe-in operation (simple menu screen and the like) and the like is assigned to the swipe-in operation.

Incidentally, there is a case where the entire region of the operation panel is divided into two, and individual operation screen regions are displayed in the divided regions, respectively (refer to a lower part in FIG. 46). For example, there is a case where the entire region of the operation panel is divided into a left half region 460 and a right half region 470, and separate operation screens (operation screen regions) 212 and 312 are displayed in the left half region 460 and the right half region 470, respectively.

In a case where such two-screen display is performed, when the edge of the operation screen region displayed on the operation panel does not coincide with a physical edge of the operation panel, the swipe-in operation is not detected well sometimes.

For example, a situation in which the user tries the swipe-in operation not in the vicinity of the physical edge of the operation panel (in the vicinity of the frame around the operation panel) but in the vicinity of a boundary between the two operation screen regions (in the vicinity of the center in a lateral direction of the operation panel) is supposed. In detail, in a case where the user tries to perform the swipe-in operation from a left end of the right operation screen region 312 rightward for the right operation screen region 312 in the vicinity of the boundary between the two operation screen regions, there is a case where a finger of an operator first touches (not the left end side in the right operation screen region 312 but) a right end side in the left operation screen region 212. In this case, it is erroneously recognized that the user's operation is the "swipe operation" for the "left" operation screen region 212, and the original intention of the user ("swipe-in operation" for the "right" operation screen region 312) is not recognized correctly sometimes.

Note that the above-described recognition error may occur even in situations other than the two-screen display.

SUMMARY

One or more embodiments of the present invention provide a technology capable of detecting the swipe-in operation well even in a case where the edge of the operation screen region displayed on the operation panel does not coincide with the physical edge of the operation panel.

According to one or more embodiments of the present invention, a display device comprises: an operation panel capable of displaying various types of information and accepting an operation input by a finger of a user; and a hardware processor that displays an operation screen region on an entire operation panel or a part of the operation panel, and detects a swipe-in operation that is an operation of moving an operation finger of the user from a vicinity of an edge of the operation screen region to an inner side of the operation screen region while continuing a touching state with respect to the operation panel by using a swipe-in operation detection region provided in the vicinity of the edge of the operation screen region, wherein the hardware processor is capable of selectively executing, as a detecting operation of detecting the swipe-in operation: a first detecting operation of detecting the swipe-in operation on condition that an operation of moving the operation finger to a further inner side of the operation screen region is detected in a first detection region that is a partial region adjacent to the edge of the operation screen region in an inner region of the operation screen region; and a second detecting operation of detecting the swipe-in operation on condition that an operation of moving the operation finger in a direction to the inner side of the operation screen region is detected in a second detection region formed by extending and/or moving the first detection region, and the hardware processor executes the second detecting operation in which the second detection region is used as the swipe-in operation detection region regarding a specific edge which does not coincide with a physical edge of the operation panel out of a plurality of edges of the operation screen region in a case where the operation screen region is displayed on a part of the operation panel.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 20 is a view illustrating transition from a certain reduced display state to another reduced display state of one operation screen region;

FIG. 40 is a view illustrating an operation example according to one or more embodiments;

FIG. 46 is a view for illustrating erroneous recognition in the "swipe-in operation".

DETAILED DESCRIPTION

Hereinafter, embodiments of the present invention will be described with reference to the drawings. However, the scope of the invention is not limited to the disclosed embodiments.

<1-1. Configuration of MFP 10>

Figure 1:
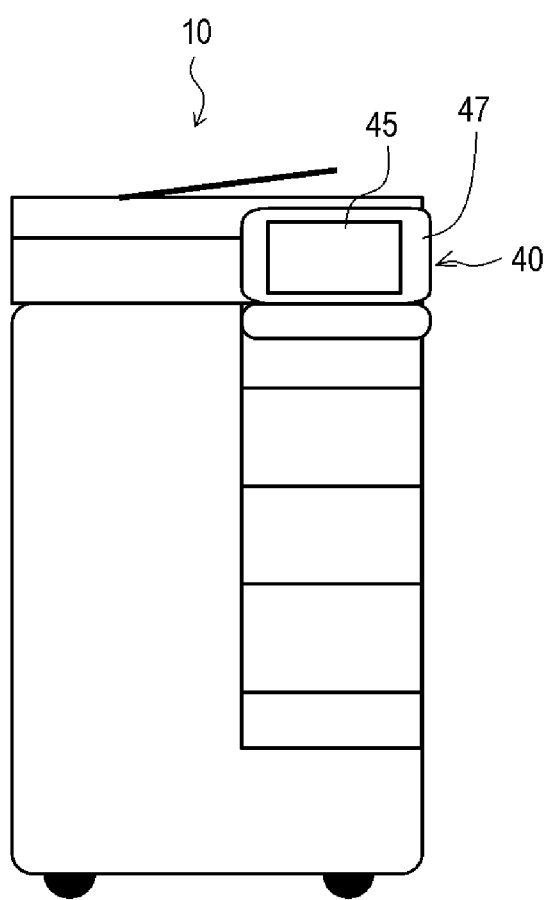
FIG. 1 is a view illustrating an appearance of a display device according to one or more embodiments.

FIG. 1 is a front view illustrating an appearance of a display device 10 according to one or more embodiments of the present invention. Herein, an MFP 10 is illustrated as a display device (also referred to as a user interface device).

Figure 2:
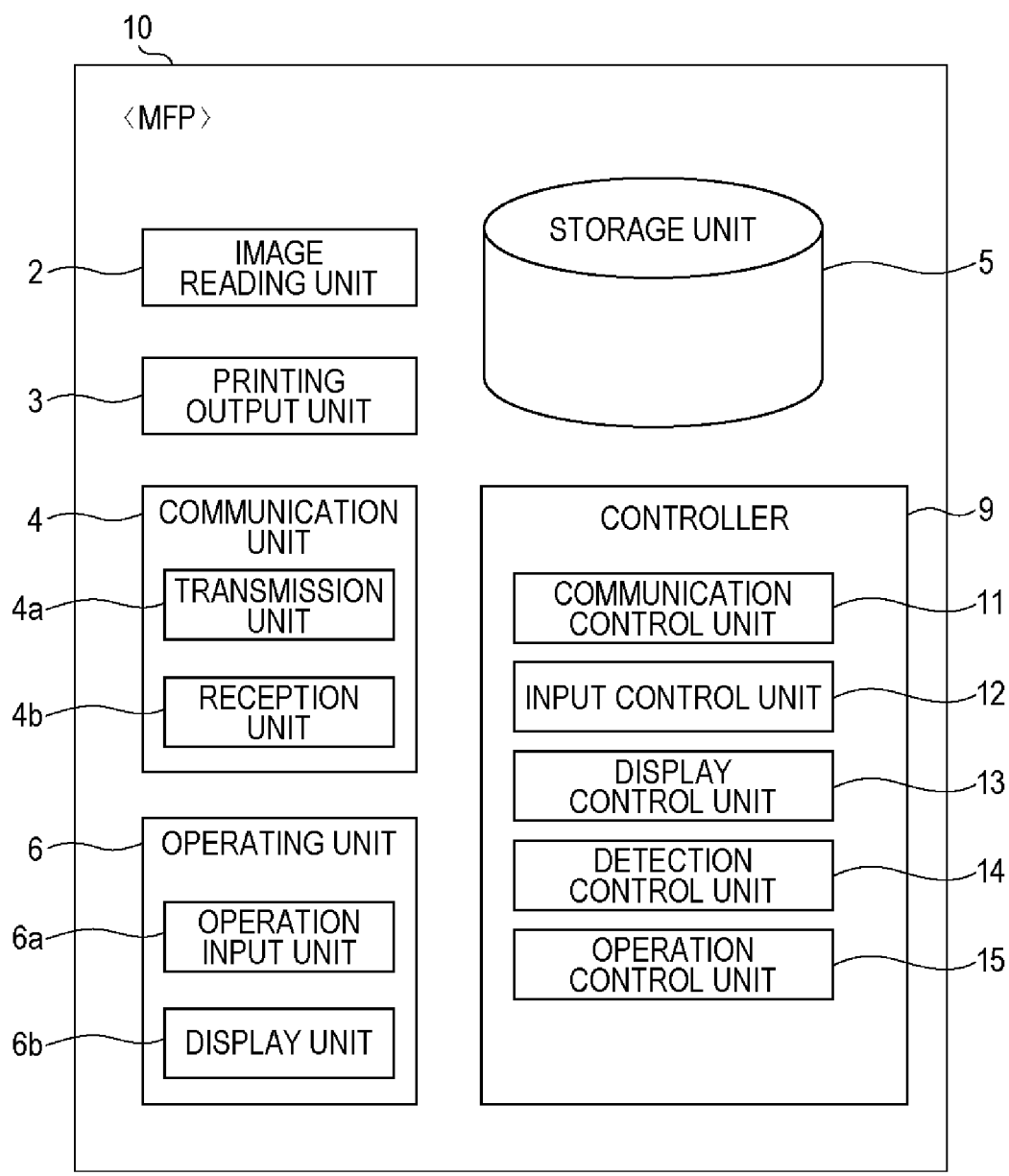
FIG. 2 is a diagram illustrating a functional block of an MFP (display device)

FIG. 2 is a diagram illustrating a functional block of the multi-functional peripheral (MFP) 10.

The MFP 10 is a device (also referred to as a complex machine) having a scan function, a copy function, a facsimile function, a box storage function and the like. Specifically, as illustrated in the functional block diagram in FIG. 2, the MFP 10 is provided with an image reading unit 2, a printing output unit 3, a communication unit 4, a storage unit 5, an operating unit 6, a controller 9 and the like, and realizes various functions by allowing the units to operate in a complex manner. Note that, the MFP 10 is also expressed as an image processing device, an image forming device or the like.

The image reading unit 2 is a processing unit which optically reads (that is, scans) a document placed at a predetermined position of the MFP 10 and generates image data of the document (also referred to as a document image or a scanned image). This image reading unit 2 is also referred to as a scanning unit.

The printing output unit 3 is an output unit which prints an image on various media such as paper on the basis of data regarding a target to be printed to output. The MFP 10 is also an electrophotographic printer (full-color printer), and the printing output unit 3 includes various hardware mechanisms such as an exposure unit, a developing unit, a transfer unit, and a fixing unit (also referred to as an image forming mechanism or a printing outputting mechanism).

The communication unit 4 is a processing unit capable of performing facsimile communication via a public line and the like. Furthermore, the communication unit 4 may perform network communication via a network. In this network communication, for example, various protocols such as transmission control protocol/Internet protocol (TCP/IP) are used. By using the network communication, the MFP 10 may exchange various data with a desired counterpart. The communication unit 4 includes a transmission unit 4a which transmits various data and a reception unit 4b which receives various data.

The storage unit 5 is formed of a storage device such as a hard disk drive (HDD).

The operating unit 6 is provided with an operation input unit 6a which accepts an operation input to the MFP 10 and a display unit 6b which displays and outputs various types of information. In this MFP 10, a substantially plate-shaped operation panel unit 40 (refer to FIG. 1) is provided, and the operation panel unit 40 includes a touch panel 45 (refer to FIG. 1) on a front surface side thereof. The touch panel (operation panel) 45 obtained by embedding a piezoelectric sensor and the like in a liquid crystal display panel may display various types of information and accept the operation input from an operator (operation input by a finger of the operator). For example, on the touch panel 45, various screens (including a button image and the like) such as a menu screen are displayed. The operator may change various setting contents of the MFP 10 by pressing a button (button represented by a button image) virtually arranged in the touch panel 45. The touch panel 45 may accept various touch operations such as a swipe-in operation, and a swipe operation. The touch panel 45 serves as a part of the operation input unit 6a and also serves as a part of the display unit 6b.

The controller (control unit) 9 is a control device built in the MFP 10 which comprehensively controls the MFP 10. The controller 9 is formed as a computer system provided with a CPU, various semiconductor memories (RAM and ROM) and the like. The controller 9 realizes various processing units by executing a predetermined software program (hereinafter, also simply referred to as a program) stored in the ROM (for example, EEPROM (registered trademark)) in the CPU. Note that the program (program module group in detail) may be recorded in a portable recording medium such as a USB memory, read out from the recording medium, and installed in the MFP 10. Alternatively, the program may be downloaded via the network and the like to be installed in the MFP 10.

Specifically, as illustrated in FIG. 2, the controller 9 realizes various processing units including a communication control unit 11, an input control unit 12, a display control unit 13, a detection control unit 14, and an operation control unit 15 by executing the program.

The communication control unit 11 is a processing unit which controls a communication operation with another device.

The input control unit 12 is a control unit which controls an operation input operation to the operation input unit 6a. For example, the input control unit 12 controls an operation of accepting the operation input to an operation screen region.

The display control unit 13 is a processing unit which controls a display operation in the display unit 6b. The display control unit 13 allows the display unit 6b to display the operation screen region and the like for operating the MFP 10.

The detection control unit 14 is a processing unit which detects various operations by the finger (operation finger) of the operator (user) in cooperation with the input control unit 12. The detection control unit 14 may detect a tap operation, the swipe operation, the swipe-in operation and the like in a distinguishing manner. The detection control unit 14 may especially detect the swipe-in operation by using a "swipe-in operation detection region" (region for detecting the swipe-in operation) provided for each edge in the vicinity of each edge of the operation screen region.

The operation control unit 15 is a control unit which controls a print output operation, a scan operation, a facsimile communication operation and the like in the MFP 10.

<1-2. Operation Outline>

Next, an outline of the operation according to one or more embodiments of the present application (detecting operation of the swipe-in operation and the like) is described.

Figure 45:
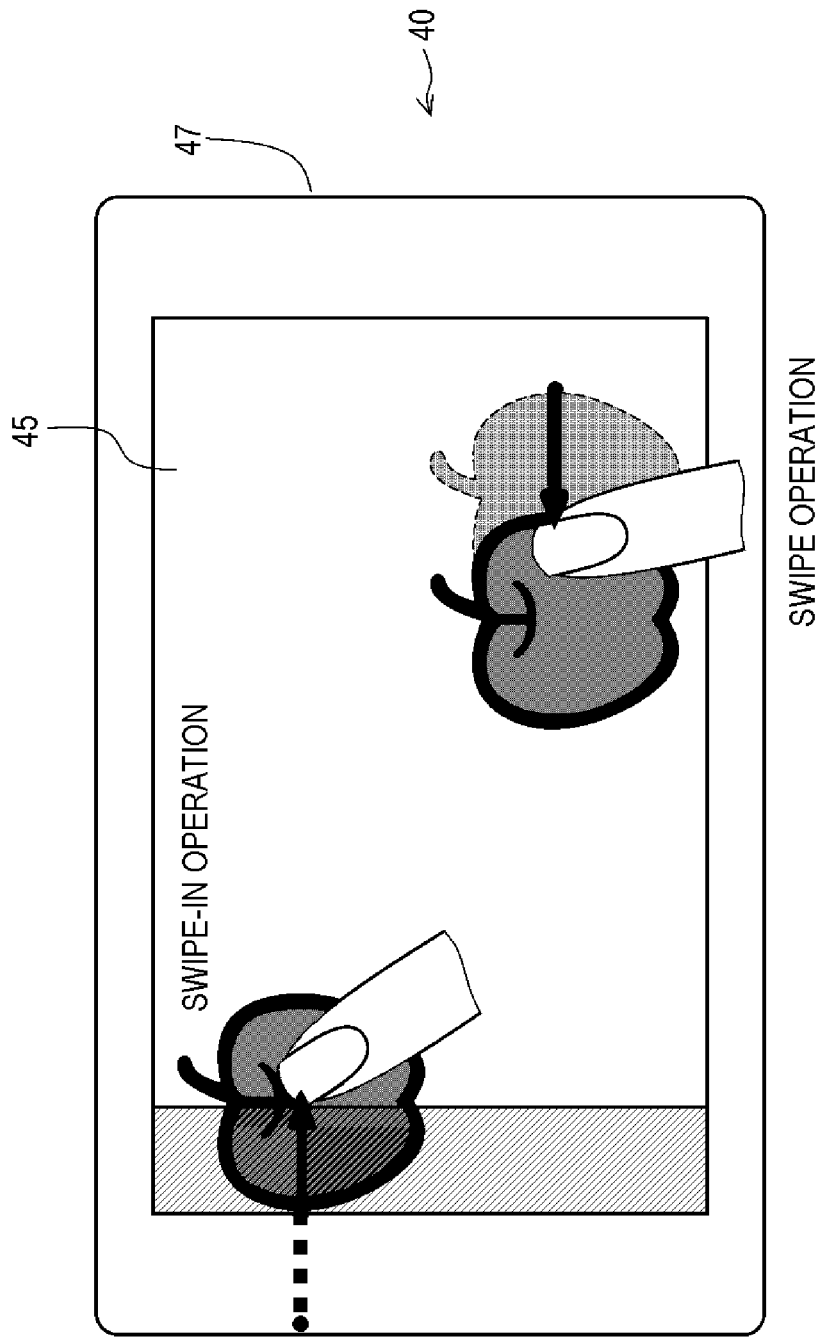
FIG. 45 is a view illustrating a "swipe-in operation" and a "swipe operation"

Herein, the "swipe-in operation" regarding the operation screen region is the operation of moving the operation finger of the user from the vicinity of the edge of the operation screen region to an inner side of the operation screen region while continuing a touching state (of the finger) with respect to the operation panel (refer to a left side in FIG. 45). The "swipe-in operation" is detected in a distinguishing manner from the "swipe operation". Note that, as described above, the swipe operation is the operation to move the operation finger of the user from a certain position (position other than the vicinity of the edge) in the operation screen region to another position in the operation screen region while continuing the touching state of the finger of the user with respect to the operation panel (refer to a right side in FIG. 45). The swipe-in operation is different from the swipe operation in that a start position of the operation is a position in the vicinity of the edge. The swipe-in operation is also different from the swipe operation in that the movement of the finger might be in a direction not to the inner side of the operation screen region (for example, to an outer side on the contrary or in a direction parallel to the edge (upward, downward and the like) in the swipe operation. Furthermore, a display changing operation (for example, a drawing display operation of a swipe-in object 320) executed according to the swipe-in operation is also different from the display changing operation (for example, icon moving display operation) executed according to the swipe operation.

Figure 3:
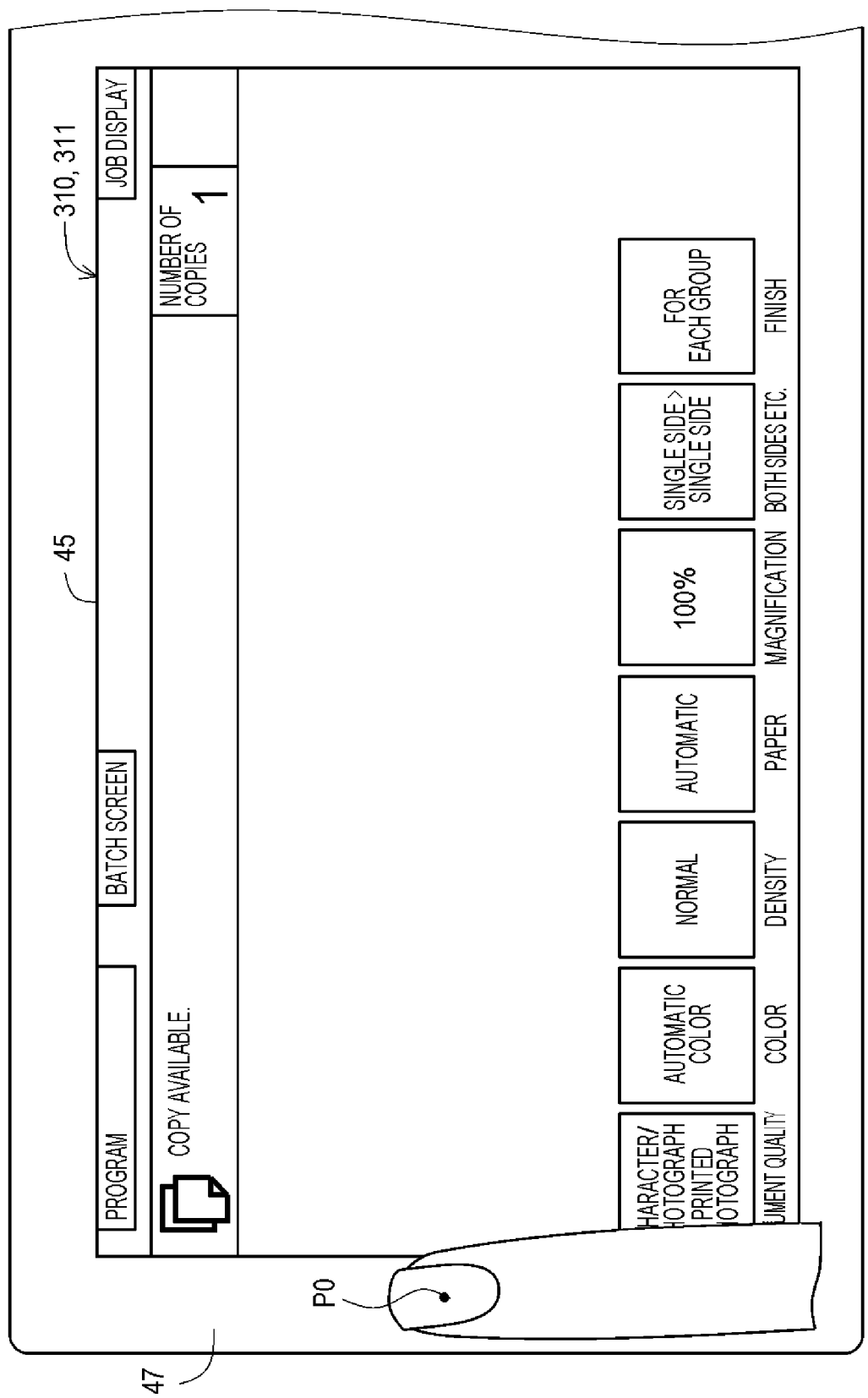
FIG. 3 is a view illustrating a state in which a swipe-in operation is started.
Figure 4:
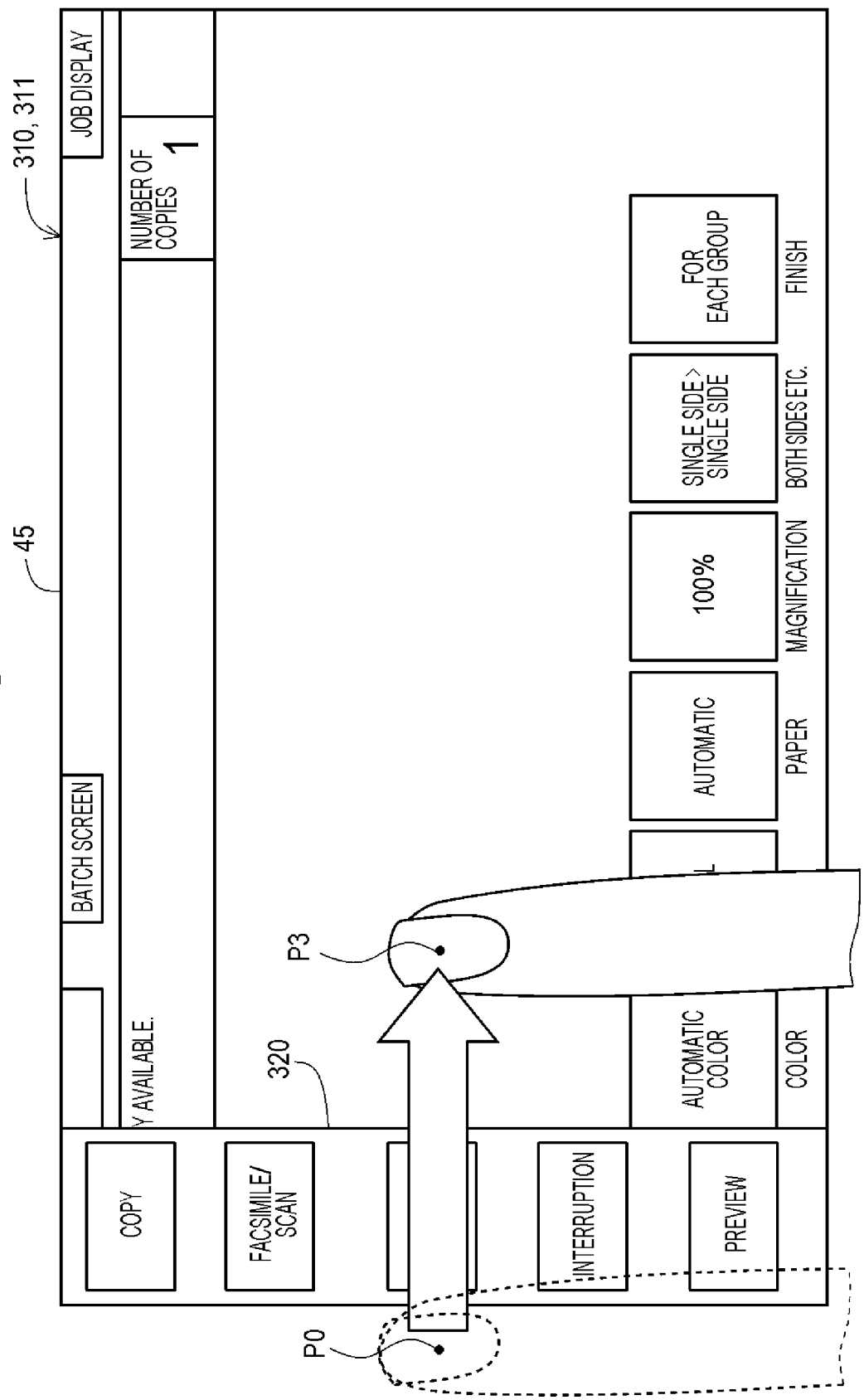
FIG. 4 is a view illustrating a completion state of the swipe-in operation.

FIGS. 3 and 4 are views illustrating an example of the swipe-in operation. FIG. 3 is a view illustrating a state in which the "swipe-in operation" is started from a position (position on a frame 47 provided around the touch panel 45) P0 to the left of a left end edge of the touch panel 45 in a state in which an operation screen region 310 (copy menu screen) of the MFP 10 is displayed on an entire touch panel 45 of the operation panel unit 40. Also, FIG. 4 is a view illustrating a state after the operation finger of the user is moved from the vicinity of the edge of the operation screen region 310 to a position P3 on an inner side of the operation screen region 310 while continuing the touching state of the finger of the user with respect to the touch panel 45 (state in which the swipe-in operation is completed).

In one or more embodiments, two detecting operations (two types of detecting operations) of a first detecting operation and a second detecting operation are selectively executed as the detecting operation of detecting the swipe-in operation. The first detecting operation is similar to the conventional detecting operation (detecting operation based on a detection region similar to the conventional one (also referred to as a first detection region R1)). On the other hand, the second detecting operation is the detecting operation based on a new type of detection region (also referred to as a second detection region R2) (to be described later). In other words, the first detection region R1 and the second detection region R2 are selectively used as the detection region ("swipe-in operation detection region") for detecting the swipe-in operation.

Figure 5:
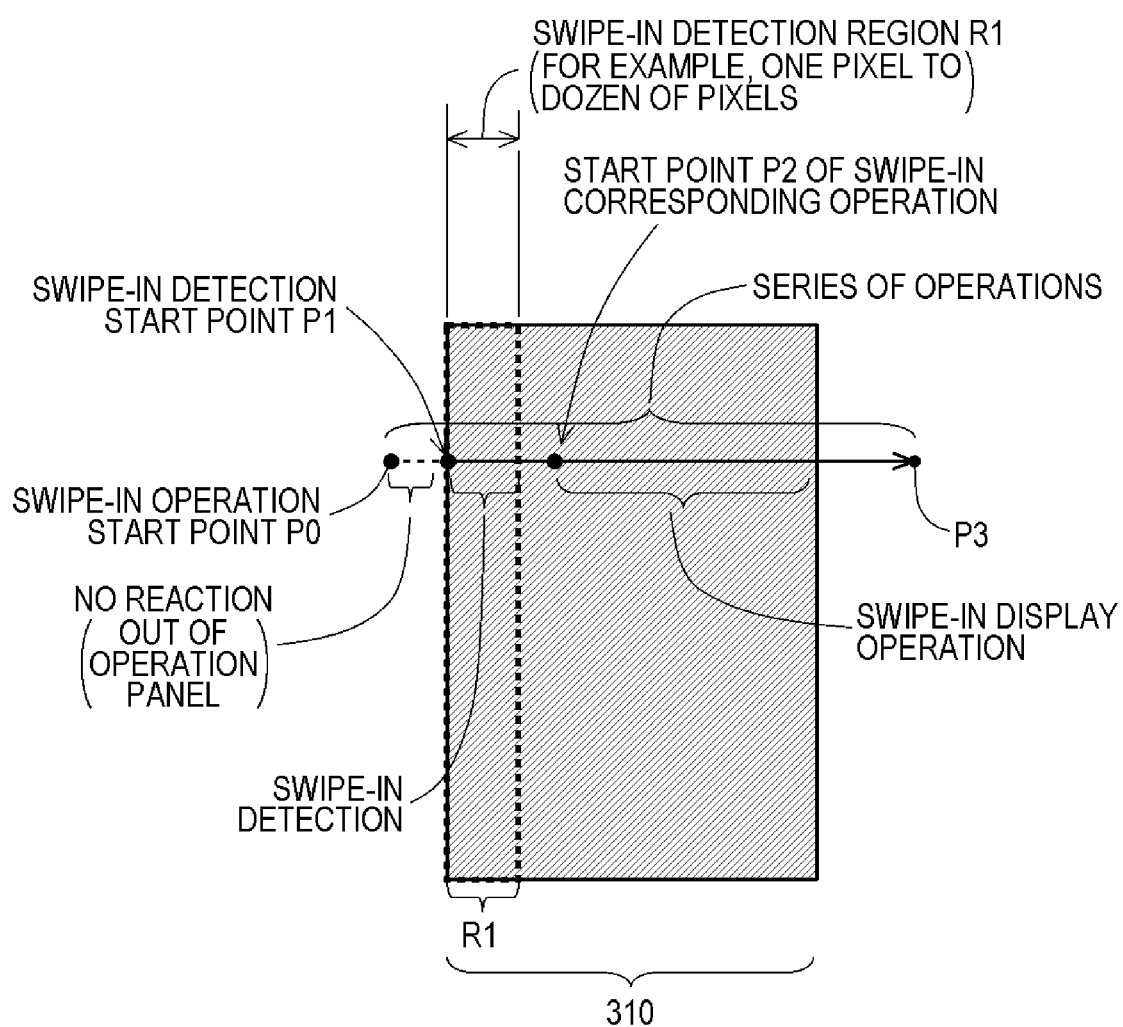
FIG. 5 is a view illustrating a first detecting operation based on a first detection region.

FIG. 5 is a view illustrating the first detecting operation based on the first detection region R1. The first detection region R1 is a partial region having a minute width (for example, one pixel width to dozen of pixel width) adjacent to the edge of the operation screen region (left end edge of a print setting screen 310 (311) in FIG. 3) out of an inner region of the operation screen region (for example, 310). As illustrated in FIG. 5, in the first detecting operation, the swipe-in operation is detected on condition that the operation of moving the operation finger from a position in the first detection region R1 (position P1 adjacent to the edge and the like) to a further inner side (rightward in FIG. 5) of the operation screen region in the first detection region R1.

In detail, the touch panel 45 does not react in a section in which the operation finger of the user reaches the first detection region R1 from the position P0 (operation start point) on the frame 47 (touch operation by the operation finger is not detected). When the operation finger reaches a left end position P1 of the first detection region R1 (in detail, a left end thereof), the swipe-in detecting operation is started. For example, the swipe-in operation is detected when a moving operation inward (herein, rightward) is detected over a predetermined number of pixels (for example, 10 pixels). Thereafter, when the operation finger reaches a predetermined position P2 on a further right side, the display changing operation (also referred to as a swipe-in corresponding operation) according to the swipe-in operation is started. As the swipe-in corresponding operation, the drawing display operation of the swipe-in object 320 (herein, a simple menu screen (refer to FIG. 4)) (display operation in which the swipe-in object is gradually drawn from a screen end (toward the screen center) to be displayed is illustrated. Note that, the position P2 is also represented as a position (corresponding operation start position) at which the display changing operation according to the swipe-in operation should be started.

Figure 10:
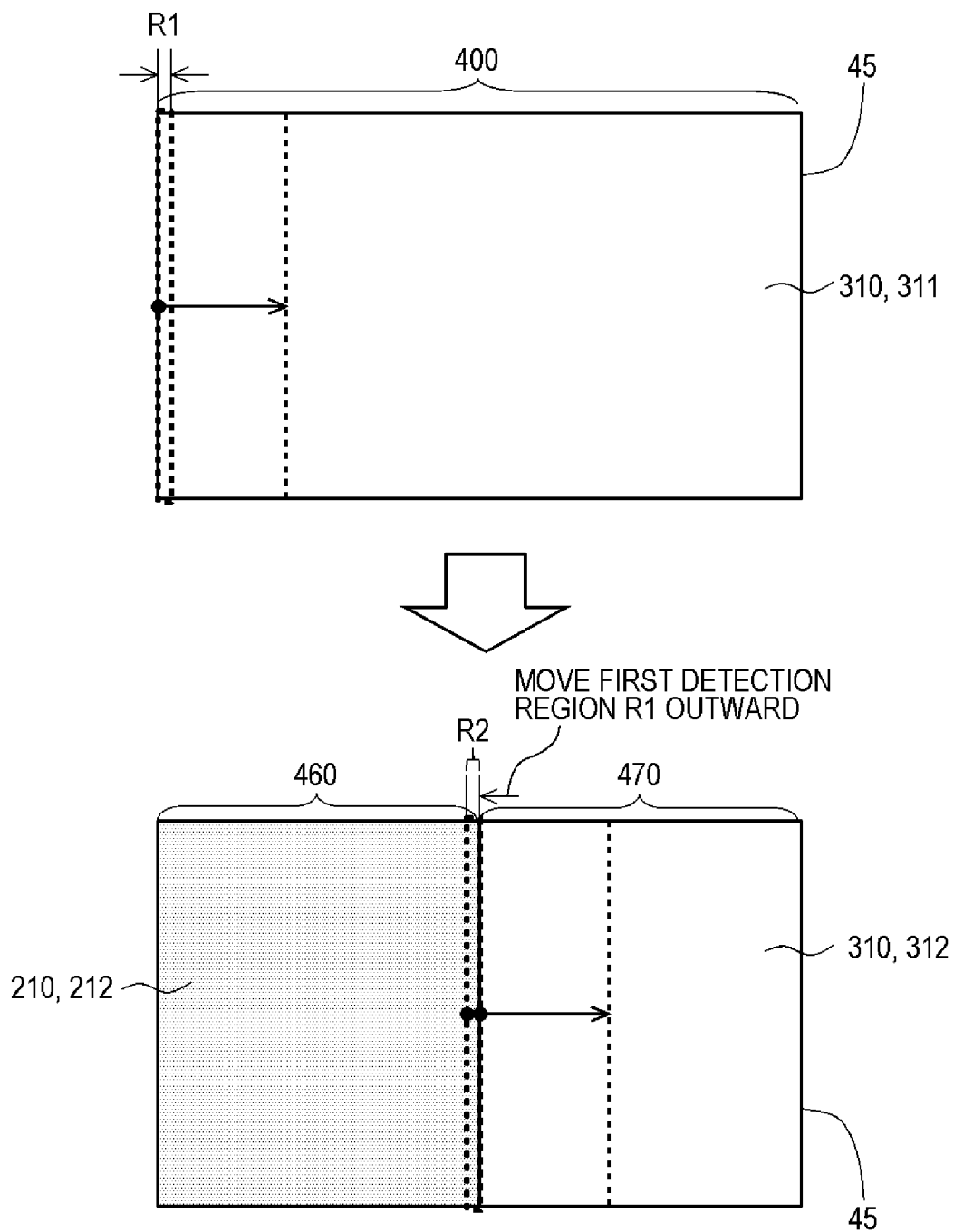
FIG. 10 is a view illustrating a state in which the second detection region is set in the operation screen region after transition in a case of the transition from a state in which the operation screen region is displayed on an entire touch panel to a state in which this is displayed on a part of the touch panel.

In an upper part in FIG. 10, a situation in which the swipe-in detecting operation (first detecting operation using the first detection region R1) as illustrated in FIGS. 3 to 5 is performed is illustrated. As illustrated in the upper part in FIG. 10, in a case where the operation screen region 311 is displayed on the entire touch panel 45, the first detecting operation (detecting operation using the first detection region R1 as the swipe-in operation detection region) is executed regarding all the edges.

On the other hand, in a lower part in FIG. 10, a state in which an entire region 400 of the touch panel 45 (operation panel) is divided into two in a lateral direction, and separate operation screen regions are displayed in respective divided regions is illustrated. In detail, the entire region 400 of the touch panel 45 is divided into a left half region 460 and a right half region 470, and separate operation screens (operation screen regions) 212 and 312 are displayed in the left half region 460 and the right half region 470, respectively. In other words, in the lower part of FIG. 10, the operation screen region 312 is displayed on a part in the touch panel 45.

Herein, in a case of detecting the swipe-in operation using the first detection region R1 after transition from the state in the upper part in FIG. 10 to the state in the lower part in FIG. 10, the above-described recognition error arises (refer to FIG. 46). Specifically, when the edge of the operation screen region displayed on the operation panel does not coincide with a physical edge of the operation panel, the swipe-in operation is not detected well sometimes.

Figure 6:
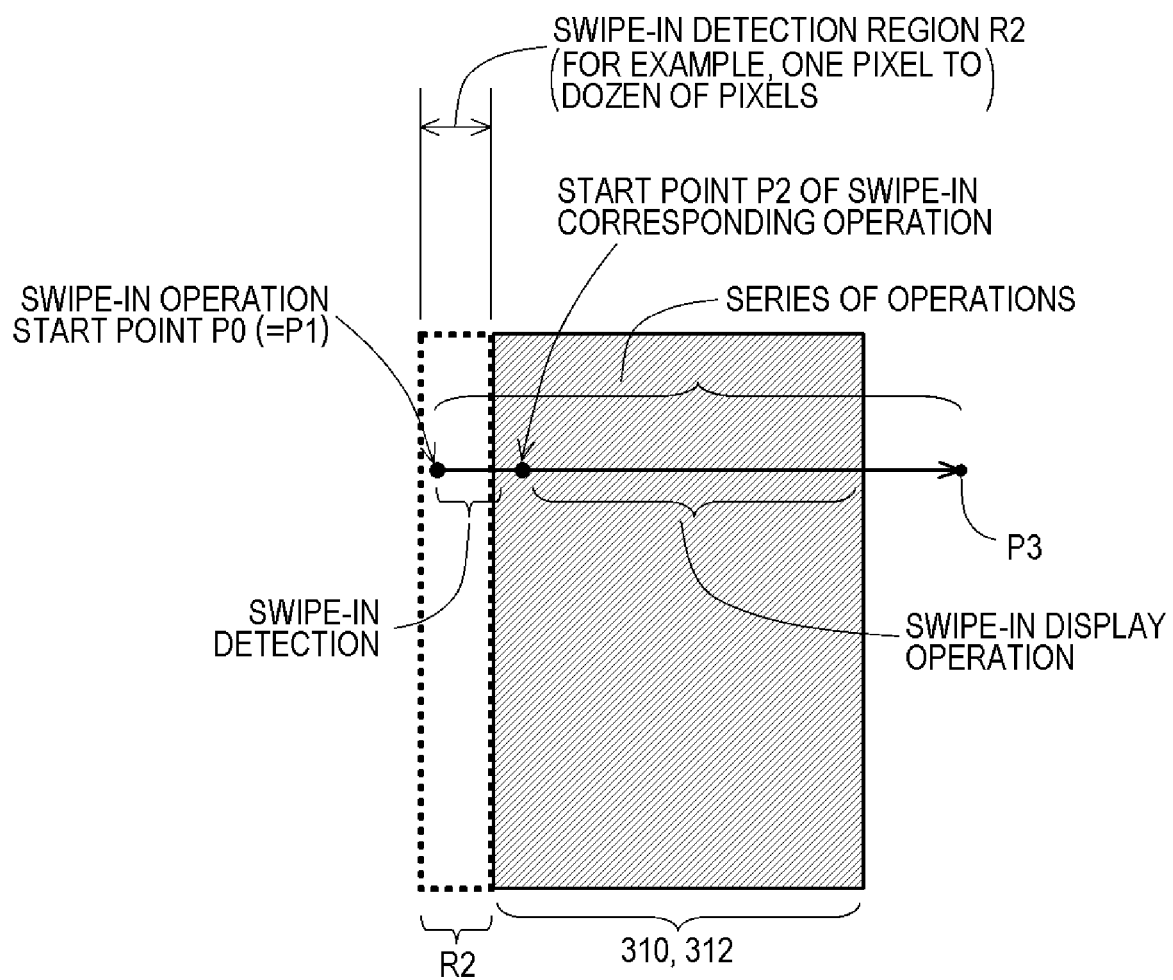
FIG. 6 is a view illustrating a second detecting operation based on a second detection region.

Therefore, in one or more embodiments, as illustrated in the lower part in FIG. 10 and FIG. 6, the second detecting operation using the second detection region R2 is executed as for a specific edge which does not coincide with the physical edge of the touch panel 45 among a plurality of edges of the operation screen region 312 (for example, a left side of the operation screen region 312). Note that FIG. 6 is a view illustrating the second detecting operation based on the second detection region R2. As is the case with the first detection region R1, the second detection region R2 is also provided in the vicinity of the edge of the operation screen region.

In the lower part in FIG. 10 and FIG. 6, a region obtained by moving an original detection region (first detection region R1) to an outer side of the operation screen region 310 (312) (left side in FIG. 6) is set as the second detection region R2. In detail, the region obtained by moving the original first detection region R1 to a side opposite to a left side boundary of the operation screen region 310 (312) (to the left by the same distance as the width of the first detection region R1) is set as the second detection region R2. As is understood when comparing the lower part in FIG. 10 and FIG. 6 with the lower part in FIG. 46 and FIG. 5, the first detection region R1 is present within the operation screen region 310, whereas the second detection region R2 is present out of the operation screen region 312 (portion adjacent to the left side of the operation screen region 312). Note that the invention is not limited to this, and a region (a region across the left side of the operation screen region 312) obtained by moving the first detection region R1 leftward by a distance approximately half the width of the first detection region R1 may be set as the second detection region R2.

In the lower part in FIG. 10 and in FIG. 6, for example, the operator starts the swipe-in operation from a portion slightly to the left of the left side of the operation screen region 312 with an intention that the user performs the swipe-in operation from a left end of the right operation screen region 312 rightward for the right operation screen region 312 in the vicinity of a boundary between the two operation screen regions 212 and 312.

In a case where the start point P0 (FIG. 6) of this swipe-in operation is present within the second detection region R2 and a moving operation (touch operation) continues over a distance of a predetermined number of pixels (for example, several pixels) further rightward, it is detected that the swipe-in operation is performed (that is, the swipe-in operation is detected). In detail, the detecting operation of the swipe-in operation is started from the operation start point P0 (which is also the detection start point P1). For example, the swipe-in operation is detected when a moving operation inward (herein, rightward) is detected over a predetermined number of pixels (for example, 10 pixels).

In this manner, in the second detecting operation, the swipe-in operation is detected on the condition that the operation of moving the operation finger to the inner side of the operation screen region 312 (rightward in FIG. 6) from the position within the second detection region R2 is detected in the second detection region R2. According to this, even in a case where the finger of the operator first touches a right end portion in the left operation screen region 212 (not the left end portion in the right operation screen region 312), the original intention of the user ("swipe-in operation" for the "right" operation screen region 312) is correctly recognized.

Note that, when the operation finger reaches a predetermined position P2 to the further right thereafter, the display changing operation (also referred to as a swipe-in corresponding operation) according to the swipe-in operation is started.

Figure 14:
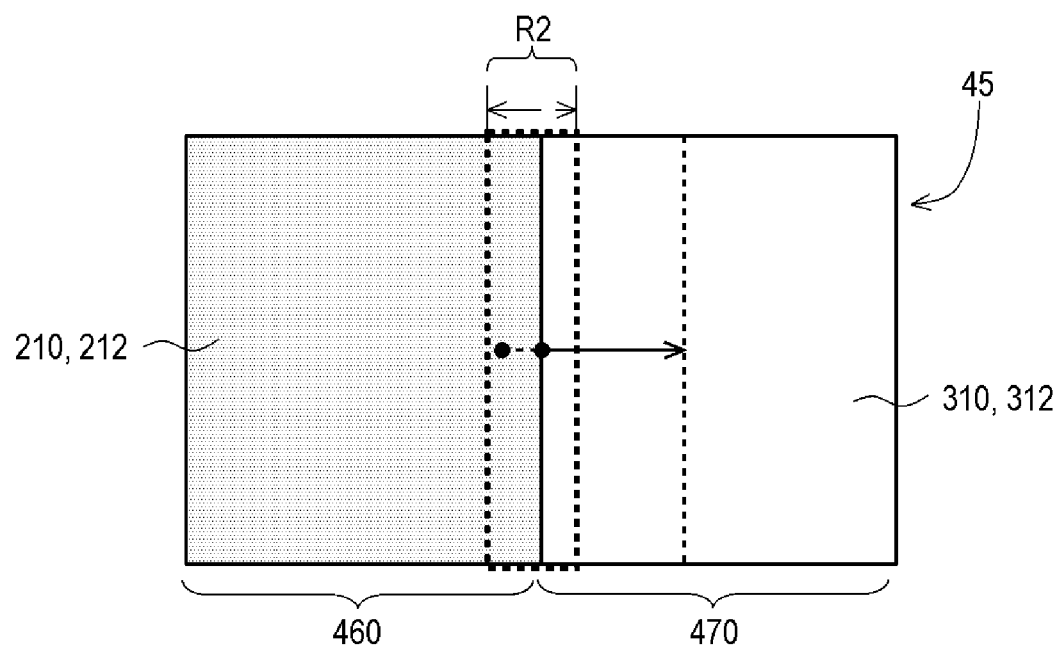
FIG. 14 is a view illustrating the second detection region formed by extending the first detection region both inward and outward.
Figure 18:
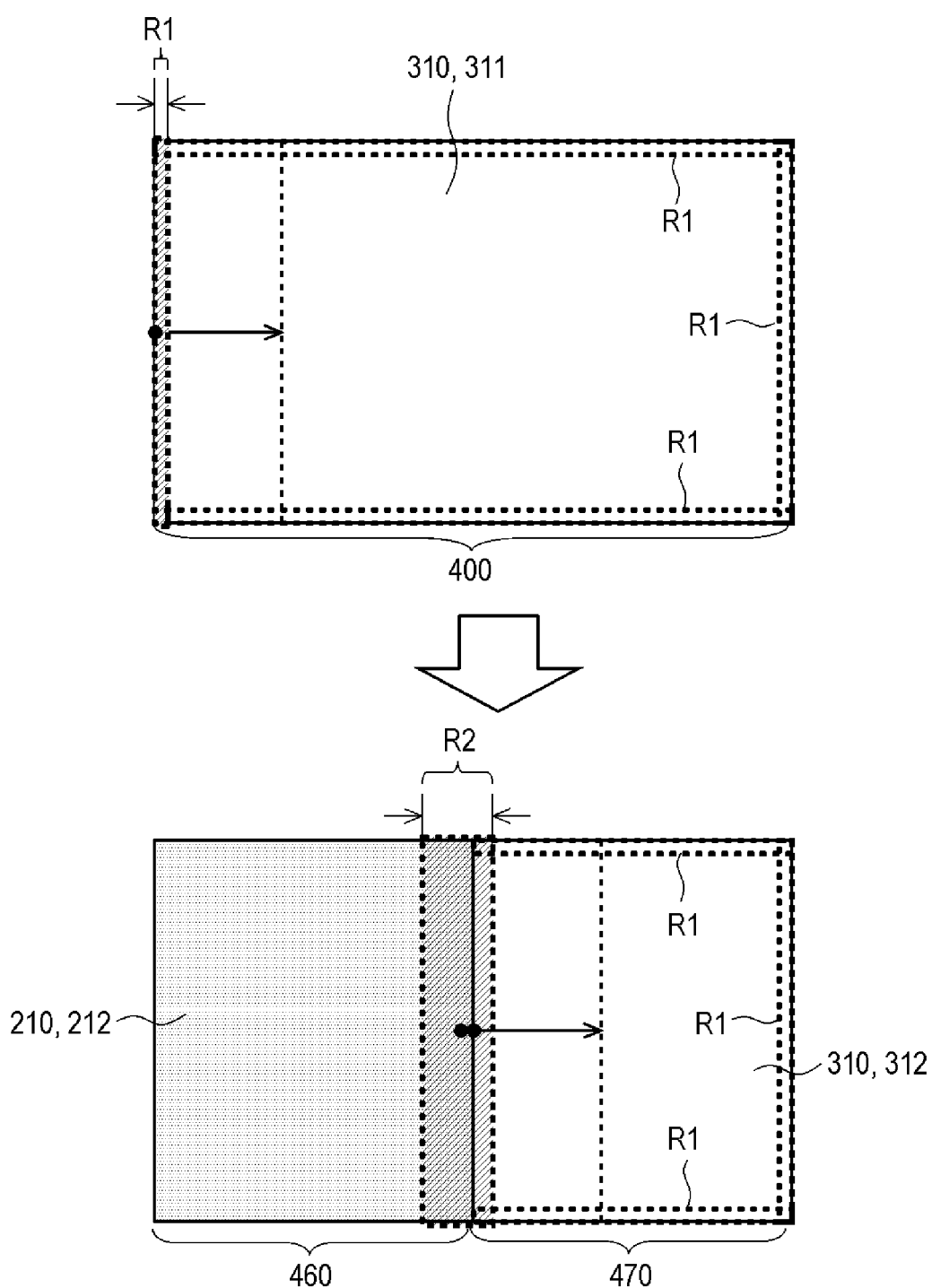
FIG. 18 is a view illustrating each swipe-in operation detection region (first detection region or second detection region) regarding four sides of the operation screen region after the screen transition.

Also, in a case of transition from the state in the upper part in FIG. 10 to the state in the lower part in FIG. 10, the second detection region R2 may be set only for the left side among the four sides (left side, right side, upper side, and lower side) of the operation screen region 312 having a rectangular shape as for the right operation screen region 312, and the first detection region R1 may be set for other three sides (right side, upper side, and lower side) (refer also to FIG. 18 (especially, the lower part)). That is, the second detection region R2 may be set only for the side (left side) on which the edge of the operation screen region 310 displayed on the operation panel does not coincide with the physical edge of the touch panel 45. For the sides (right side, upper side, and lower side) on which the edge of the operation screen region 310 displayed on the operation panel coincides with the physical edge of the touch panel 45, the original first detection region R1 may be set. Note that, in FIG. 18, the second detection region R2 of a mode (to be described later) in FIG. 14 is illustrated.

Herein, in a case where the operation screen region 310 (312) is displayed on a part of the touch panel 45 (operation panel), the second detecting operation (swipe-in operation detecting operation using the second detection region R2 as the swipe-in operation detection region) is executed regarding only a specific edge (herein, edge of left side) which does not coincide with the physical edge of the touch panel 45 out of a plurality of edges of the operation screen region 312. Regarding the edges (herein, the right side, the upper side, and the lower side) coincident with the physical edge of the touch panel 45 among a plurality of edges of the operation screen region 312, the first detecting operation (detecting operation using the first detection region R1 as the swipe-in operation detection region) is executed.

Although the swipe-in operation for each side of the right operation screen region 312 is mainly described herein, the same applies to the swipe-in operation for each side of the left operation screen region 212. Specifically, the second detection region R2 is set only for the edge (right side) not coincident with the physical edge of the touch panel 45 among a plurality of edges of the operation screen region 212 displayed on the operation panel. For the edges (left side, upper side, and lower side) coincident with the physical edge of the touch panel 45, the original first detection region R1 is set.

<1-3. Various Modes of Second Detection Region R2>

In FIGS. 6 and 10, the region obtained by moving the original detection region (first detection region R1) to the outer side of the operation screen region 310 (312) (left side in FIG. 6) without extending the original detection region is set as the second detection region R2. However, the second detection region R2 is not limited to this.

Figure 11:
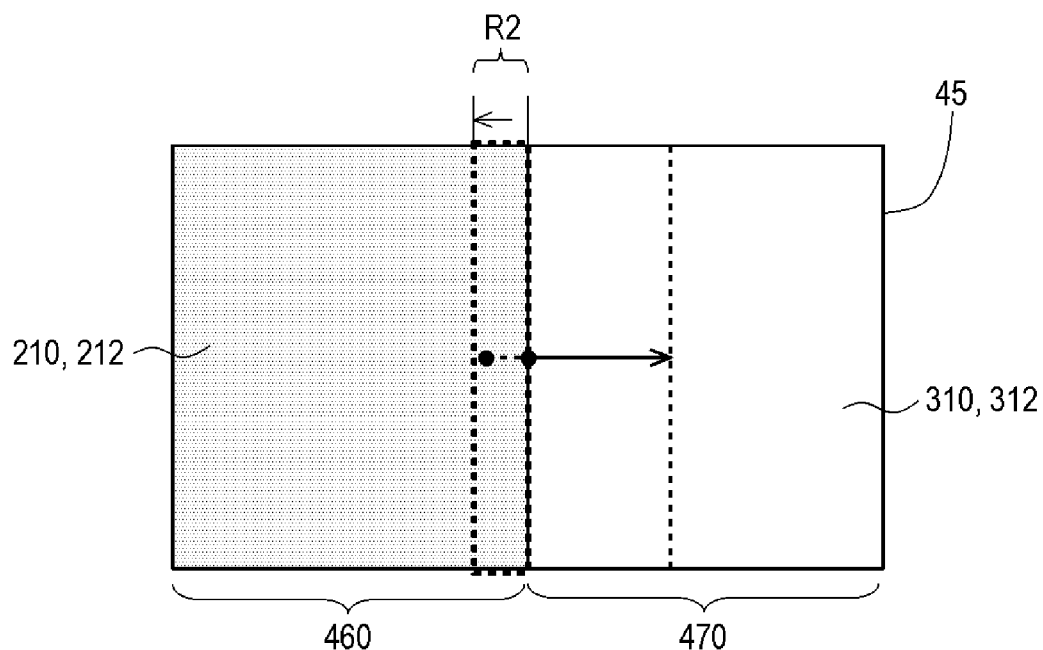
FIG. 11 is a view illustrating the second detection region formed by moving and extending the first detection region outward.
Figure 12:
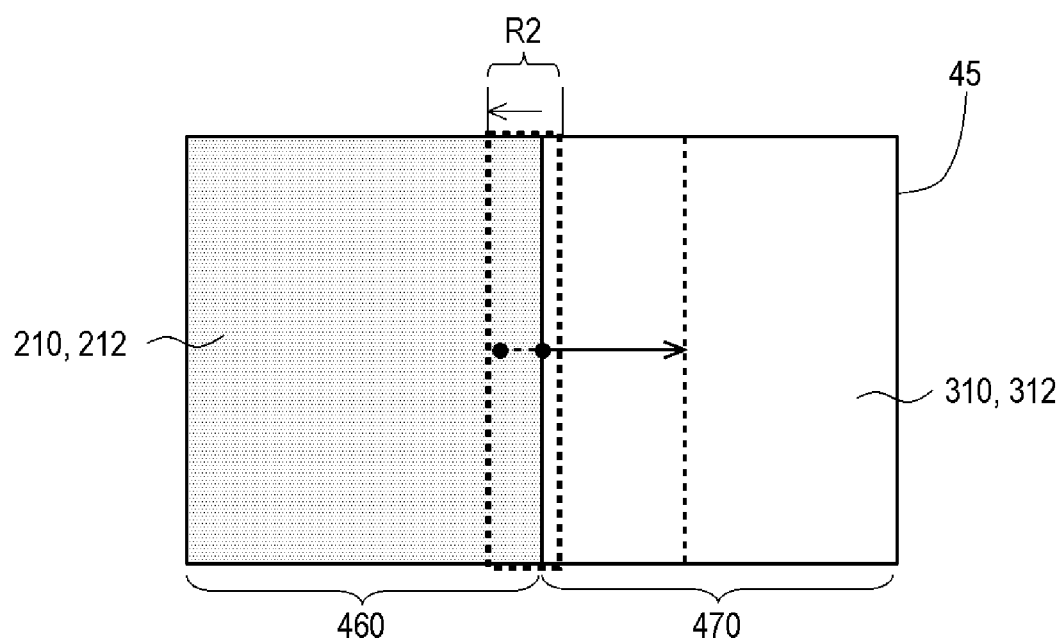
FIG. 12 is a view illustrating the second detection region formed by extending the first detection region outward.

For example, as illustrated in FIG. 11, the second detection region R2 may be a region obtained by extending the first detection region R1 to the outer side (left side and the like) of the operation screen region (312 and the like). In FIG. 11, a region obtained by moving the first detection region R1 to a position adjacent to the left side of the operation screen region 312 (outer side of the operation screen region 312) (as in FIG. 10), and then further extending the same to the outer side (left side) of the operation screen region 312 (for example, a rectangular region having a width of several tens of pixels) is formed as the second detection region R2. Note that, the invention is not limited to this, and it is also possible that a region obtained by extending the first detection region R1 to the outer side (left side) of the operation screen region 312 without moving the first detection region R1 is formed as the second detection region R2 as illustrated in FIG. 12. By using the second detection region R2 extended as compared with the first detection region R1, it is possible to detect the swipe-in operation better.

Figure 13:
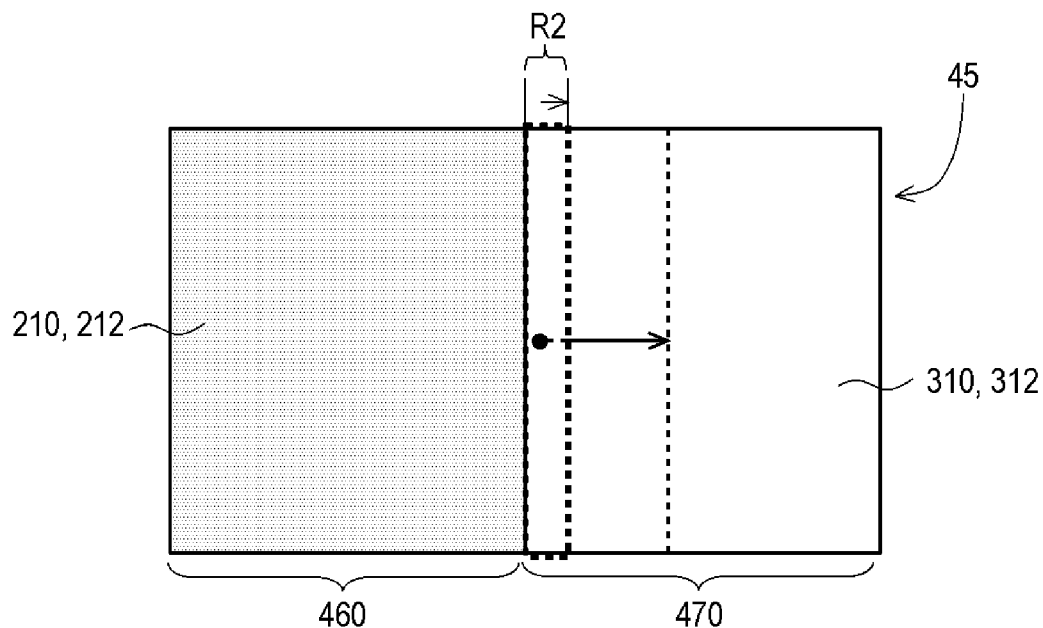
FIG. 13 is a view illustrating the second detection region formed by extending the first detection region inward.

Alternatively, the second detection region R2 may also be a region obtained by extending the first detection region R1 to the inner side (right side and the like) of the operation screen region (312 and the like) (for example, a rectangular region having a width of several tens of pixels) as illustrated in FIG. 13. According to this, it is possible to detect the swipe-in operation better than in the technology of using the first detection region R1 as it is.

Alternatively, the second detection region R2 may also be a region obtained by extending the first detection region R1 to both the inner side and the outer side (to the right and left) of the operation screen region (312 and the like) as illustrated in FIG. 14. According to this, the swipe-in operation may be detected in an excellent manner.

Figure 15:
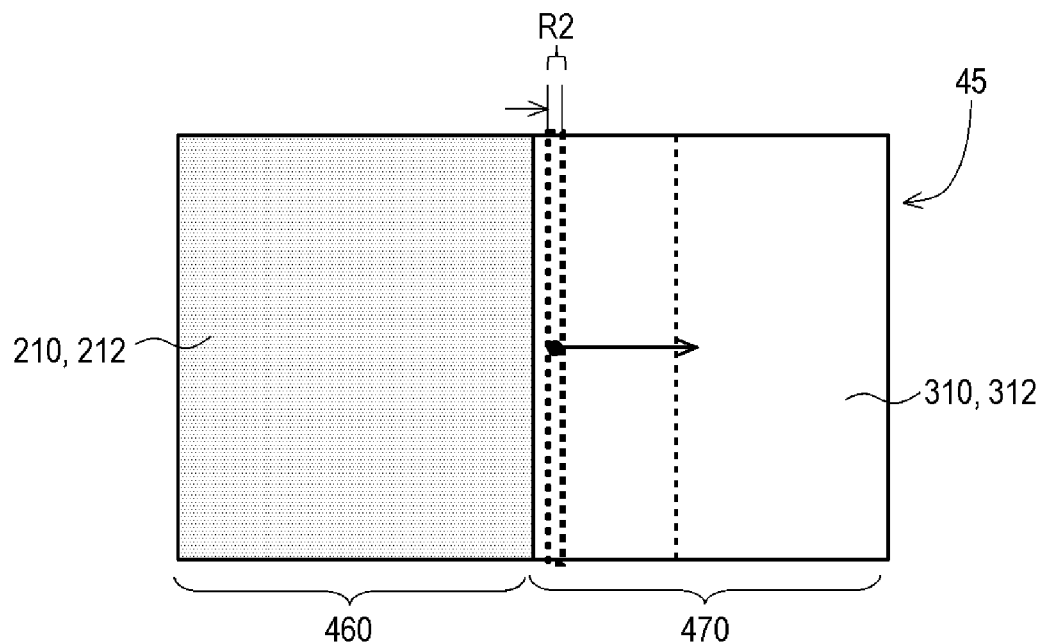
FIG. 15 is a view illustrating the second detection region formed by moving the first detection region inward.

Alternatively, the second detection region R2 may also be a region obtained by moving the first detection region R1 to the inner side of the operation screen region (312 and the like) (for example, by several pixels) as illustrated in FIG. 15. Note that, in this case, although there is a case in which the swipe-in operation for the position of the original first detection region R1 is not detected, the swipe-in operation for the region on the inner side of the original first detection region R1 may be detected well. Especially, it is easier as the operation of the user to start the swipe-in operation from a position away from the edge slightly inward (by approximately several pixels to dozen of pixels) rather than starting the swipe-in operation from the portion adjacent to the edge (portion closest to the edge). Therefore, it is possible to detect the swipe-in operation better than in the technology of using the first detection region R1 as it is.

In addition, when forming the second detection region R2 by extending the first detection region R1, it is not necessary to extend the first detection region R1 over an entire range of the edge extending in a predetermined direction (for example, a longitudinal direction). The second detection region R2 may also be an extended region (partially extended region) obtained by extending the first detection region R1 only in a partial range of the entire range of the edge extending in a predetermined direction (that is, partially). For example, as illustrated in FIG. 16, in a case where the first detection region R1 is extended only to the inner side (refer to FIG. 13), the second detection region R2 may be formed by extending the same laterally (direction perpendicular to the predetermined direction) only in a partial range B1 of the entire range in the longitudinal direction.

Figure 16:
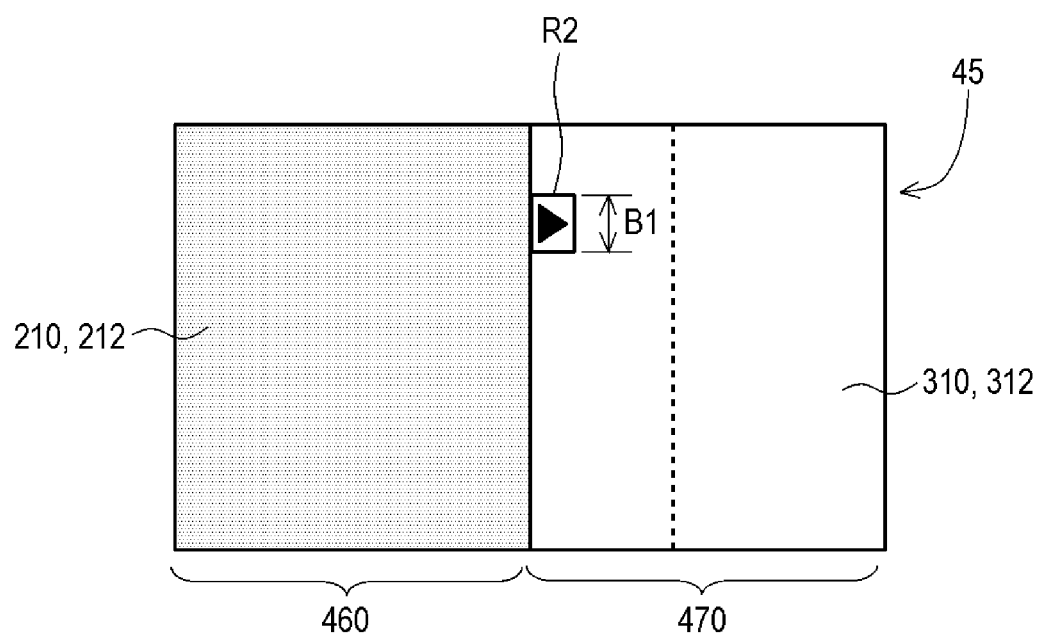
FIG. 16 is a view illustrating the second detection region formed by extending only a partial range of the first detection region inward.

Note that, in FIG. 16, the partial extension is performed only to the inner side; however, there is no limitation and the partial extension may be performed only to the outer side, or both the outer side and the inner side.

Figure 21:
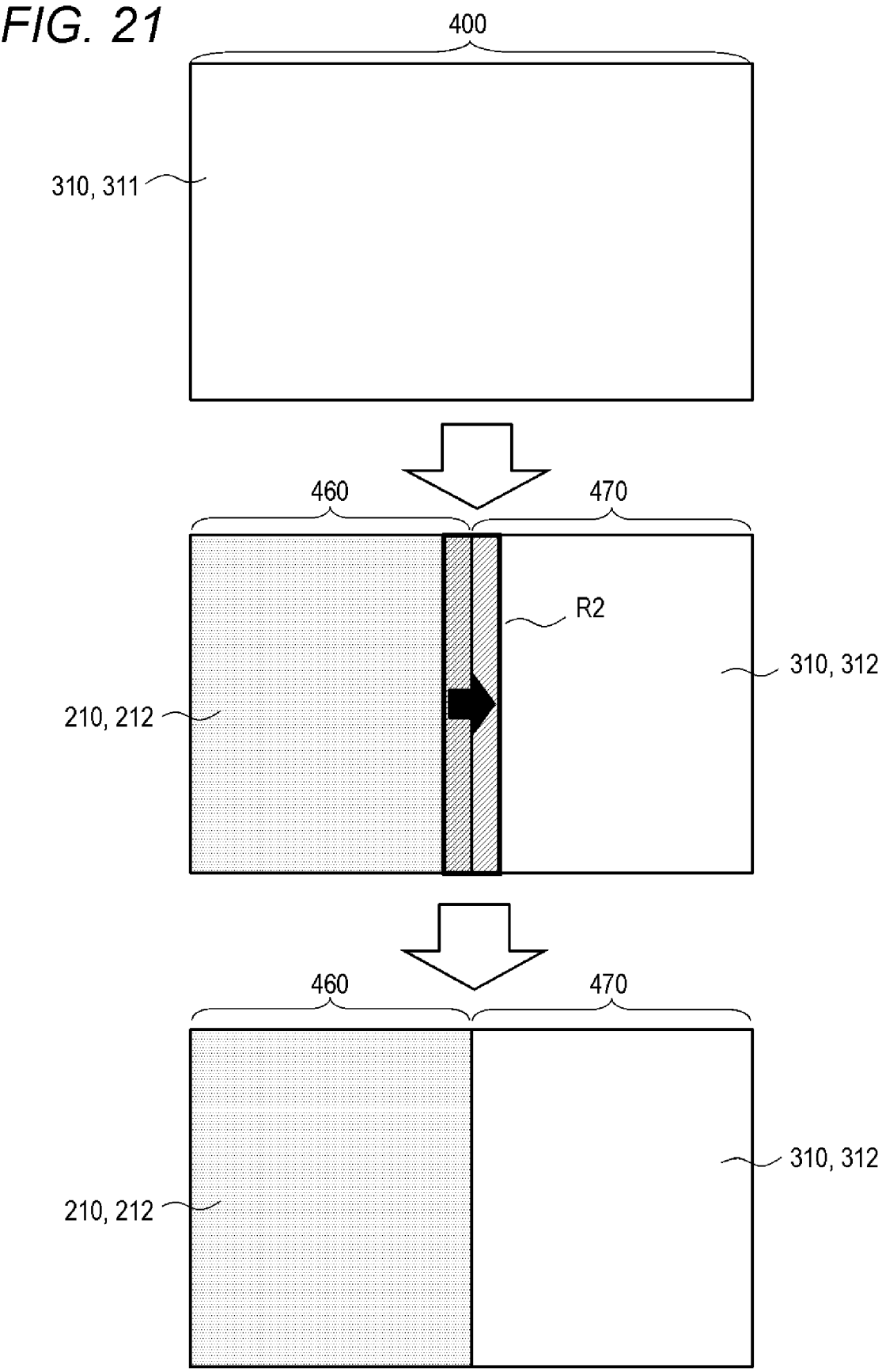
FIG. 21 is a view illustrating transition from a visualized state to a non-visualized state of the second detection region.

The second detection region R2 may also be provided in a state displayed (visualized) on the touch panel 45 (refer to a middle part in FIG. 21 (to be described later)), or in a non-display state (non-visualized state).

Figure 17:
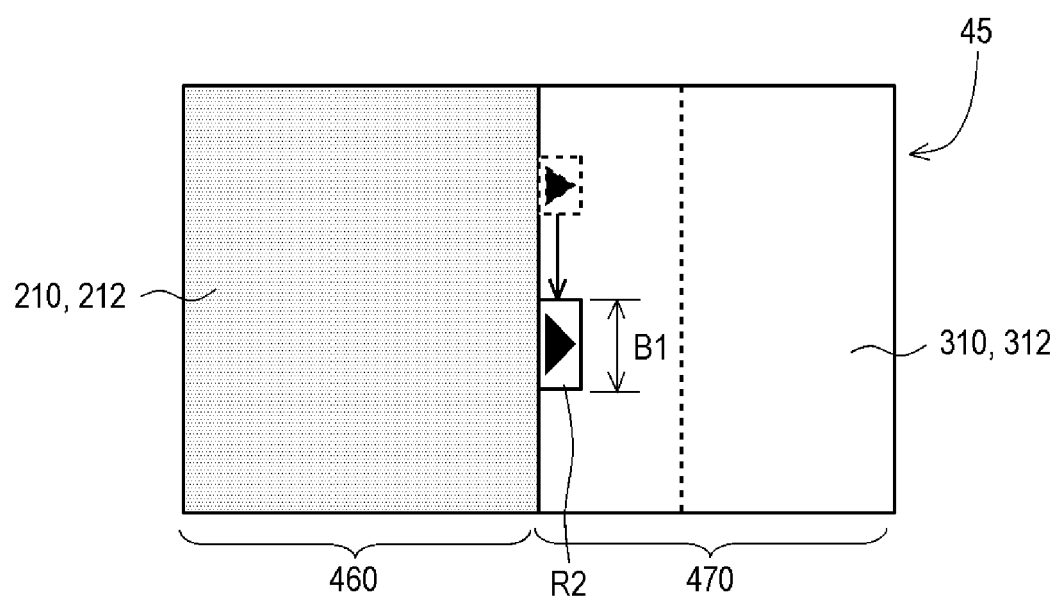
FIG. 17 is a view illustrating a state in which the partial range in FIG. 16 might be changed.

In addition, a position and/or a size (length) of the partial range B1 regarding the partially extended region R2 (FIG. 16) may be changed according to a setting changing operation by the user (refer to FIG. 17). Specifically, the position and/or the size of the partial range B1 may be set in a separately displayed setting screen (not illustrated). The position and/or the size may be specified by a ratio to the whole and the like. Alternatively, in a case where the second detection region R2 is visualized (refer to FIG. 16) and the like, the position and/or the size of the partial range B1 (that is, the second detection region R2) may be changed according to a specific operation. For example, the user may perform a moving operation and a region extending operation on the second detection region R2 by using a right finger while pressing a specific key provided on the operation panel unit 40 by a left finger, thereby changing the position and/or the size of the partial range B1. Alternatively, after the user performs a long tap operation on the second detection region R2 to perform transition to a changing mode of the second detection region R2, the user may perform the moving operation and the region extending operation on the second detection region R2, thereby changing the position and/or the size of the partial range B1.

<1-4. Setting Timing of Second Detection Region R2>

In the description above, the mode in which the second detection region R2 and the like is set in a case of transition from the entire display state of the single operation screen (operation screen region) 311 to the divided display state of the two operation screen regions 212 and 312 (refer to FIGS. 10, 18 and the like) is illustrated; however, there is no limitation.

Figure 19:
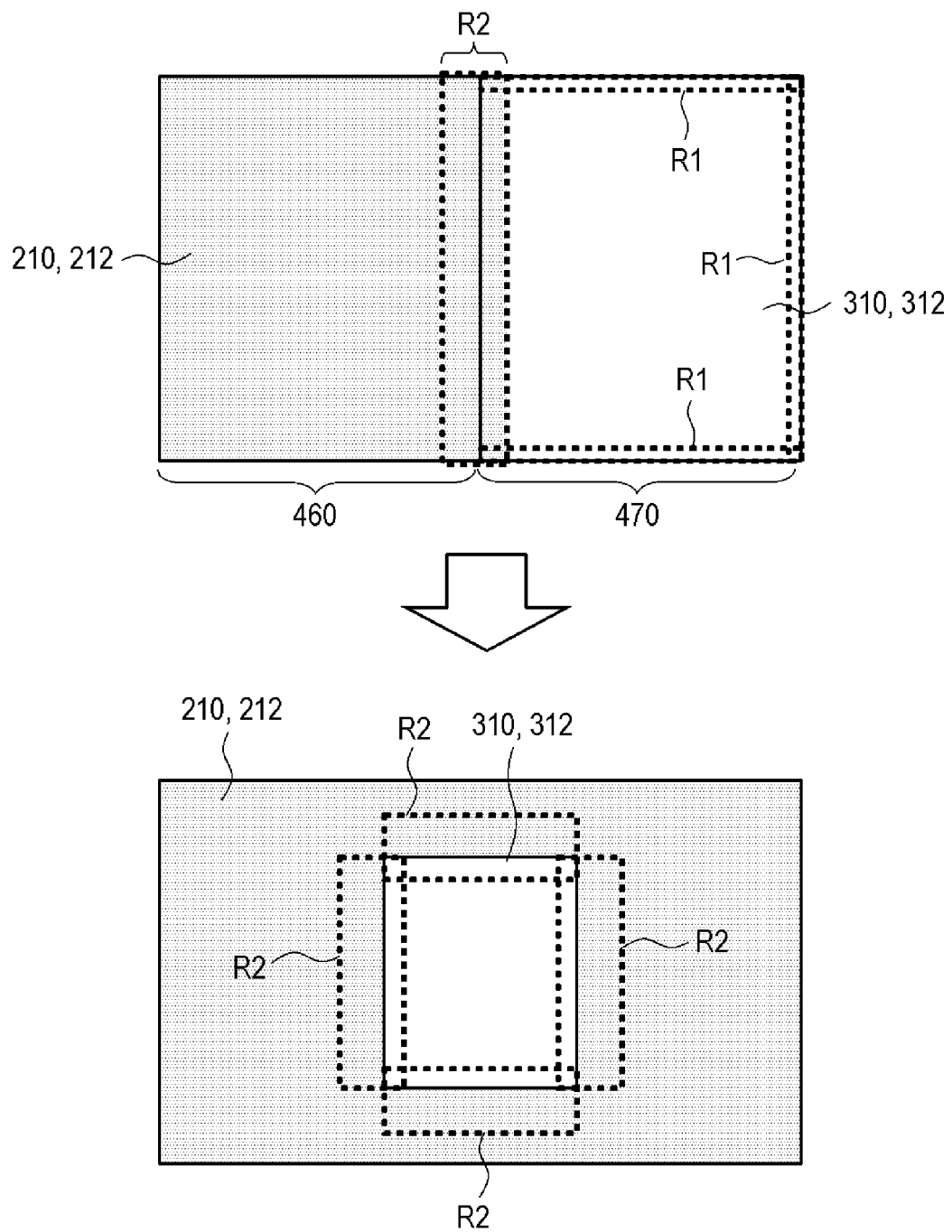
FIG. 19 is a view illustrating transition from a divided display state of the two operation screen regions to a reduced display state of one operation screen region.

For example, the second detection region R2 and the like may be set in a case of transition from the divided display state of the two operation screen regions 212 and 312 (upper part in FIG. 19) to a reduced display state of one operation screen region 312 (lower part in FIG. 19) as illustrated in FIG. 19. As illustrated in FIG. 19, when none of the four sides (edges) coincides with the physical edge of the touch panel 45, the second detection region R2 and the like may be set for any of the four sides (edges).

Alternatively, the second detection region R2 and the like may be set in a case of transition from the reduced display state of one operation screen region 312 (upper part in FIG. 20) to another reduced display state of the one operation screen region 312 (lower part in FIG. 20) as illustrated in FIG. 20. However, in the lower part in FIG. 20, three sides other than the right side among the four sides (edges) do not coincide with the physical edge of the touch panel 45, and only the right side coincides with the physical edge of the touch panel 45. Therefore, the first detection region R1 may be set for the right side and the second detection region R2 may be set for the other three sides.

Note that, in FIG. 19 and FIG. 20, as in FIG. 18, the second detection region R2 of the mode in FIG. 14 is illustrated.

Also, as described above, the second detection region R2 may be provided in a state displayed (visualized) on the touch panel 45, or in a non-display state (non-visualized state).

In a case where the second detection region R2 is visualized, the second detection region R2 may be always displayed, but it is not limited thereto. For example, the second detection region R2 may be visualized on the touch panel 45 in response to detection of occurrence of a specific edge which does not coincide with the physical edge of the operation panel out of a plurality of edges of the operation screen region in accordance with change in position and/or size of the operation screen region (312 and the like) on the touch panel 45. In more detail, for example, the second detection region R2 may be visualized only in a predetermined period from a time point when the change from the first detection region R1 to the second detection region R2 (extension and/or movement of the first detection region R1) occurs (refer to FIG. 21). In FIG. 21, the second detection region R2 is visualized immediately after the transition from the entire display state of the single operation screen region 311 (uppermost part in FIG. 21) to the divided display state of the two operation screen regions 212 and 312 (middle part in FIG. 21). Then, after the visualized state continues for a predetermined period (for example, five seconds), the second detection region R2 is made invisible (lowermost part in FIG. 21). In this manner, the second detection region R2 may be visualized only in a predetermined period. Note that, in the visualized state, the second detection region R2 may be distinguished from other regions by a predetermined color (for example, red) and/or hatching of the second detection region R2 (refer to middle part in FIG. 21). An arrow (refer to black arrow in the middle part in FIG. 21) indicating the direction of the swipe-in operation which might be detected in the second detection region R2 may also be displayed in the second detection region R2.

Note that a process of visualizing the second detection region R2 (visualizing process) may be executed immediately after step S44 (FIG. 8) to be described later, for example.

<1-5. Detailed Operation (Until Process of Setting Swipe-in Operation Detection Region (S3))>

Figure 7:
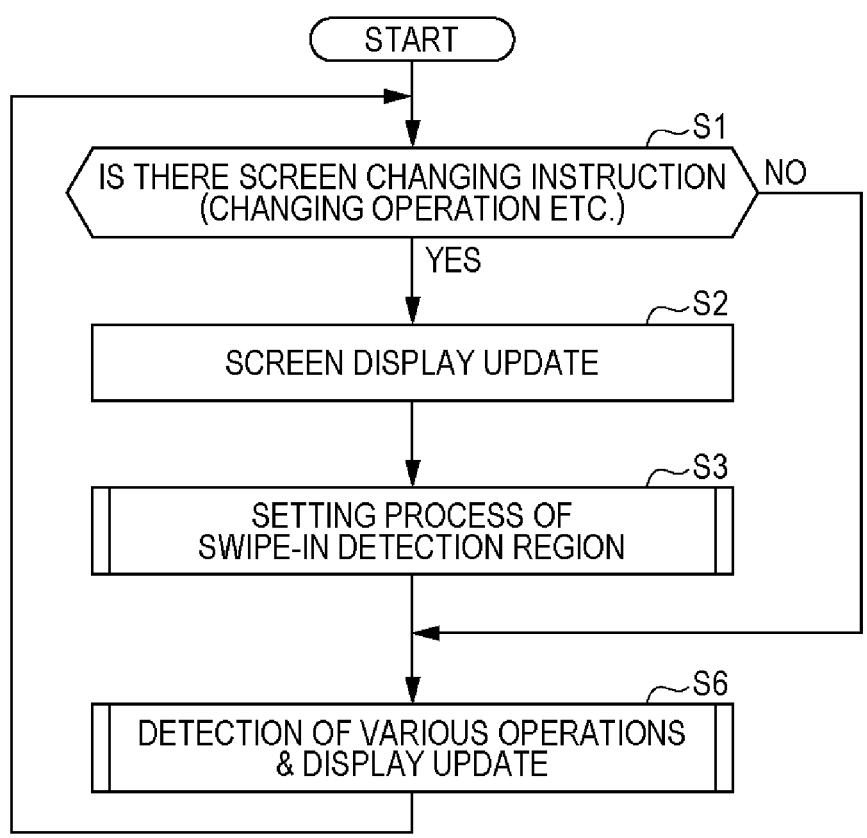
FIG. 7 is a flowchart illustrating an example of an operation of the MFP.
Figure 8:
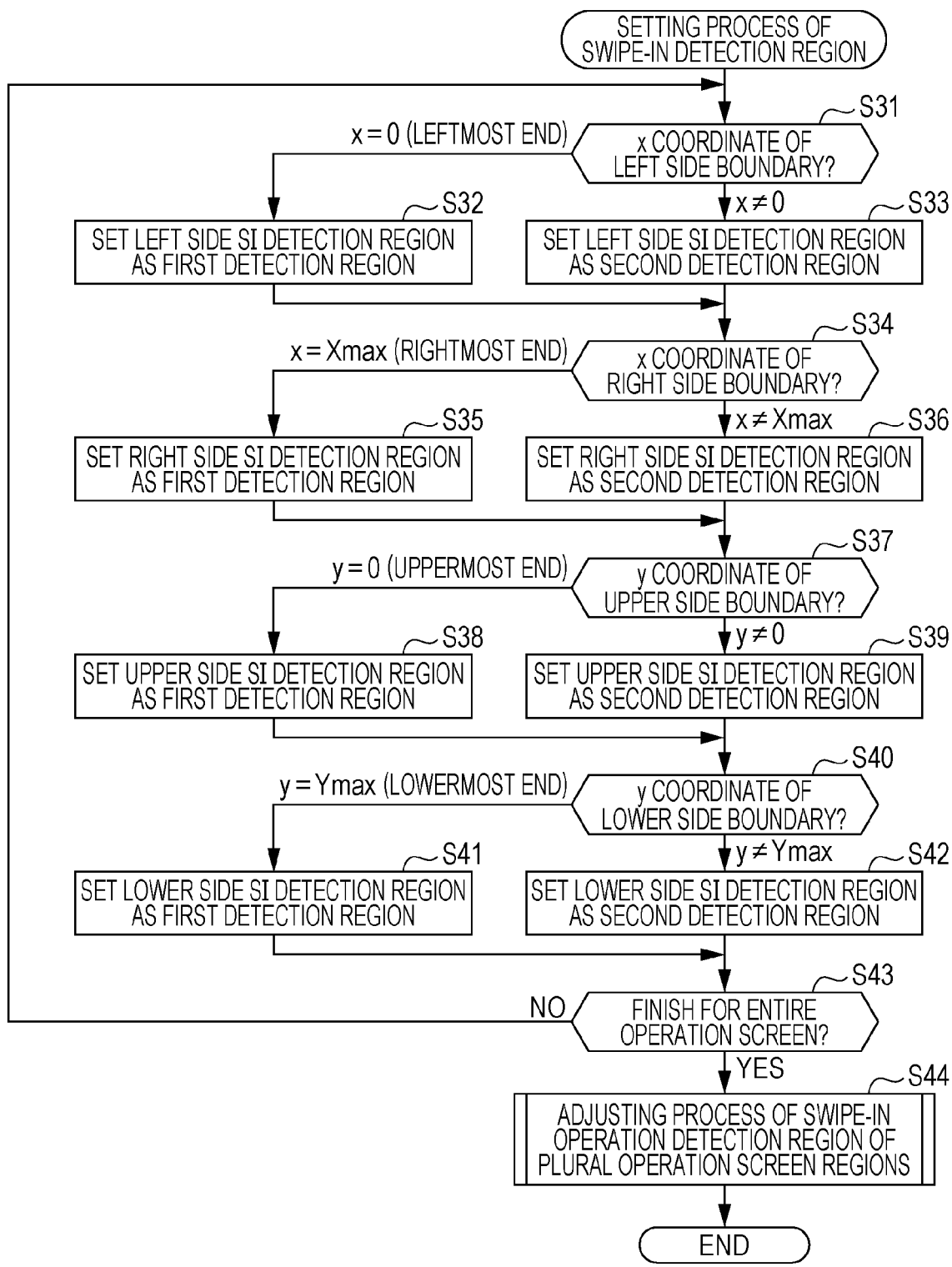
FIG. 8 is a flowchart illustrating a part of the operation in FIG. 7 (setting operation of a swipe-in operation detection region)
Figure 9:
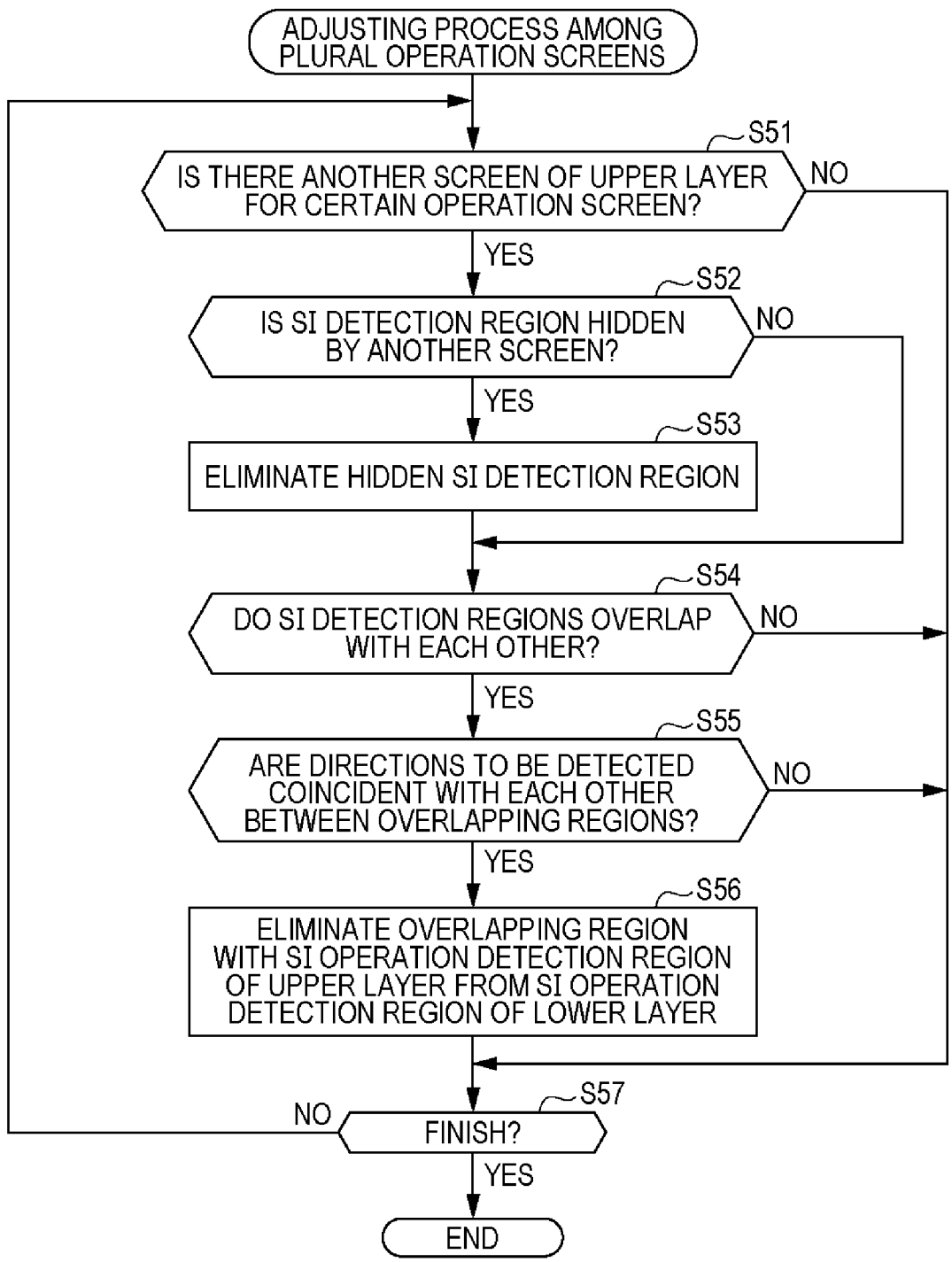
FIG. 9 is a flowchart illustrating a part of the operation in FIG. 7.

Hereinafter, the operation of the MFP 10 is described in detail with reference to FIGS. 7 to 9 and the like. FIGS. 7 to 9 are flowcharts illustrating an example of the operation of the MFP 10. Note that, FIGS. 8 and 9 are flowcharts illustrating a part of the operation in FIG. 7.

As illustrated in FIG. 7, in a case where a change instruction regarding the operation screen region (for example, a transition instruction from the entire display state of the single operation screen region 311 to the divided display state of the two operation screen regions 212 and 312) is given, the procedure shifts to step S2. Otherwise, the procedure shifts to step S6. Note that the change instruction is given on the basis of the operation of the operator (or automatically according to establishment of a predetermined condition and the like).

At step S2, display contents of the touch panel 45 are updated on the basis of the change instruction. For example, in a case where the transition instruction from the entire display state of the single operation screen region 311 to the divided display state of the two operation screen regions 212 and 312 is given, the operation screen region 212 is displayed in the left half region 460 of the touch panel 45, and the operation screen region 312 is displayed in the right half region 470 of the touch panel 45 (refer to the lower part in FIG. 10 and the lower part in FIG. 18). In other words, each of the operation screen regions 212 and 312 is displayed on a part of the touch panel 45.

At next step S3 (refer also to FIG. 8), the setting process of the swipe-in operation detection region is executed. At step S3, either the first detection region R1 or the second detection region R2 is set as the swipe-in operation detection region for each edge of each operation screen region.

Specifically, after a certain operation screen region is determined as a target to be processed, the processes from step S31 to step S42 are executed.

First, the swipe-in operation detection region for the left side out of the four sides of the operation screen region to be processed is set to either the first detection region R1 or the second detection region R2 (steps S31 to S33). In a case where an X coordinate of the left side is zero (that is, in a case where the left side (edge) of the operation screen region coincides with the physical edge of the left side of the touch panel 45), the procedure shifts from step S31 to step S32, and the first detection region R1 is set as the swipe-in operation detection region. On the other hand, in a case where the X coordinate of the left side is not zero (that is, in a case where the left side (edge) of the operation screen region does not coincide with the physical edge of the left side of the touch panel 45), the procedure shifts from step S31 to step S33, and the second detection region R2 is set as the swipe-in operation detection region.

Similarly, the swipe-in operation detection region for the right side out of the four sides of the operation screen region to be processed is set to either the first detection region R1 or the second detection region R2 (steps S34 to S36). In a case where an X coordinate of the right side is a value Xmax (maximum value of the X coordinate in the touch panel 45) (that is, in a case where the right side (edge) of the operation screen region coincides with the physical edge of the right side of the touch panel 45), the procedure shifts from step S34 to step S35, and the first detection region R1 is set as the swipe-in operation detection region. On the other hand, in a case where the X coordinate of the right side is not the value Xmax (that is, in a case where the right side (edge) of the operation screen region does not coincide with the physical edge of the right side of the touch panel 45), the procedure shifts from step S34 to step S36, and the second detection region R2 is set as the swipe-in operation detection region.

Similarly, the swipe-in operation detection region for the upper side out of the four sides of the operation screen region to be processed is set to either the first detection region R1 or the second detection region R2 (steps S37 to S39). In a case where a Y coordinate of the upper side is zero (that is, the upper side (edge) of the operation screen region coincides with the physical edge of the upper side of the touch panel 45), the procedure shifts from step S37 to step S38, and the first detection region R1 is set as the swipe-in operation detection region. On the other hand, in a case where the Y coordinate of the upper side is not zero (that is, in a case where the upper side (edge) of the operation screen region does not coincide with the physical edge of the upper side of the touch panel 45), the procedure shifts from step S37 to step S39, and the second detection region R2 is set as the swipe-in operation detection region.

Similarly, the swipe-in operation detection region for the lower side out of the four sides of the operation screen region to be processed is set to either the first detection region R1 or the second detection region R2 (steps S40 to S42). In a case where a Y coordinate of the lower side is a value Ymax (maximum value of the Y coordinate in the touch panel 45) (that is, in a case where the lower side (edge) of the operation screen region coincides with the physical edge of the lower side of the touch panel 45), the procedure shifts from step S40 to step S41, and the first detection region R1 is set as the swipe-in operation detection region. On the other hand, in a case where the Y coordinate of the lower side is not the value Ymax (that is, in a case where the lower side (edge) of the operation screen region does not coincide with the physical edge of the lower side of the touch panel 45), the procedure shifts from step S40 to step S42, and the second detection region R2 is set as the swipe-in operation detection region.

Also, the direction of the swipe-in operation which should be detected (direction to the inner side of the operation screen region) is set in each swipe-in operation detection region for each of the four edges (four sides) of the operation screen region. Specifically, in the swipe-in operation detection region regarding the left side, it is set that a rightward swipe-in operation should be detected, and in the swipe-in operation detection region regarding the right side, it is set that a leftward swipe-in operation should be detected. In addition, in the swipe-in operation detection region regarding the upper side, it is set that a downward swipe-in operation should be detected, and in the swipe-in operation detection region regarding the lower side, it is set that an upward swipe-in operation should be detected.

Figure 28:
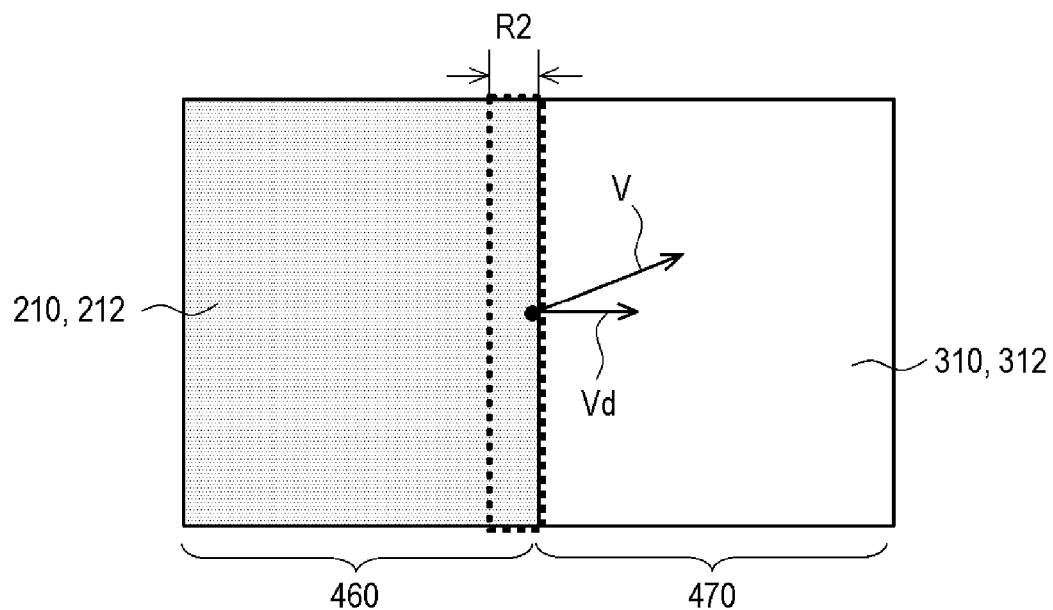
FIG. 28 is a view illustrating a vector for detection provided in a certain second detection region.

In more detail, a vector for detection Vd (refer also to FIGS. 28 and 29) is set in each swipe-in operation detection region. The vector for detection Vd is the vector indicating the direction of the swipe-in operation which should be detected in the swipe-in operation detection region. For example, in the swipe-in operation detection region (second detection region R2 and the like) corresponding to the left side of the operation screen region, a rightward vector is set as the vector for detection Vd, so that it is set that the rightward swipe-in operation should be detected. Also, in the swipe-in operation detection region (second detection region R2 and the like) corresponding to the right side of the operation screen region, a leftward vector is set as the vector for detection Vd, so that it is set that the leftward swipe-in operation should be detected. The same applies to each of the other sides.

Note that although the mode in which the swipe-in operation is accepted on all the sides (edges (boundaries)) of each operation screen region is herein illustrated, the invention is not limited to this. Specifically, it is also possible that the swipe-in operation is accepted for only a part (one side to three sides) of the four sides of each operation screen region. Then, the second detection region R2 may be set only for the side which does not coincide with the physical edge of the touch panel 45 among the part of the sides (edges).

At next step S43, it is determined whether an unprocessed operation screen region remains. In a case where the unprocessed operation screen region remains, the operation screen region to be processed is updated, and then the processes at steps S31 to S42 are executed. In a case where the unprocessed operation screen region does not remain, the procedure shifts to step S44.

At step S44, an adjusting process of the swipe-in operation detection region of each of a plurality of operation screen regions is executed. Note that FIG. 9 is a flowchart illustrating an example of the adjusting process.

Figure 22:
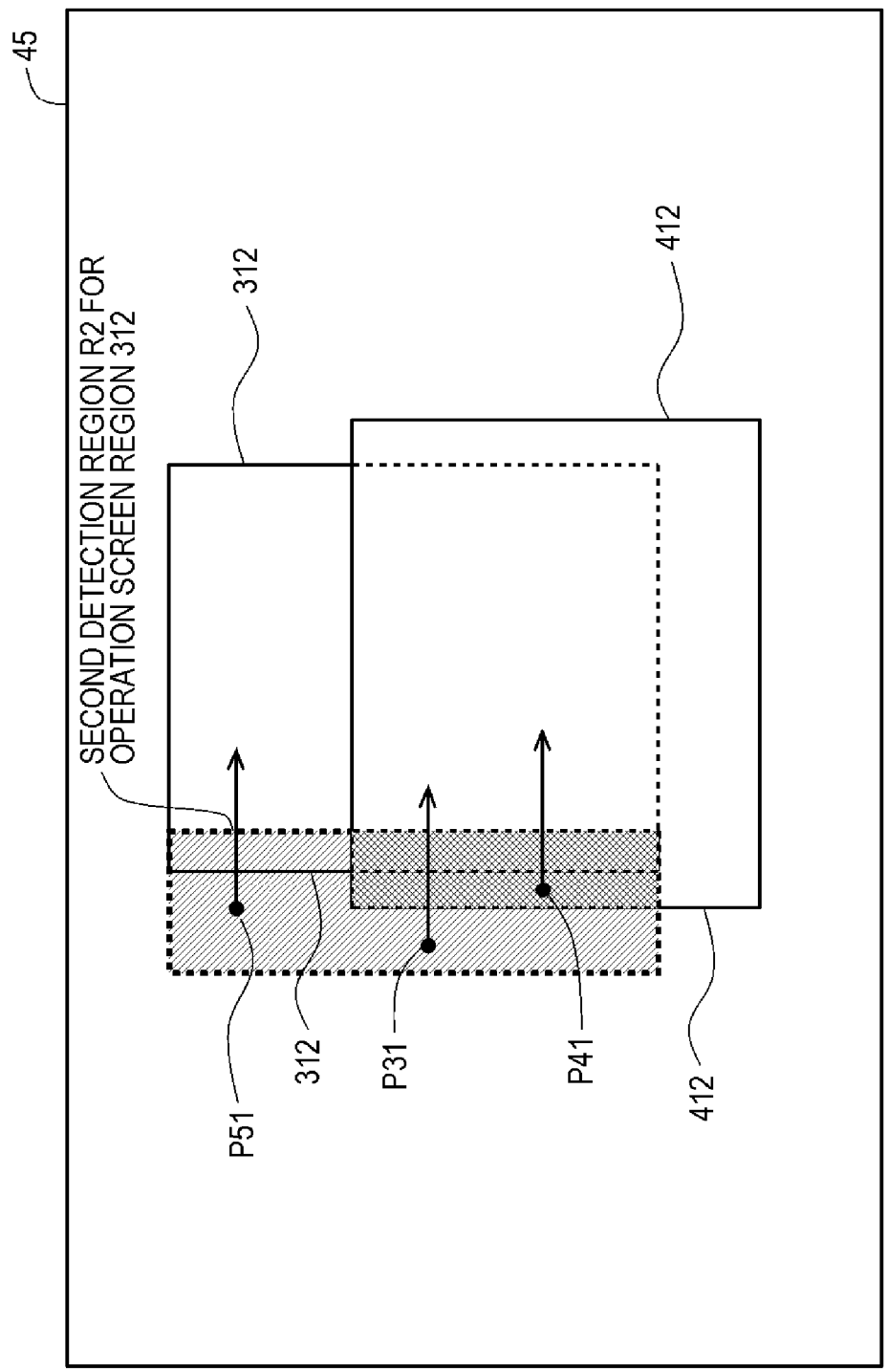
FIG. 22 is a view illustrating a first eliminating process.
Figure 23:
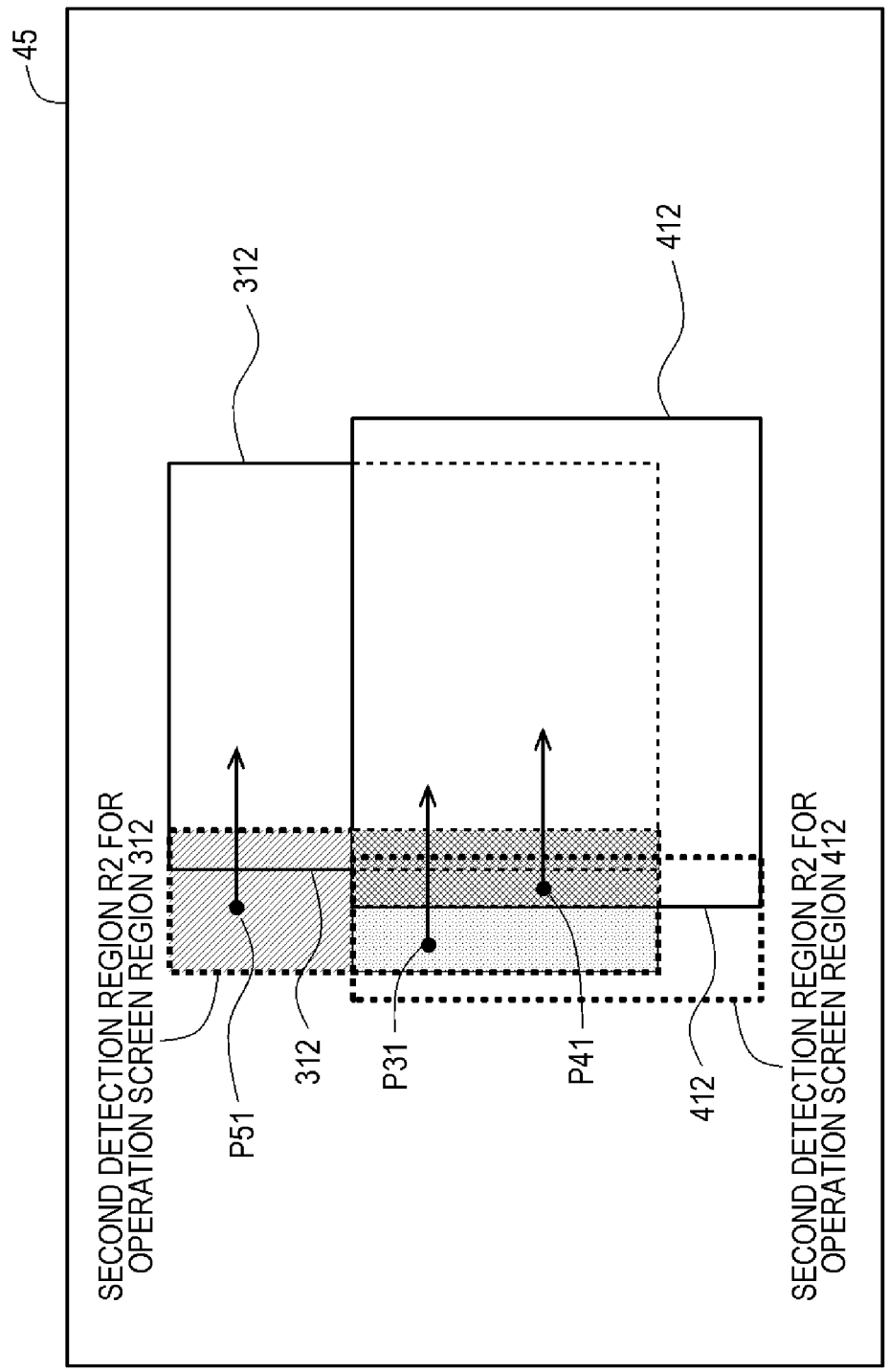
FIG. 23 is a view also illustrating a second eliminating process.

First, an outline of the adjusting process is described with reference to FIGS. 22 and 23. FIGS. 22 and 23 are views illustrating a state in which a plurality of different operation screen regions 312 and 412 are displayed in an overlapping manner. Note that FIG. 23 is different from FIG. 22 in that this also illustrates the second detection region R2 for the operation screen region 412. Also, in FIGS. 22 and 23, the second detection region R2 of the mode in FIG. 14 is illustrated.

In FIGS. 22 and 23, the operation screen region 412 is arranged so as to overlap with (superimposed on) (only) a part of the operation screen region 312 and has an upper display layer than (i.e., a display layer higher than) that of the operation screen region 312. In other words, the operation screen region 412 is displayed (superimposed) on an upper layer side (front side) of (a part of) the operation screen region 312.

Each swipe-in operation for each of the operation screen regions 312 and 412 is detected on the basis of the swipe-in operation detection region (second detection region R2 and the like) for each of them. For example, the swipe-in operation regarding the operation screen region 312 is detected on the basis of the second detection region R2 for the operation screen region 312. Also, the swipe-in operation regarding the operation screen region 412 is detected on the basis of the second detection region R2 for the operation screen region 412 (refer also to FIG. 23).

In a case where a plurality of operation screen regions 312 and 412 is displayed so as to partially overlap with each other in the touch panel 45 as illustrated in FIG. 22, the swipe-in operation for the operation screen region with relatively upper layer in display (display layer) (operation screen region displayed on the front side) out of a plurality of operation screen regions 312 and 412 may be detected.

Therefore, the second detection region R2 for the operation screen region 312 may be formed as a region obtained by eliminating a portion overlapping with the operation screen region 412. In other words, the second detection region R2 for the operation screen region 312 may be formed after an eliminating process of eliminating the overlapping portion with the operation screen region 412 is performed.

According to this, in a case where the operation on the operation screen region 412 is started from a position P41 (to be described next) in FIG. 22, it is avoided that the operation is (erroneously) recognized as the swipe-in operation for the operation screen region 312. This is because the position P41 is no longer the position in the second detection region R2 for the operation screen region 312 by the above-described eliminating process. Herein, the position P41 is a position within a region (cross-hatched region) overlapping with the operation screen region 412 in the second detection region R2 for the operation screen region 312.

Also, on the basis of the fact that the position P41 is the position in the second detection region R2 (swipe-in operation detection region) for the operation screen region 412 (refer to FIG. 23), the swipe-in operation from the position P41 is recognized as the operation for the operation screen region 412 (operation screen region 412 having an upper display layer than that of the operation screen region 312). However, the invention is not limited to this, and it is also possible that the second detection region R2 for the operation screen region 412 is not set.

Also, on the basis of a fact that a position P51 is the position in the second detection region R2 for the operation screen region 312, the swipe-in operation from the position P51 (swipe-in operation starting from the position P51) is recognized as the swipe-in operation for the operation screen region 312). Herein, the position P51 is a position in a region not belonging to the second detection region R2 (refer to FIG. 23) for the operation screen region 412 but belonging to the second detection region R2 for the operation screen region 312 after the above-described eliminating process is performed (obliquely hatched region).

In addition, according to the swipe-in operation detecting process on the basis of the second detection region R2 (refer to FIG. 22) for the operation screen region 312 after only the above-described eliminating process (also referred to as a first eliminating process) is performed, the swipe-in operation from the position P31 is recognized as the operation for the operation screen region 312 (operation screen region 312 having a lower display layer than that of the operation screen region 412). Herein, the position P31 is a position within a region not overlapping with the operation screen region 412 in the second detection region R2 for the operation screen region 312.

However, the swipe-in operation starting from the position P31 may be determined to be not the swipe-in operation for the operation screen region 312 but the swipe-in operation for the operation screen region 412 (having the upper display layer than that of the operation screen region 312).

In order to respond to such a demand, as illustrated in FIG. 23, the second detection region R2 for the operation screen region 312 may be a region obtained by eliminating both the overlapping portion overlapping with the operation screen region 412 (cross-hatched portion in FIG. 23) and the overlapping portion overlapping with the second detection region R2 (swipe-in operation detection region) for the operation screen region 412 (sand-hatched portion and the like in FIG. 23). In short, the second detection region R2 for the operation screen region 312 may be the region obtained by eliminating also the overlapping portion overlapping with the second detection region R2 for the operation screen region 412 (sand-hatched portion and the like in FIG. 23). In other words, the second detection region R2 for the operation screen region 312 may be formed after a "second eliminating process" (process of eliminating the portion overlapping with the second detection region R2 for the operation screen region 412) is performed in addition to the first eliminating process described above.

According to this, as a result of the eliminating process including the second eliminating process, the position P31 is no longer the position in the second detection region R2 (swipe-in operation detection region) for the operation screen region 312, so that the swipe-in operation is not (erroneously) recognized as the operation for the operation screen region 312. Also, on the basis of the fact that the position P31 is the position in the second detection region R2 (swipe-in operation detection region) for the operation screen region 412, the swipe-in operation is recognized as the operation for the operation screen region 412 (operation screen region 412 having an upper display layer than that of the operation screen region 312).

Especially, in a case where the swipe-in operation is performed in the vicinity of the same side edge of both the operation screen regions 312 and 412 (refer to FIG. 23), the operation screen region having a relatively upper display layer may be determined as the target region of the swipe-in operation. For example, in a case where the swipe-in operation is performed in the position P41 closer to both the left side of the operation screen region 312 and the left side of the operation screen region 412, the operation screen region 412 having a relatively upper display layer may be determined as the target region of the swipe-in operation. According to this, it is possible to appropriately specify the target region of the swipe-in operation according to intuition of the user.

In detail, a case where the second detection region R2 (also referred to as the swipe-in operation detection region on the lower layer side) regarding a certain side (for example, left side) of the operation screen region 312 of the lower layer overlaps with the second detection region R2 (also referred to as the swipe-in operation detection region on the upper layer side) regarding a certain side (for example, left side) for the operation screen region 412 of the upper layer is supported (refer to FIG. 23). In this case, when the directions of the swipe-in operation (directions of vector for detection Vd) which should be detected in the two swipe-in operation detection regions (second detection region R2) are the same, the above-described second eliminating process may be performed. Specifically, the overlapping portion of the swipe-in operation detection region on the upper layer side and the swipe-in operation detection region on the lower layer side may be eliminated from the swipe-in operation detection region (second detection region R2) on the lower layer side.

On the other hand, even in a case where the swipe-in operation detection regions of a plurality of operation screen regions 312 and 412 overlap with each other, when the directions of the swipe-in operation to be detected in the swipe-in operation detection region are different (refer to FIG. 24), it is not necessary to perform the above-described second eliminating process. The target region of the swipe-in operation may be correctly specified by the direction (direction of the swipe-in operation which should be detected) of the vector for detection Vd (refer to FIGS. 28 and 29) set in each swipe-in operation detection region without performing the above-described second eliminating process.

Figure 24:
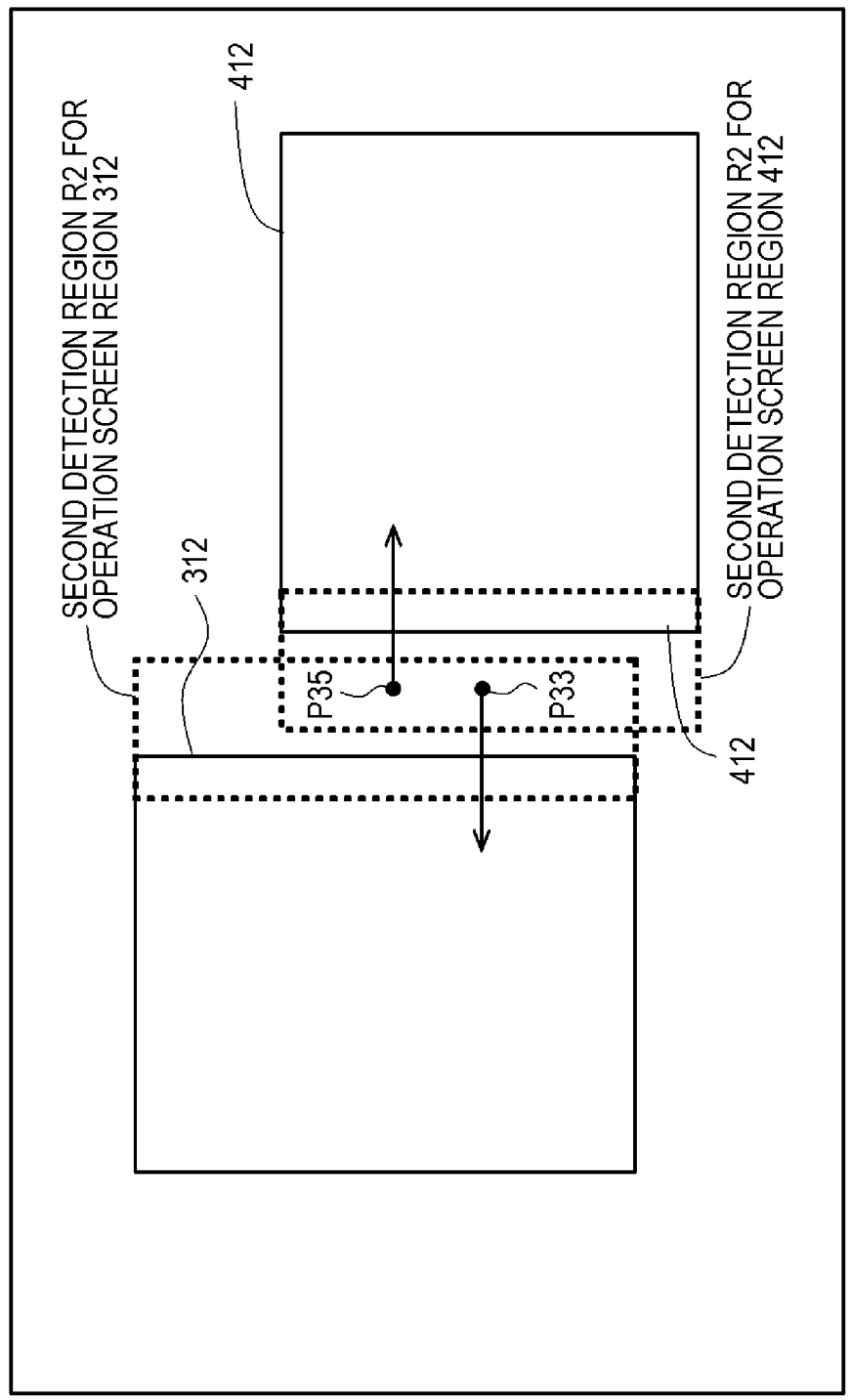
FIG. 24 is a view illustrating a state in which two swipe-in operation detection regions having different vectors for detection are close to each other.

For example, as illustrated in FIG. 24, only the leftward swipe-in operation is detected in the second detection region R2 regarding the right side of the operation screen region 312, and only the rightward swipe-in operation is detected in the second detection region R2 regarding the left side of the operation screen region 412. Therefore, in a case where the rightward swipe-in operation is performed from a position P35, the second detection region R2 regarding the right side of the operation screen region 312 does not react, and the rightward swipe-in operation is detected only in the second detection region R2 regarding the left side of the operation screen region 412. On the other hand, in a case where the leftward swipe-in operation is performed from a position P33, the second detection region R2 regarding the left side of the operation screen region 412 does not react, and the leftward swipe-in operation is detected only in the second detection region R2 regarding the right side of the operation screen region 312. Note that both the positions P33 and P35 are positions within the overlapping region of the swipe-in operation detection region regarding the right side of the operation screen region 312 and the swipe-in operation detection region regarding the left side of the operation screen region 412.

Therefore, when the directions of the swipe-in operation which should be detected are different between the two swipe-in operation detection regions (second detection regions R2) overlapping with each other, it is not necessary to perform the adjusting operation (second eliminating process) of the swipe-in operation detection region (second detection region R2 and the like). In detail, it is not required that the overlapping portion of the swipe-in operation detection region on the upper layer side and the swipe-in operation detection region on the lower layer side be eliminated from the swipe-in operation detection region (second detection region R2) on the lower layer side. Conversely, the swipe-in operation detection region (second detection region R2 and the like) of a plurality of operation screen regions may be adjusted on condition that the direction of the swipe-in operation (direction of the vector for detection Vd) is the same.

Note that, in the lower part in FIG. 10, the lower part in FIG. 18, FIGS. 11 to 17 and the like, the operation screen region 212 and the operation screen region 312 belong to the same level layer. Therefore, regarding the swipe-in operation detection region regarding the operation screen regions, the first and second eliminating processes are not performed.

FIG. 9 is a flowchart illustrating the operation in FIG. 23. For example, such operation may be executed as the operation at step S44.

First, after the operation screen region of interest is specified, it is determined whether there is an operation screen region of an upper layer different from the operation screen region (step S51). In a case where there is no operation screen region of the upper layer, the procedure shifts to step S57. On the other hand, in a case where there is the operation screen region of the upper layer, the procedure shifts to step S52.

At step S52, it is determined whether at least a part of the swipe-in operation detection region (swipe-in operation detection region of the lower layer) regarding a certain side of the operation screen region of interest is hidden by the operation screen region of the upper layer. In a case where a positive determination result is obtained, the procedure shifts to step S53, and in a case where a negative determination result is obtained, the procedure shifts to step S54 while skipping step S53.

At step S53, the portion hidden by the operation screen region of the upper layer (overlapping portion of the swipe-in operation detection region of the lower layer and the operation screen region of the upper layer) is eliminated from the swipe-in operation detection region of the lower layer, and the swipe-in operation detection region of the lower layer is updated. That is, the above-described first eliminating process is executed.

Note that the processes at steps S52 and S53 are executed for all the swipe-in operation detection regions (second detection regions R2) of the four sides of the operation screen region of the lower layer.

By such operation, as illustrated in FIG. 22, the second detection region R2 (swipe-in operation detection region) for the operation screen region 312 is formed as a region from which the overlapping portion with the operation screen region 412 is eliminated (region without the overlapping portion included).

At next steps S54 to S56, a process of eliminating also the overlapping portion with the swipe-in operation detection region (second detection region R2 and the like) for the operation screen region (412 and the like) of the upper layer from the swipe-in operation detection region (second detection region R2 and the like) for the operation screen region (312 and the like) of the lower layer and the like are executed. That is, the above-described second eliminating process and the like are executed.

Specifically, at step S54, it is first determined whether the swipe-in operation detection region for the operation screen region of the upper layer overlaps with (at least a part of) the swipe-in operation detection region for the operation screen region of the lower layer. In a case where a positive determination result is obtained, the procedure shifts to step S55, and in a case where a negative determination result is obtained, the procedure shifts to step S57 while skipping steps S55 and S56.

At step S55, it is determined whether the direction of the swipe-in operation which should be detected in the swipe-in operation detection region of the lower layer (direction of the vector for detection Vd) is the same as the direction of the swipe-in operation which should be detected in the swipe-in operation detection region of the upper layer. In a case where a positive determination result is obtained, the procedure shifts to step S56, and in a case where a negative determination result is obtained, the procedure shifts to step S57 while skipping step S56.

At step S56, the overlapping region of the swipe-in operation detection region of the upper layer and the swipe-in operation detection region of the lower layer is eliminated from the swipe-in operation detection region of the lower layer, and the swipe-in operation detection region of the lower layer is updated.

Note that the processes at steps S54 and S56 are executed for all the swipe-in operation detection regions (second detection regions R2) of the four sides of the operation screen region of the lower layer.

At step S57, it is determined whether the process is finished for all the operation screen regions.

In a case where there is the unprocessed operation screen region, the procedure returns to step S51.

On the other hand, in a case where the process is finished for all the operation screen regions, the process at step S44 is finished. Thereafter, the procedure shifts to step S6 (refer to FIGS. 7, 25, and 26). Note that, FIGS. 25 and 26 are flowcharts illustrating detailed operation at step S6 in FIG. 7.

<1-6. Detecting Operation and the Like of Various Operations>

Figure 25:
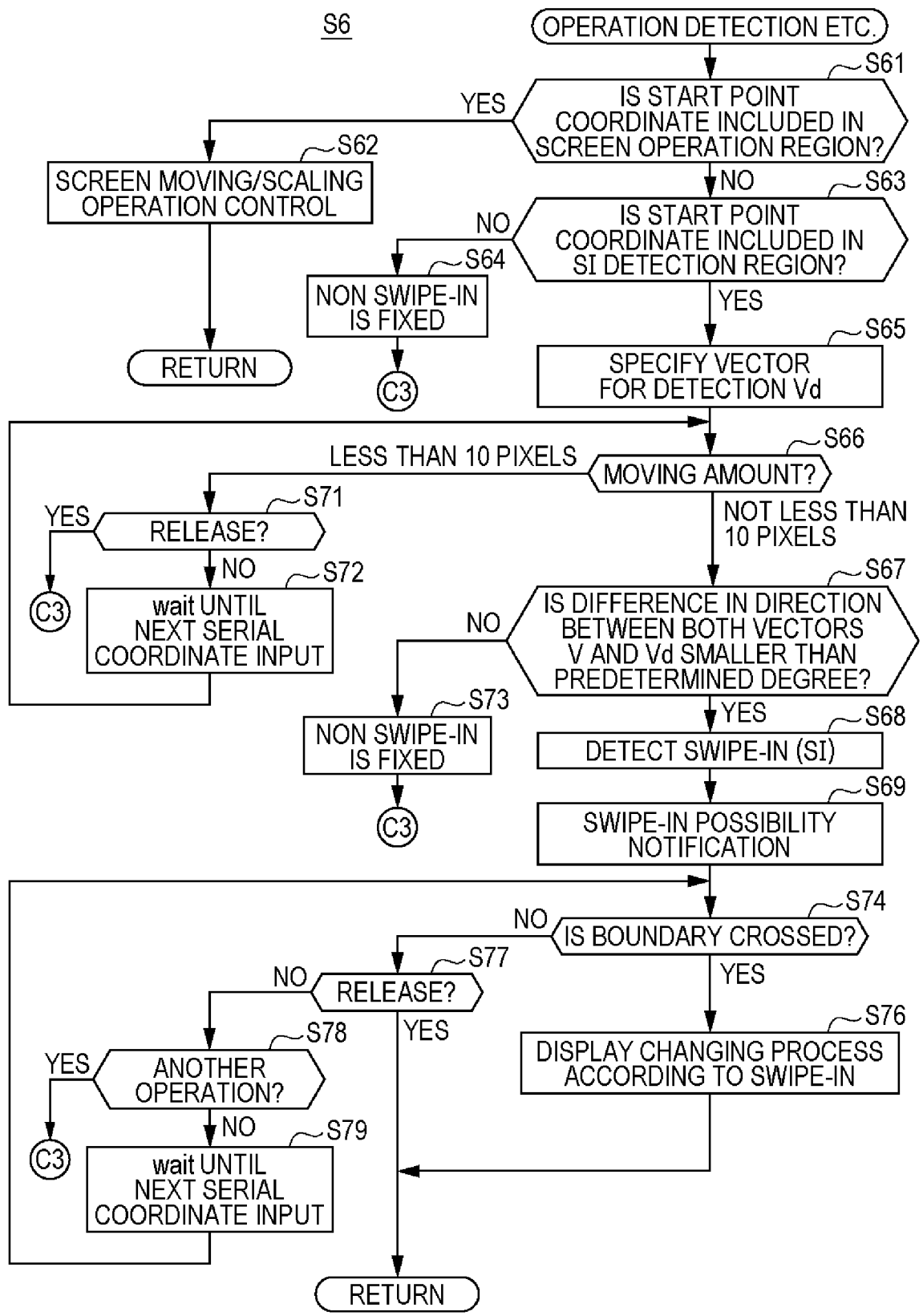
FIG. 25 is a flowchart illustrating a part of the operation in FIG. 7 (detecting operation of various operations and the like)
Figure 26:
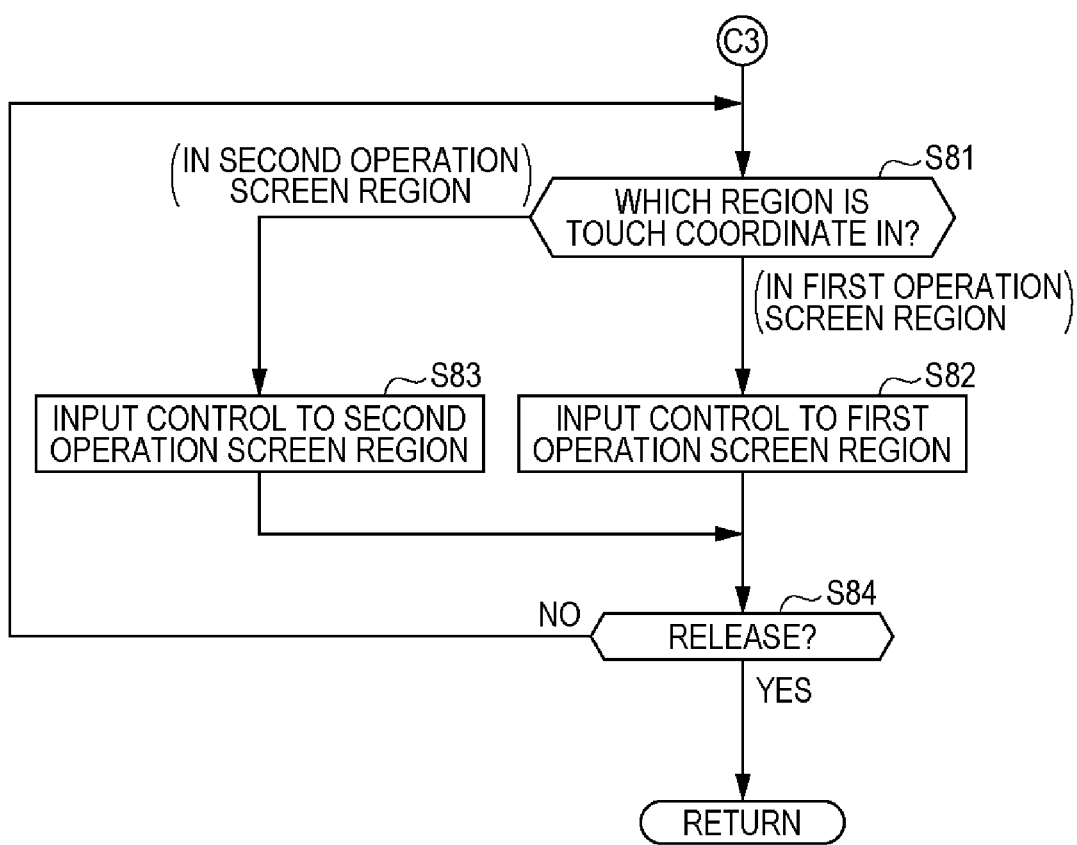
FIG. 26 is a flowchart illustrating a part of the operation in FIG. 7.

Next, with reference to FIGS. 25, 26 and the like, the detecting operation and the like of the various operations on the touch panel 45 (step S6 (FIG. 7)) are described in detail. Herein, the swipe-in operation, the tap operation, the swipe operation, a pinch-in operation, a pinch-out operation and the like are recognized in a distinguishing manner. Also, moving and/or scaling (enlarging/reducing) operation of the operation screen region itself is recognized in a distinguishing manner from other operations (swipe-in operation in the vicinity of each edge (each side) of the operation screen region, swipe operation and tap operation in the operation screen region and the like).

In FIGS. 25 and 26, operations immediately after the operation (touch operation) of the operator on the touch panel 45 is started are illustrated. When start of the operation by the operator on the touch panel 45 is detected, the procedure first shifts to step S61.

At step S61, it is determined whether the operation by the operator is the operation for moving and/or scaling (enlarging/reducing) the operation screen region itself (also referred to as a screen moving scaling operation). Specifically, it is determined whether the start point of the operation (operation start position) is a point on a boundary of the operation screen region for the moving and/or scaling (enlarging/reducing) operation of the operation screen region itself (in detail, each side forming the boundary (contour in a rectangular shape).

Figure 27:
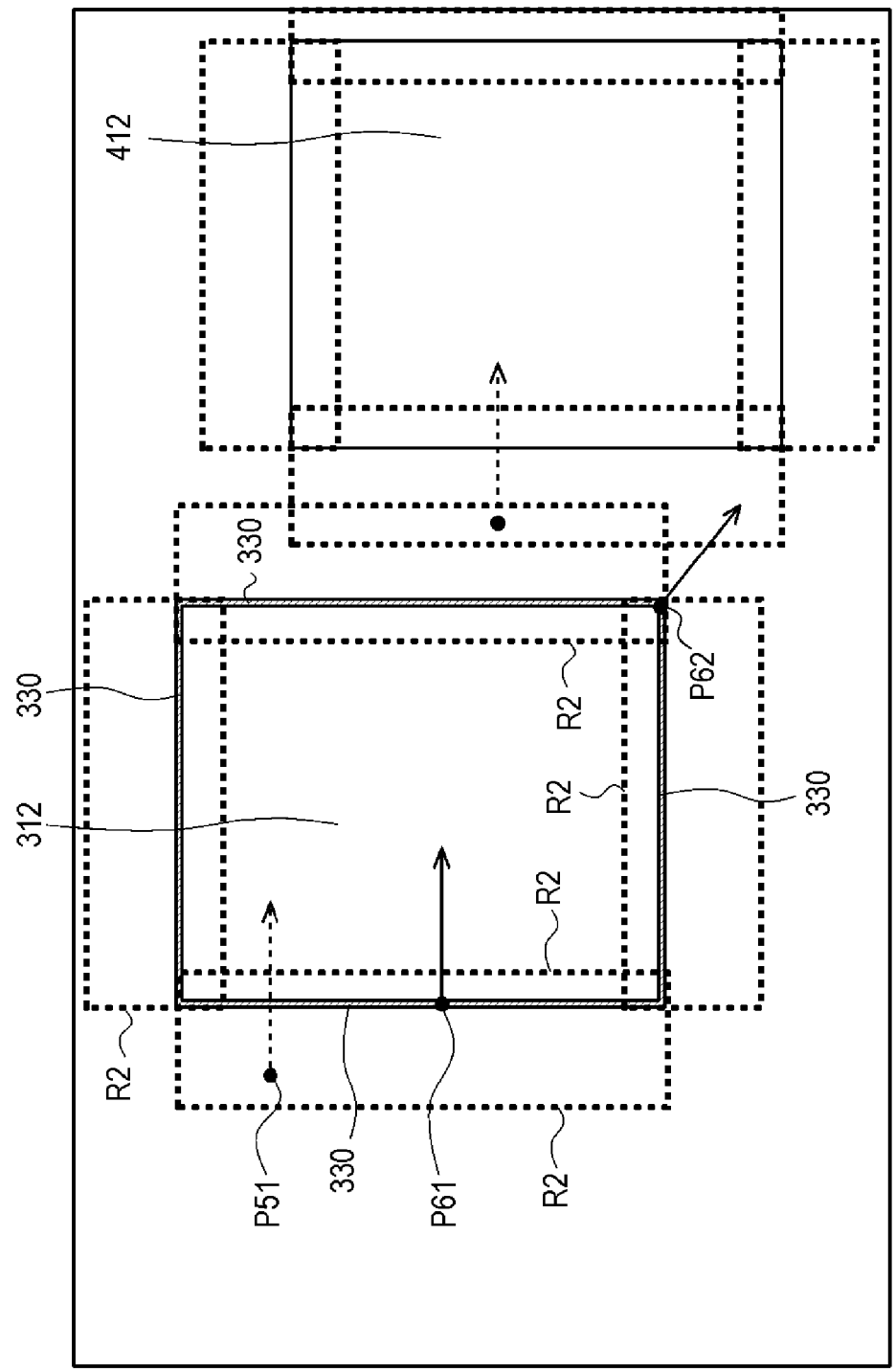
FIG. 27 is a view illustrating a region moving scaling operation and the like for changing the operation screen region itself.

In FIG. 27, an edge (obliquely hatched linear boundary region) 330 of the operation screen region 312 is provided as a region for the screen moving scaling operation (also referred to as region moving scaling operation or region changing operation) to change (move and/or scale (enlarge/reduce)) the operation screen region 312 itself. Note that, in FIG. 27, the second detection region R2 of the mode in FIG. 14 is illustrated.

For example, in a case where the operation is started from a position on the boundary region (edge) 330, the operation is determined to be (not the swipe-in operation but) the region moving scaling operation of the operation screen region 312. In detail, in a case where the operation is started from a position (P61 and the like) other than four corners (four corner positions) of the boundary region 330, the position on the boundary region 330, the operation is determined to be the moving operation of the operation screen region 312. Also, in a case where the touch operation is started from the four corner positions (P62 and the like) of the boundary region 330, this is determined to be the scaling operation (enlarging operation or reducing operation) of the operation screen region 312. In such a case, the procedure shifts to step S62. Then, at step S62, a moving process (or scaling process) of the operation screen region 312 itself based on the moving operation (or scaling operation) of the operation screen region 312 is executed.

On the other hand, when it is determined that the operation by the operator is not the region moving scaling operation, the procedure does not shift to step S62 but shifts from step S61 to step S63.

At step S63 to be described later and subsequent steps, the detecting operation (especially, steps S65 to S68) and the like of the operation (swipe-in operation and the like) other than the region moving scaling operation (moving and/or scaling (enlarging/reducing) operation) of the operation screen region itself is executed (to be described later). In other words, the processes at steps S61 and S62 may be executed over the processes at step S63 and subsequent steps.

In this manner, in a case where the second detection region R2 (swipe-in operation detection region) regarding the operation screen region 312 includes at least a part of the edge 330 of the operation screen region 312, the start position of the operation by the operator (operation start position) is sometimes the position (P61, P62 and the like) on the edge 330 of the operation screen region 312 and within the second detection region R2 (refer to FIG. 27). In this case, the operation by the operation finger may be (1) the swipe-in operation for the operation screen region 312 and (2) operation of moving and/or scaling the operation screen region 312 itself (region moving scaling operation). In one or more embodiments, under such circumstances, the region moving scaling operation may be detected over the swipe-in operation. However, the invention is not limited to this, and, for example, it is also possible that the region moving scaling operation is not detected. In other words, it is also possible that steps S61 and S62 are not performed.

At next step S63, it is determined whether the start position of the operation by the operator is included in the swipe-in operation detection region (second detection region R2 and the like). In a case where the start position is not included in the swipe-in operation detection region (second detection region R2 and the like), it is determined (fixed) that the operation is not the swipe-in operation (in other words, this is non-swipe-in operation) (step S64). Then, the procedure shifts to step S81 (refer to FIG. 26).

At step S81, it is determined for which operation screen region the operation is. Specifically, the target region of the operation is determined on the basis of the operation screen region in which the touch coordinates are present. Note that, in a case where a plurality of operation screen regions overlaps, it is possible that the operation screen region of the uppermost layer at the touch position (the operation screen region having the uppermost display layer) is determined as the target region of the operation.

In a case where it is determined that the operation by the operator is for the first operation screen region (312 and the like), the display operation regarding the first operation screen region is executed (step S82). For example, it is determined that one of the tap operation, the swipe operation, the pinch-in operation, the pinch-out operation and the like on the first operation screen region is performed, and the display changing operation corresponding to the one operation is performed.

Similarly, in a case where it is determined that the operation by the operator is for the second operation screen region (212, 412 or the like), the display operation regarding the second operation screen region is executed (step S83).

Thereafter, when it is determined at step S84 that the finger of the operator is separated from the touch panel 45 (finger is released), the process at step S6 finishes. On the other hand, in a case where the finger of the operator is not yet separated from the touch panel 45, the procedure returns again to step S81 and the operation at steps S81 to S84 is executed.

At step S63, in a case where it is determined whether the start position of the operation by the operator is included in the swipe-in operation detection region (second detection region R2 and the like), the procedure shifts to step S65 (FIG. 25).

At steps S65 to S68, the detecting operation of the swipe-in operation is executed.

Note that, a situation in which the operation screen regions 212 and 312 are displayed in the corresponding divided regions 460 and 470 of the touch panel 45, respectively, and the second detection region R2 similar to that in FIG. 11 is set for the operation screen region 312 is hereinafter mainly supposed. Also, as the position (corresponding operation start position) P2 (refer to FIG. 6) at which the swipe-in corresponding operation regarding the left side of the operation screen region 312 is started, the boundary position between the operation screen region 212 and the operation screen region 312 (for example, X coordinate=499) is set.

At step S65, the swipe-in operation detection region (second detection region R2 and the like) corresponding to the start position of the operation by the operator is specified, and the vector for detection Vd set in the swipe-in operation detection region is specified. As described above, the vector for direction Vd is the vector indicating the direction of the swipe-in operation which should be detected in the swipe-in operation detection region. For example, in a case where the start position is a position in the second detection region R2 corresponding to the left side of the operation screen region 312, a "rightward" vector is specified as the vector for detection Vd (refer to FIG. 28 and the like).

At steps S66 and S67, a determining process based on magnitude and a direction of a movement vector V of the operation finger of the user is executed.

At step S66, first, the movement vector V (movement vector starting from the start position (herein, the position in the swipe-in operation detection region (second detection region R2 and the like) of the touch operation and ending at a current position of the touch operation) is detected. Then, it is determined whether the magnitude of the movement vector V is equal to or larger than a predetermined value (for example, corresponding to 10 pixels).

In a case where the magnitude of the movement vector V is smaller than a predetermined value (corresponding to 10 pixels), the procedure shifts from step S66 to step S71. In a case where the touch operation is not yet canceled (the finger is not released), the procedure returns from step S71 to step S66 via step S72. On the other hand, when the touch operation is canceled (released), the procedure shifts from step S71 to step S84 via step S81 (FIG. 26), and the processes in FIGS. 25 and 26 are finished.

On the other hand, in a case where the magnitude of the movement vector V is not smaller than a predetermined value (corresponding to 10 pixels), the procedure shifts to step S67.

At step S67, it is determined whether difference between the direction of the movement vector V and the direction of the vector for detection Vd is smaller than a predetermined degree.

Specifically, by dividing an inner product of the movement vector V and the vector for detection Vd by a product of the magnitude of both vectors V and Vd, an angle θ (refer to FIG. 29) formed by both the vectors V and Vd is obtained. Then, in a case where the angle θ is smaller than a certain value TH1 (for example, 30 degrees), it is determined that the difference between the direction of the movement vector V and the direction of the vector for detection Vd is smaller than a predetermined degree. In contrast, when the angle θ is not smaller than a certain value TH1 (for example, 30 degrees), it is determined that the difference between the direction of the movement vector V and the direction of the vector for detection Vd is not smaller than a predetermined degree.

Figure 29:
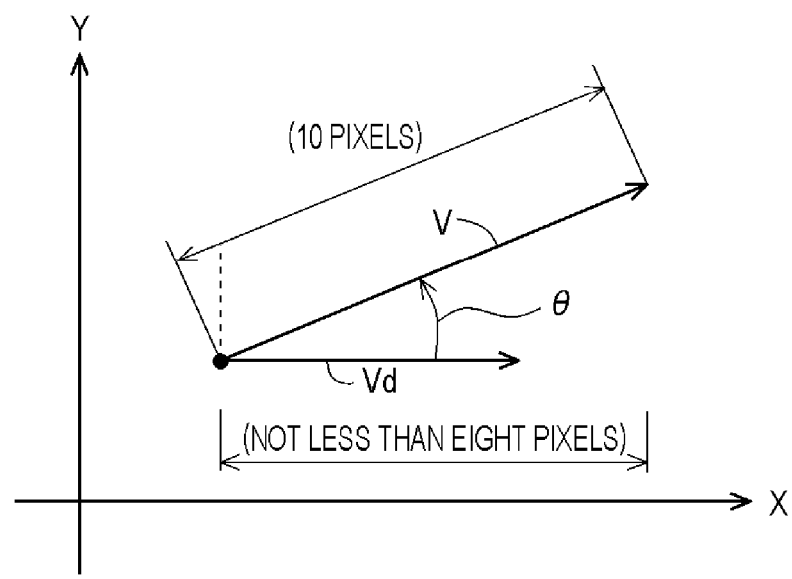
FIG. 29 is a view illustrating the vector for detection.

Alternatively, in a case where a specific direction component (in detail, a component of the direction of the vector for detection Vd) D1 of the movement vector V at the time when the magnitude of the movement vector V reaches a predetermined value (for example, corresponding to 10 pixels) is not smaller than a reference value TH2 (for example, eight pixels), it may be determined that the difference between the direction of the movement vector V and the direction of the vector for detection Vd is smaller than a predetermined degree (refer to FIG. 29). Note that the condition is also such that the specific direction component of the movement vector V (for example, an X direction component of the movement vector V) and the specific direction component of the vector for detection Vd (for example, an X direction component of the vector for detection Vd) have the same sign (both are positive or both are negative).

In a case where it is determined that the difference between the direction of the movement vector V and the direction of the vector for detection Vd is equal to or larger than a predetermined degree, the procedure shifts from step S67 to step S73. For example, when it is determined that θ≥30 degrees (deg) or D1<eight (pixels), the procedure shifts to step S73. At step S73, it is determined that the operation is not the swipe-in operation, and the procedure shifts to step S81 (refer to FIG. 26). The processes at step S81 and subsequent steps are as described above. Note that, at step S82 or step S83, after detailed contents of the operation (for example, the swipe operation to an upper right direction and the like) are fixed, the display changing operation corresponding to the operation is performed.

On the other hand, in a case where it is determined that the difference between the direction of the movement vector V and the direction of the vector for detection Vd is smaller than a predetermined degree, the procedure shifts from step S67 to step S68. For example, when it is determined that θ<30 degrees (deg) or D1≥eight (pixels), the procedure shifts to step S68.

At step S68, it is determined that the swipe-in operation is performed. In other words, it is determined that the swipe-in operation is detected.

Figure 31:
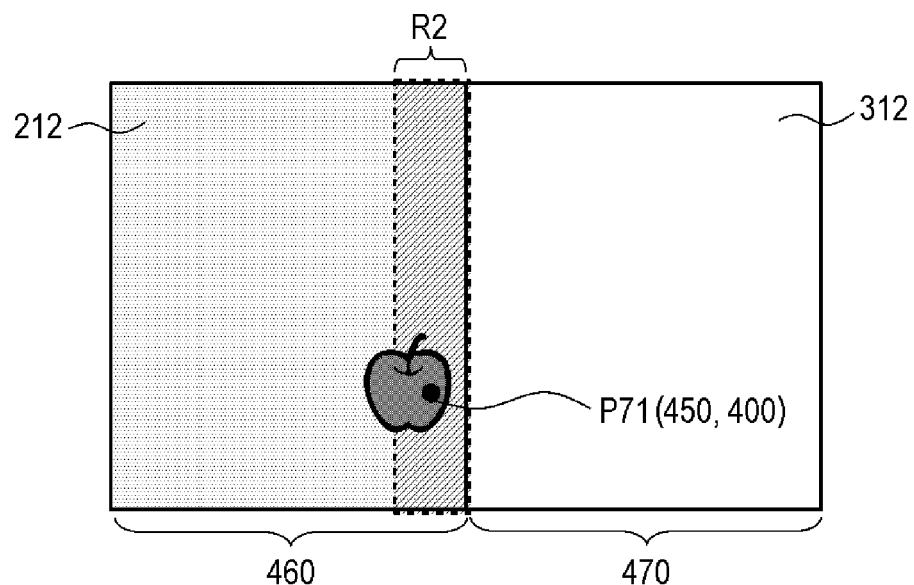
FIG. 31 is a view illustrating a state in which a touch operation is started from an overlapping region of a second detection region for a certain operation screen region and another operation screen region.
Figure 32:
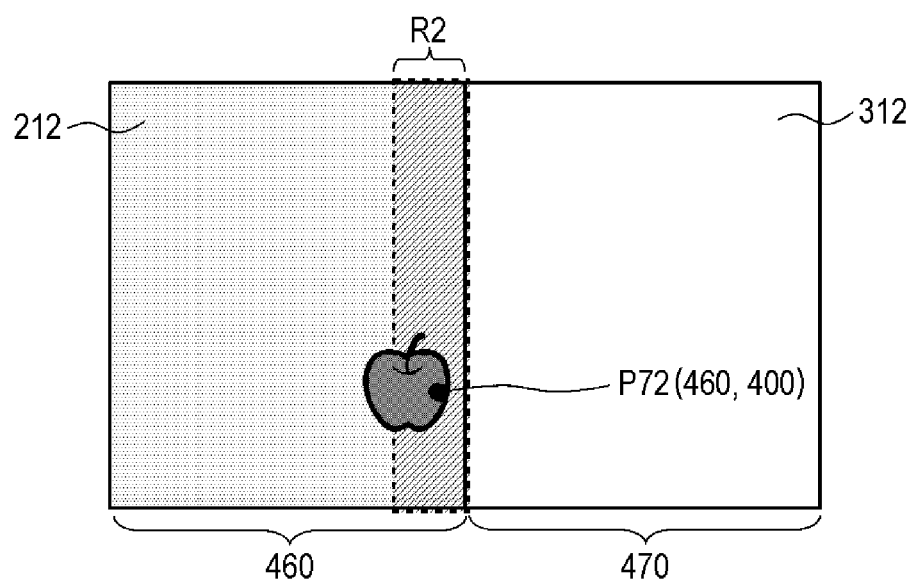
FIG. 32 is a view illustrating a state in which the operation finger further moves rightward.

For example, as illustrated in FIG. 31, when the operation (touch operation) by the finger of the user is started from a position P71 and moves by 10 pixels rightward in a state in which a pressing state by the finger continues (reaches a position P72 (refer to FIG. 32)), it is determined at step S68 that the swipe-in operation is detected. The positions P71 and P72 are positions in the second detection region R2 for the operation screen region 312. For example, coordinates (X coordinate, Y coordinate) of the position P71 are (450, 400) and coordinates of the position P72 are (460, 400).

Note that, in FIG. 31, the second detection region R2 similar to that in FIG. 11 is set for the operation screen region 312. Also, the second detection region R2 for the operation screen region 312 overlaps with at least a part of the operation screen region 212. However, the operation screen region 212 does not overlap with the operation screen region 312 (they are adjacent to each other). Also, the operation screen region 212 and the operation screen region 312 have the display layer of the same level. This also applies to FIGS. 32 to 37.

At step S69, a swipe-in possibility notifying operation is executed. A process at step S69 is to be described later.

After that, the procedure shifts to step S74. At step S74, it is determined whether the operation finger in the swipe-in operation crosses the boundary (X coordinate=499) between the operation screen region 212 and the operation screen region 312 (whether the operation finger reaches the corresponding operation start position P2).

Until the operation by the finger of the user crosses the boundary, the procedure shifts from step S74 to step S77 (to S79) without shifting to step S76. Specifically, when it is determined at step S77 that the touch operation is canceled (released), it is determined that the swipe-in operation is canceled, and the processes in FIGS. 25 and 26 are finished. In a case where it is determined that the touch operation is not yet canceled, the procedure shifts from step S77 to step S78.

At step S78, it is determined whether another operation (for example, multi-touch operation, sudden direction changing operation and the like) different from the swipe-in operation is performed. In a case where it is determined that the other operation (another type of operation) is performed (specifically, in a case where the swipe operation, the pinch-in operation, the pinch-out operation and the like are detected), the procedure shifts to step S81 (FIG. 26). Then, the processes at steps S81 to S84 are performed.

In a case where no other operation is performed, the procedure returns from step S78 to step S74 via step S79.

Figure 33:
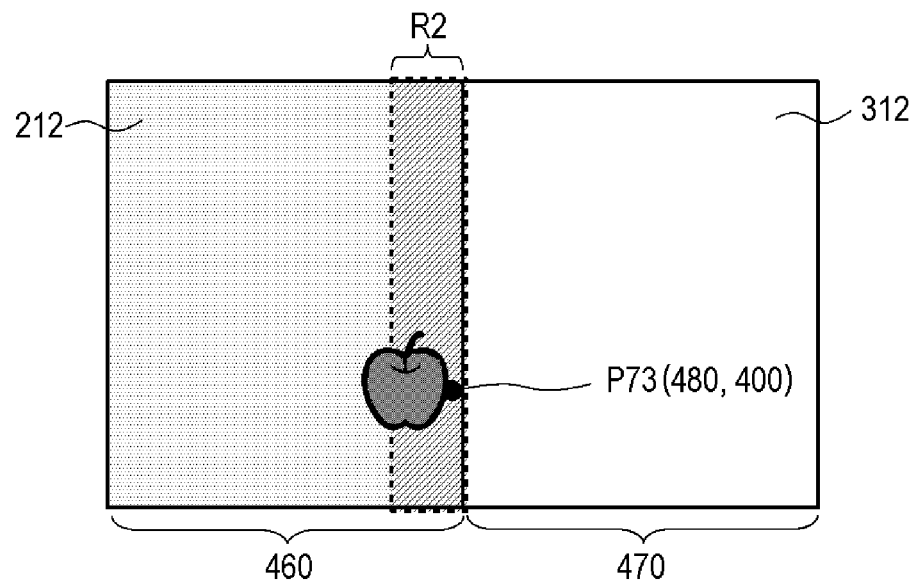
FIG. 33 is a view illustrating a state in which the operation finger further moves rightward.

In this manner, in a period TM2 from a time point when the swipe-in operation is detected at step S68 to a time point when it is determined that the swipe-in operation crosses the boundary at step S74, the display changing operation according to the swipe-in (step S76) is not started (not executed). For example, as illustrated in FIG. 33, in a case where the operation (touch operation) by the finger of the user is present in a position P73 (a position to the left of the boundary), a wait loop process at steps S74, S77, S78, and S790 (FIG. 25) is executed, and the swipe-in corresponding operation (step S76) is not executed. The same applies to FIG. 32.

On the other hand, when the operation by the finger of the user crosses the boundary (refer to FIGS. 34 to 36), the display changing operation (swipe-in corresponding operation) (S76) corresponding to the swipe-in operation is executed. In detail, as the finger of the user gradually moves from a position P75 (FIG. 34) to positions P76 (FIG. 35) and P77 (FIG. 36) while maintaining the touching state, the drawing display operation of the swipe-in object 320 (simple menu screen and the like) (display operation in which the swipe-in object is gradually drawn from the screen end to the inner side of the screen to be displayed) is executed. After the drawing display operation of the swipe-in object 320 (simple menu screen and the like) is completed at the position P77, the display state is not changed even when the finger is further moved from the position P77 to a position P78. Thereafter, the user may perform various operations (menu operation, setting operation or the like) by using the operation button and the like displayed in the swipe-in object 320 (simple menu screen and the like).

Also, in the above-described period TM2 (refer to steps S68, S74, S77, S78, and S79), a stopping (interrupting) instruction of the swipe-in operation (release execution) is also accepted. When a stopping instruction of the swipe-in operation is accepted (at step S77), the swipe-in corresponding operation (step S76) is not performed.

Figure 37:
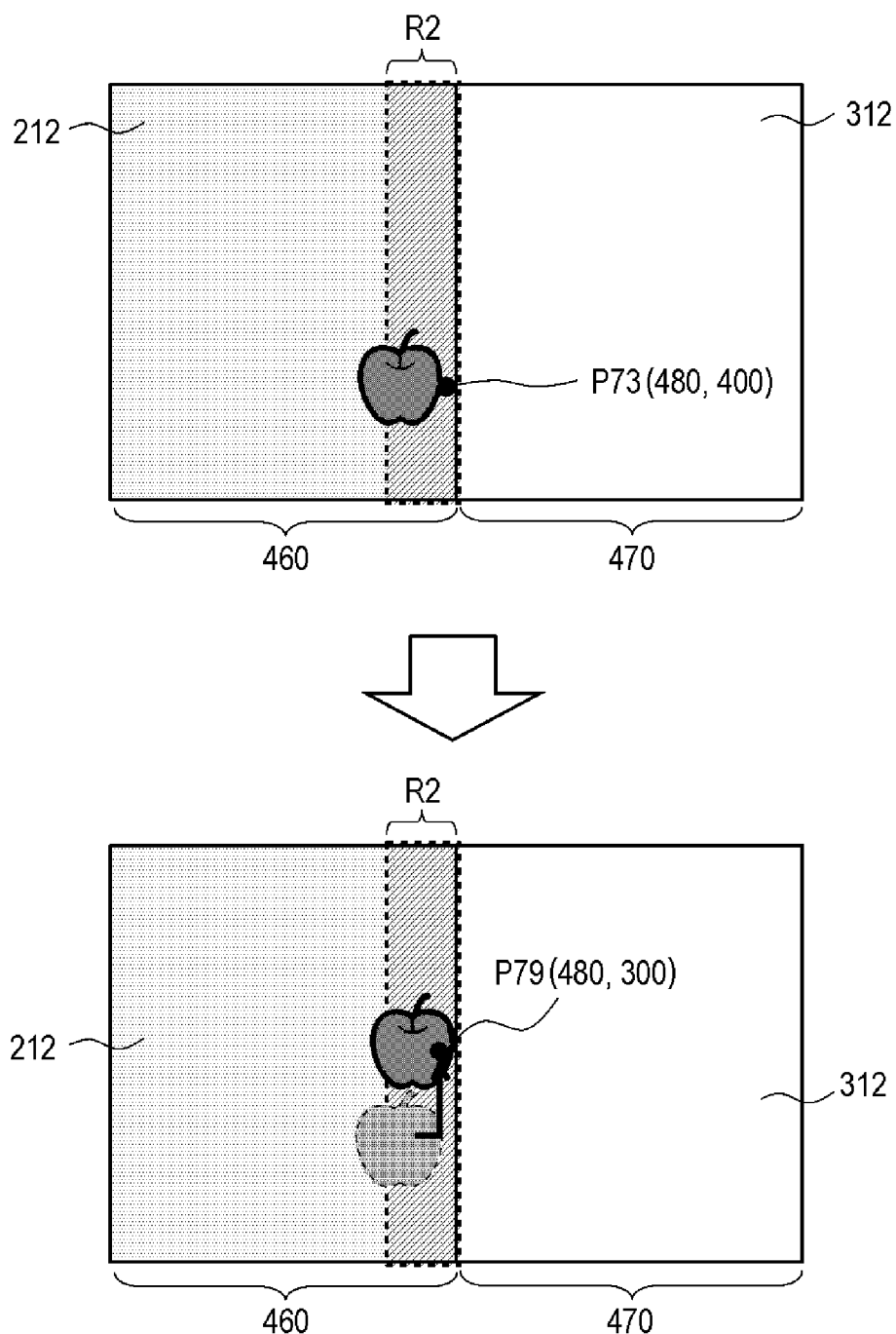
FIG. 37 is a view illustrating a state in which a direction of the operation finger is suddenly changed from rightward to upward.

Furthermore, an operation other than the swipe-in operation (multi-touch operation, sudden direction changing operation and the like) might also be detected in the period TM2 (steps S78, and S81 to S83). The user may also change from the swipe-in operation to the operation other than the swipe-in operation. For example, as illustrated in FIG. 37, the user may perform a drag operation to suddenly change a moving direction (direction to move) of the finger from rightward to upward in the vicinity of the position P73 and move the finger to a position P79. In this case, the swipe-in operation is canceled, the drag operation is detected at step S78, and the display changing operation corresponding to the drag operation (for example, display changing operation illustrating a state in which an in-screen object (apple-shaped icon in the drawing) is gradually moved from the position P73 to the position P79) is performed at steps S81 to S83. In the example in FIG. 37, it is determined at step S81 that the drag operation is not the operation for the operation screen region 312 (first operation screen region) but the operation for the operation screen region 212 (second operation screen region), and the display changing operation corresponding to the drag operation in the operation screen region 212 is performed at step S83.

In the above-described manner, in a case where the operation screen region 312 is displayed on a part of the touch panel 45, the second detecting operation (swipe-in detecting operation using the second detection region R2 (refer to FIG. 6 and the like) formed by extending and/or moving the first detection region as the swipe-in operation detection region) is executed (step S68) regarding the specific edge not coincident with the physical edge of the touch panel 45 out of a plurality of edges of the operation screen region 312. Therefore, even in a case where the edge of the operation screen region 312 displayed on the touch panel 45 does not coincide with the physical edge of the operation panel, it is possible to detect the swipe-in operation well.

In a case where there are both the possibility that the operation by the operation finger of the user is the swipe-in operation for the operation screen region 312 and the possibility that this is another operation for the operation screen region 212 at step S6, the swipe-in operation for the operation screen region 312 may be detected.

In detail, in a period from when the operation (touch operation) by the operation finger is started from the position P71 (FIG. 31) in the overlapping region of the second detection region R2 for the operation screen region 312 and the operation screen region 212 and while the touch operation continues (while the pressing state continues), until the detection of the swipe-in operation is fixed at step S67, the detecting operation of the swipe-in operation for the operation screen region 312 (steps S66, S71, and S72) may be executed over the detecting operation of another operation for the operation screen region 212 (step S73 and the like). That is, in this period, among the swipe-in operation for the operation screen region 312 and another operation (swipe operation and the like) for the operation screen region 212, the swipe-in operation may be detected.

As a result, no other operation for the operation screen region 212 is detected until it is fixed at step S67 whether the swipe-in operation is detected, and the display changing operation (S73, S81, and S83) according to the other operation for the operation screen region 212 is suspended.

Figure 34:
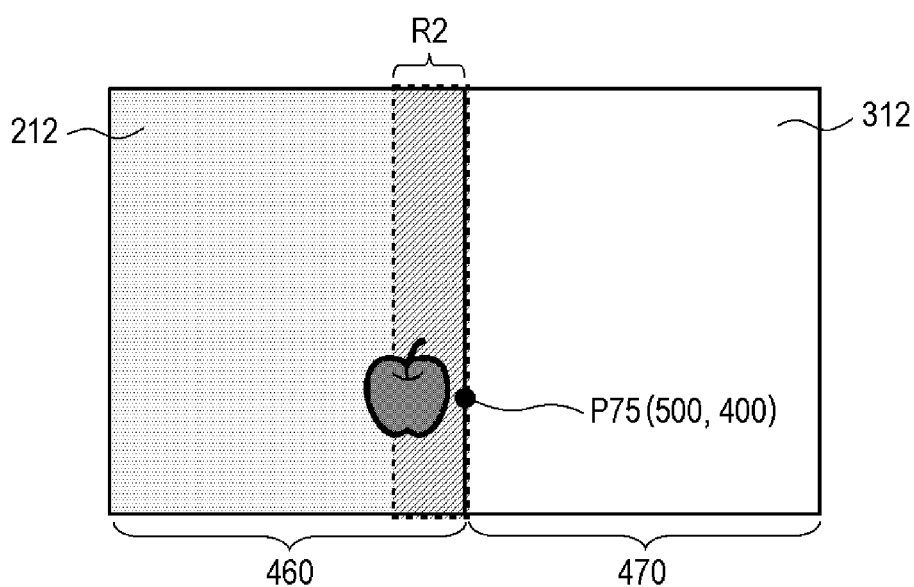
FIG. 34 is a view illustrating a state in which the operation finger reaches a corresponding operation start position.
Figure 35:
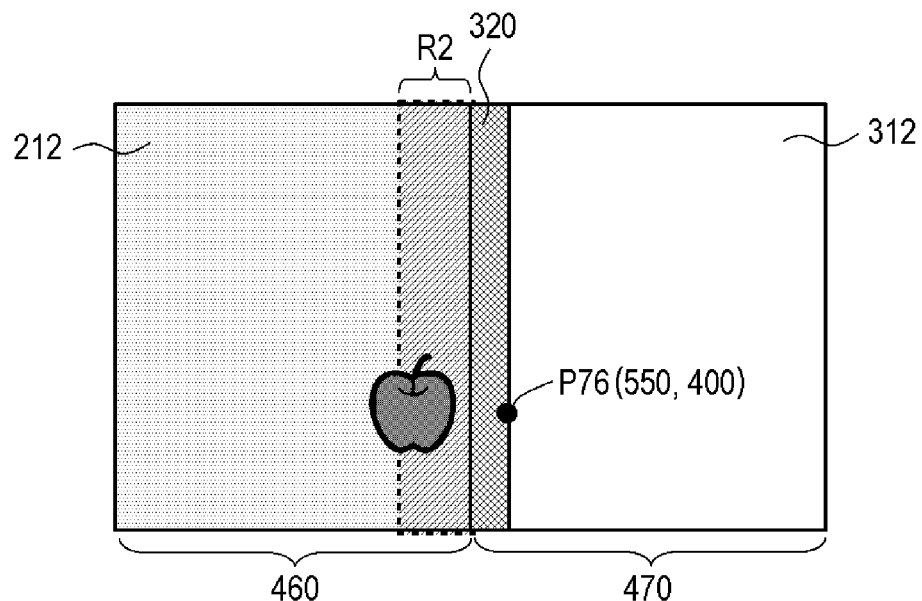
FIG. 35 is a view illustrating a state in which the operation finger further moves rightward from the corresponding operation start position.
Figure 36:
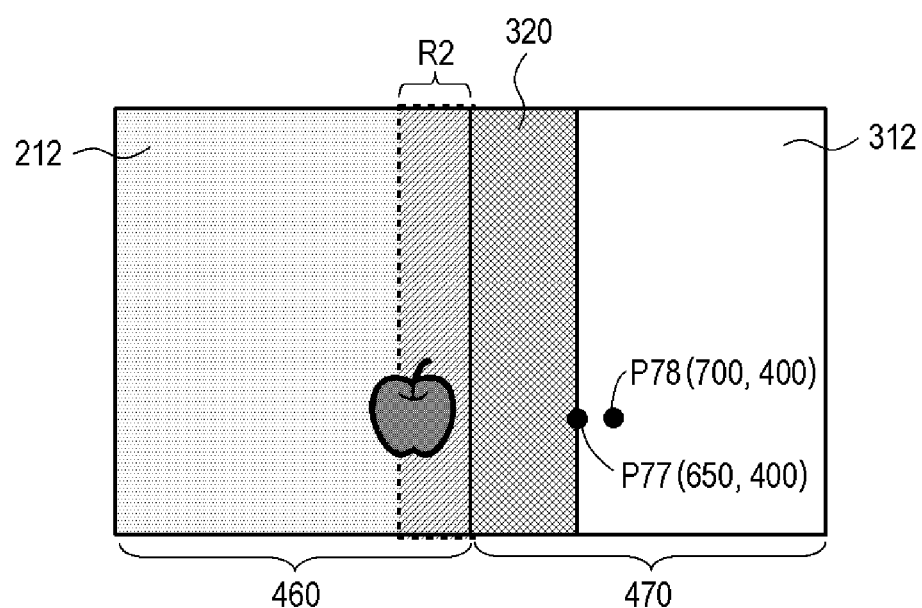
FIG. 36 is a view illustrating a state in which the operation finger further moves rightward.

Furthermore, after the swipe-in operation is detected (step S68), in a case where another operation and the like for the operation screen region 212 is not detected (at step S78) and the swipe-in operation for the operation screen region 312 reaches the corresponding operation start position P2 (crosses the boundary) (YES at step S74), a display changing process operation (step S76) according to the swipe-in operation is executed (refer to FIGS. 34 to 36).

On the other hand, in the period TM2 from the time point when the swipe-in operation is detected (step S68) to a predetermined time point (in detail, time point when the swipe-in operation reaches the corresponding operation start position P2), when another operation (predetermined operation for the operation screen region 212) is detected at step S78, the swipe-in operation is canceled and the display changing operation (step S76) according to the swipe-in operation is not executed. Then, the procedure shifts from step S78 to step S81 and the display changing operation (step S83 and the like) according to the predetermined operation (for example, drag operation accompanied by direction change (swipe operation) and the like) is executed (refer to FIG. 37).

<1-7. Regarding Step S69>

Also, at step S69, the display operation (swipe-in possibility notifying operation) for notifying the user that the display changing operation according to the swipe-in operation (swipe-in object drawing display operation and the like) may be performed may be executed.

Figure 30:
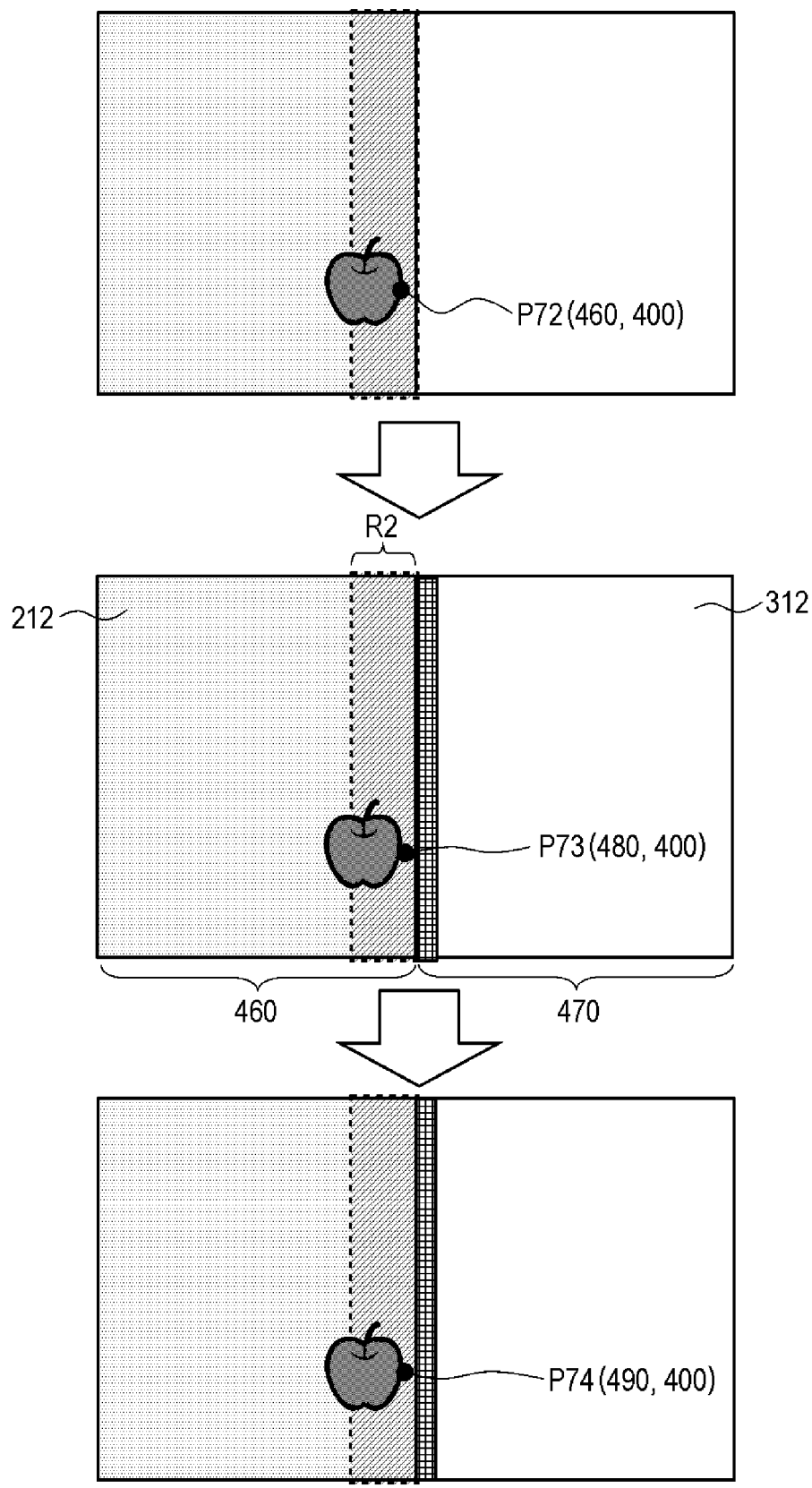
FIG. 30 is a view illustrating swipe-in possibility notification.

Specifically, as illustrated in a middle part and a lowermost part in FIG. 30, the "swipe-in possibility notification" is executed by displaying a part of the swipe-in object 320 (refer also to FIG. 36) which should be displayed in accordance with the swipe-in operation (partial rectangular region on a right end side of the swipe-in object 320). The "swipe-in possibility notification" is notification notifying that the display changing operation according to the swipe-in operation (drawing display operation of the swipe-in object 320 as illustrated in FIG. 36 (display operation in which the swipe-in object is gradually drawn from the screen end to the inner side of the screen to be displayed) and the like may be performed.

In further detail, for example, it is only required that only a portion of a predetermined width (width of approximately several %) on the right end side of the swipe-in object 320 (vertically and horizontally hatched portion) is displayed on the left end side of the operation screen region 312 as "swipe-in possibility notification". It is only required that the "swipe-in possibility notification" is displayed from immediately after the time point when the swipe-in operation is detected in the position P72 (step S68) to the time point when the operation finger of the swipe-in operation reaches the corresponding operation start position P2 (time point when the swipe-in operation crosses the boundary between the operation screen region 212 and the operation screen region 312 (YES at step S74). For example, when the finger exists at positions P73 and P74, the "swipe-in possibility notification" may be displayed. According to this, the user is notified that the "display changing operation according to swipe-in operation" may be performed by further moving the finger to the right. Note that the operation at step S69 need not be performed.

In the above-described embodiments, the detecting operation of the swipe-in operation for the operation screen region 312 (steps S66, S71, and S72) may be executed until it is fixed at step S67 (FIG. 25) whether the swipe-in operation is detected in a case where the touch operation by the user is started from the overlapping region (hatched portion in FIG. 31) of the second detection region R2 for the operation screen region 312 and the operation screen region 212 (refer to FIG. 31 and the like).

Figure 38:
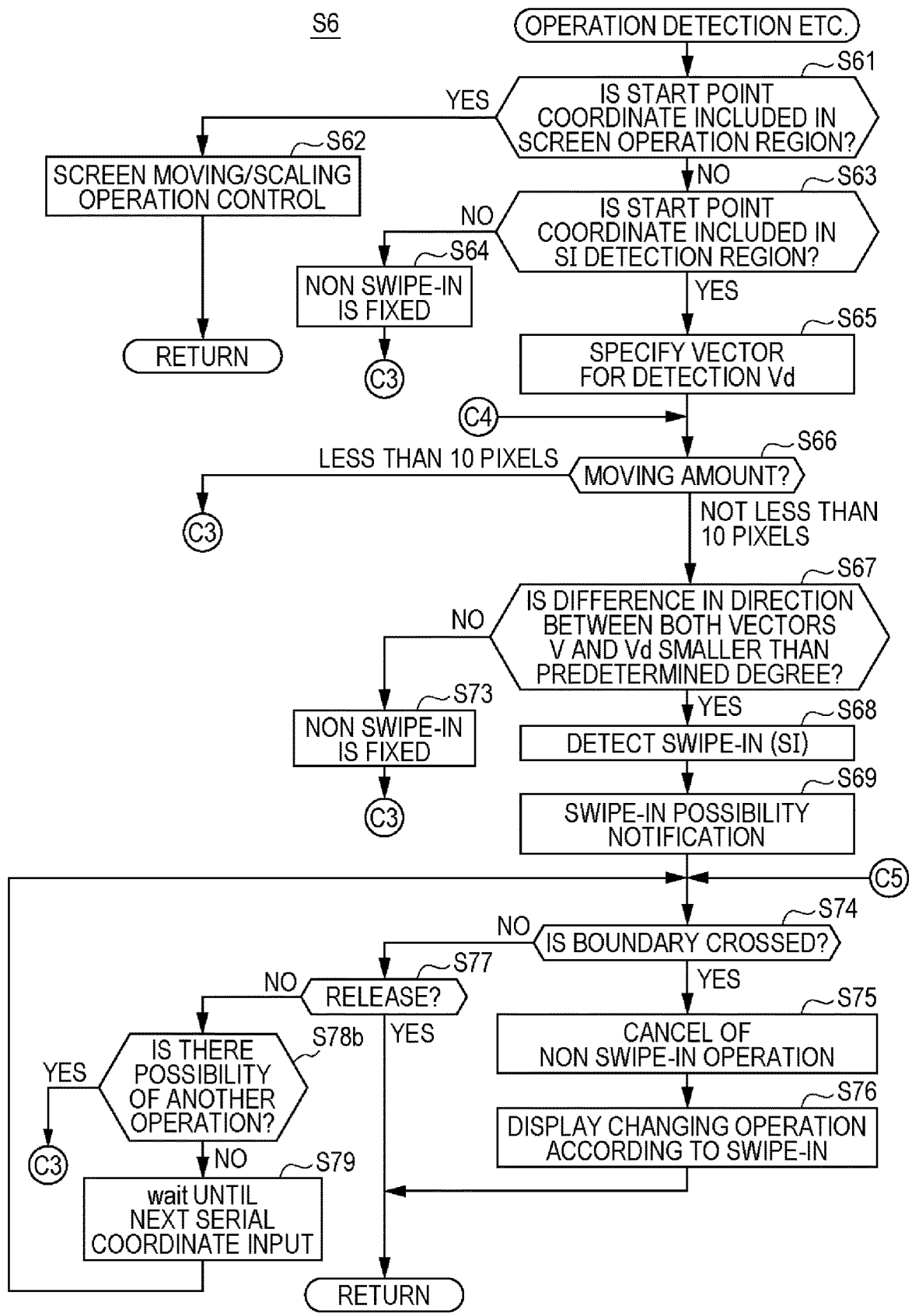
FIG. 38 is a flowchart illustrating a part of an operation according to one or more embodiments.
Figure 39:
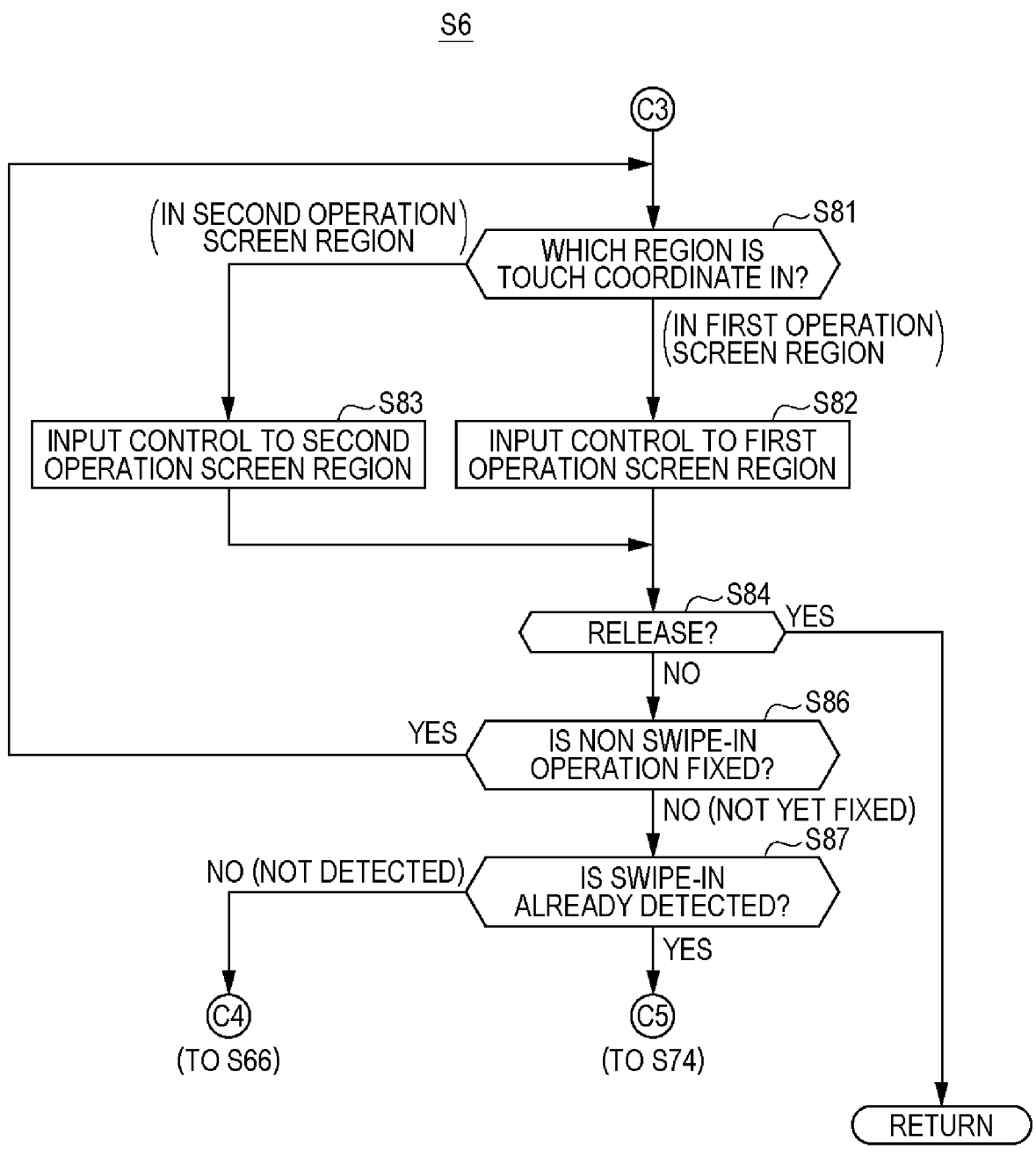
FIG. 39 is a flowchart illustrating a part of the operation according to one or more embodiments.

On the other hand, in one or more embodiments, in a case where a touch operation is started from an overlapping region, a detecting operation of a swipe-in operation for an operation screen region 312 and a detecting operation of another operation for an operation screen region 212 are executed in parallel before it is fixed at step S67 whether the swipe-in operation is detected (refer to FIGS. 38 and 39). Specifically, after the detecting operation of the swipe-in operation is started at step S66 (FIG. 38), the procedure shifts to step S81 (FIG. 39) and subsequent steps, and the detecting operation of another operation is executed. Also, after the swipe-in operation is detected at step S68 (FIG. 38), the detecting operation of another operation is executed at step S78b (S81 or the like).

Figure 41:
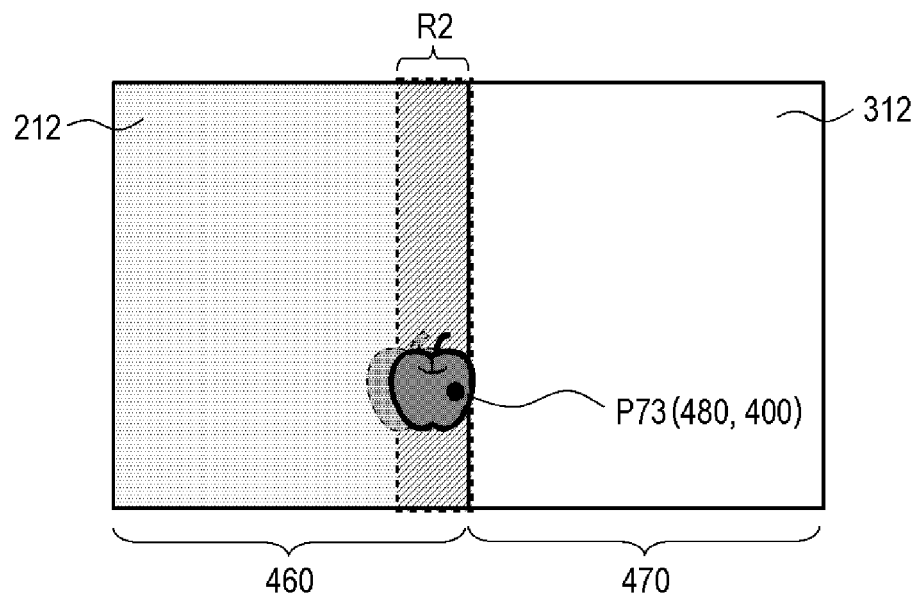
FIG. 41 is a view illustrating a state in which the operation finger further moves rightward.

Then, in a case where the other operation is detected, even if the swipe-in operation for the operation screen region 312 is detected, a display changing operation according to the other operation is started (executed) at step S83 and the like (refer to FIGS. 40 and 41). However, when the swipe-in operation for the operation screen region 312 reaches a corresponding operation start position P2 (position P75 (refer to FIG. 42)) thereafter, the display changing operation according to the other operation is canceled (returned to a display state before display change (step S75), and a display changing operation (step S76) according to the swipe-in operation is started (executed) (refer to FIG. 43).

In other words, in a case where it is determined that a certain operation is one of two types of operations (swipe-in operation and another operation), at an initial stage, the display changing operation corresponding to the other operation (changing operation of displayed contents) may be executed. Thereafter, when the swipe-in operation progresses to a certain degree, the display changing operation corresponding to the other operation is canceled (reset), and the display changing operation (changing operation of displayed contents) corresponding to the swipe-in operation is executed.

Hereinafter, such a mode is described with reference mainly to FIGS. 38, 39 and the like. Note that, FIGS. 38 and 39 are flowcharts illustrating an operation according to one or more embodiments (step S6). Also, FIGS. 40 to 43 are views illustrating transition of a screen display according to one or more embodiments. In one or more embodiments, instead of the operations in FIGS. 25 and 26, operations in FIGS. 38 and 39 are executed.

Steps S61 to S64 are similar to those in the above-described embodiments.

Steps S65 to S69 (detecting operation of the swipe-in operation) are also similar to those in the above-described embodiments.

However, when it is determined at step S66 that magnitude of a movement vector V of a user operation is smaller than a predetermined value (for example, corresponding to 10 pixels), the operation in FIG. 39 is executed. Specifically, the detecting operation of another operation for the operation screen region 212 and the display changing operation (steps S81, S83 and the like) according to the other operation are executed. In other words, in parallel with the detecting operation of the swipe-in operation (detecting operation using a second detection region R2 for the operation screen region 312), the detecting operation of the other operation (specific operation for the operation screen region 212) is executed, and when the other operation is detected, the display changing process according to the other operation is also executed.

Also, unlike the above-described embodiments, the operation in FIG. 39 is not necessarily the operation when non-swipe-in operation is fixed. Also, the process in FIG. 39 may be executed before and after detection of the swipe-in operation.

After steps S81 to S84 in FIG. 39, a determining process at steps S86 and S87 may be further executed. Specifically, when it is determined at step S84 that release (of the finger) is executed, step S6 ends. On the other hand, when it is determined at step S84 that the release is not yet executed, the procedure shifts to step S86.

In the determining process at step S86 (refer to FIG. 39), it is determined whether there still are both a possibility of the swipe-in operation for the operation screen region 312 and a possibility of another operation for the operation screen region 212. Specifically, in a case where the swipe-in operation is not yet detected at step S68 and the non-swipe-in operation is not yet fixed at step S73 (S82, and S83), it is determined that both the possibilities still exist and the procedure shifts from step S86 to step S87. On the other hand, in a case where the swipe-in operation is detected at step S68 or in a case where the non-swipe-in operation is fixed at step S73 (S82, and S83), the procedure returns to step S81 to execute the fixed operation, and the process at step S82 or step S83 is executed.

At step S87 (FIG. 39), it is determined whether the swipe-in operation is already detected at step S68 (FIG. 38). When it is determined at step S87 that the swipe-in operation is not yet detected at step S68, the procedure returns from step S87 to step S66. On the other hand, when it is determined that the swipe-in operation is already detected at step S68, the procedure returns from step S87 to step S74.

Also, at steps S74, S77, S78 (S78b), and S79, the operation similar to that in the above-described embodiments is performed. However, in a case where it is determined at step S78b that there is a possibility of another operation, the procedure shifts from step S78b to step S81, and the operations at step S81 and subsequent steps (refer to FIG. 39) are executed. In this case, when the non-swipe-in operation is not yet fixed at steps S82 and S83, the procedure (basically) returns from step S87 to step S74.

As described above, after detecting the swipe-in operation (step S68), until the fact that the operation by the finger of the user crosses a boundary is determined at step S74, the display changing operation corresponding to the other operation is executed (over the display changing operation according to the swipe-in operation) (refer to FIG. 40 and FIG. 41). In other words, when a specific operation (another operation such as a drag operation) for the operation screen region 212 is detected, the display changing operation according to the specific operation is executed even before it is fixed whether the swipe-in operation for the operation screen region 312 is detected. In FIG. 40, a state in which a drag operation of an icon is detected and a display change according to the drag operation is performed before the swipe-in operation for the operation screen region 312 is detected is illustrated. In FIG. 41, a state in which the display change according to the drag operation is continuously performed after the swipe-in operation for the operation screen region 312 is detected (and before the operation finger reaches the corresponding operation start position P2).

Figure 42:
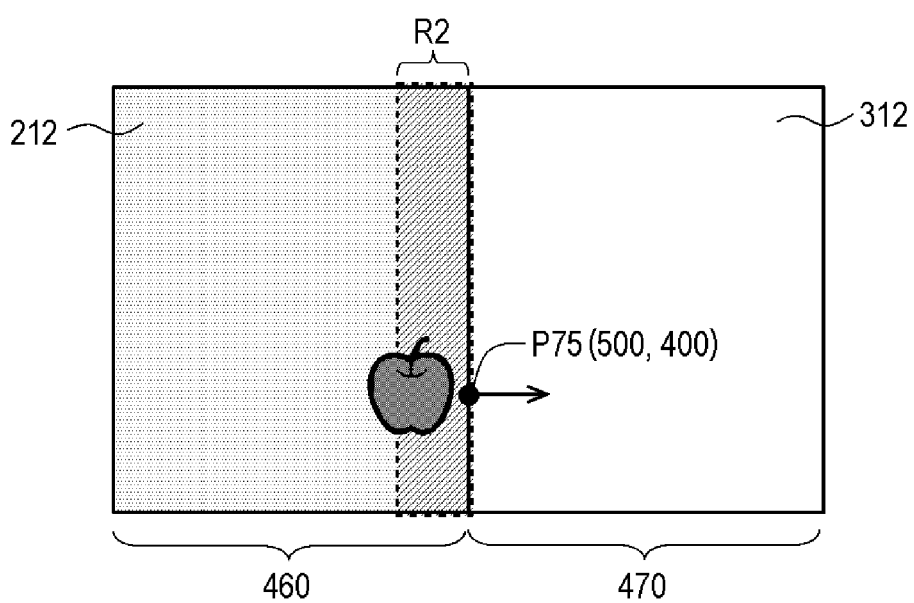
FIG. 42 is a view illustrating a state in which the operation finger further moves rightward.
Figure 43:
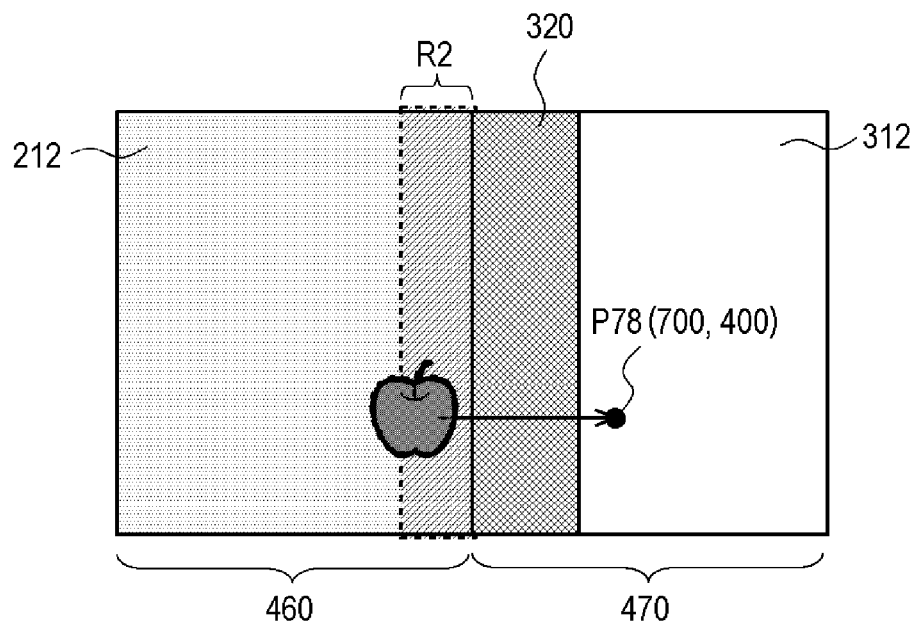
FIG. 43 is a view illustrating a state in which the operation finger further moves rightward.

Thereafter, when the operation by the finger of the user crosses the boundary (refer to FIGS. 42 and 43), it is fixed that the display changing operation according to the swipe-in operation should be executed, and the procedure shifts from step S74 to steps S75 and S76. At step S75, the specific operation for the operation screen region 212 is canceled, and the display changing operation according to the specific operation is also canceled (reset). For example, in a case where it is determined that the user operation is the drag operation of the icon and a moving operation of the icon is executed according to the drag operation (refer to FIGS. 40 and 41), when the user operation reaches a position P75, the icon is returned to its original position as illustrated in FIG. 42. Then, at step S76, the display changing operation (swipe-in corresponding operation) corresponding to the swipe-in operation is executed. For example, when the user operation moves from the position P75 to a position P78, an operation in which a swipe-in object 320 is gradually drawn is executed accordingly (refer to FIG. 43).

As described above, even if the swipe-in operation for the operation screen region 312 is detected, the display changing operation according to the swipe-in operation is not started until the operation finger reaches the corresponding operation start position P2. On the other hand, when the specific operation (drag operation and the like) for the operation screen region 212 is detected, the display changing operation according to the specific operation is immediately started. When the operation finger of the swipe-in operation reaches the start point P2 after the swipe-in operation for the operation screen region 312 is detected and after the specific operation for the operation screen region 212 is detected, the display changing operation according to the specific operation is canceled (step S75) (returned to the display state before display change), and the operation according to the swipe-in operation is executed (step S76).

<3. Variation and the Like>

Although the embodiments of the present invention are described above, the present invention is not limited to the above-described contents.

For example, in each of the above-described embodiments, in a case where there is the overlapping region of the second detection region R2 for the operation screen region 312 and another operation screen region 212, when the touch operation by the user is started from the overlapping region, the determining process and the like is performed in consideration of both the possibility that the touch operation is the swipe-in operation for the operation screen region 312 and the possibility that this is another operation for the operation screen region 212 (refer to FIGS. 25 to 26, and FIGS. 38 to 39).

However, the present invention is not limited thereto. Specifically, in a case where there are both the possibility that the touch operation is the swipe-in operation and the possibility that this is another operation are present, it is possible that only a detecting operation of the swipe-in operation is always performed.

Figure 44:
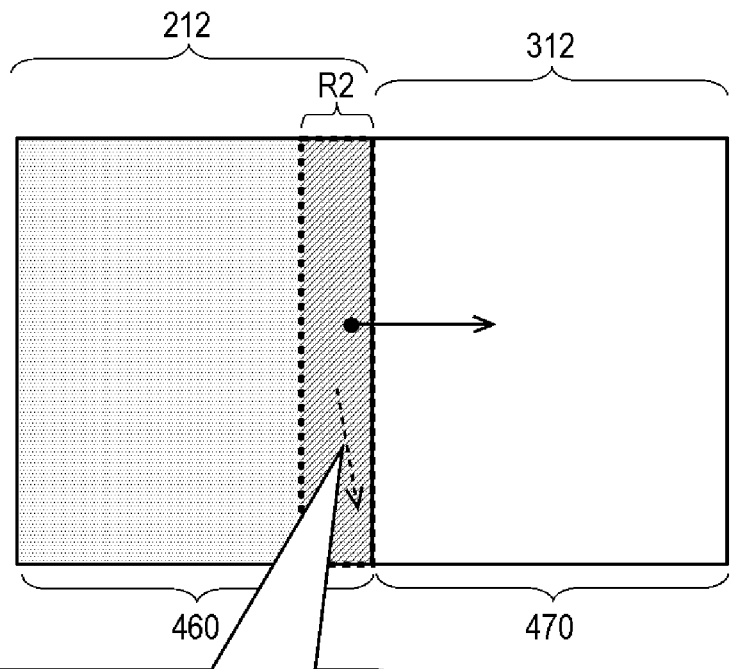
FIG. 44 is a view illustrating a variation.

More specifically, as illustrated in FIG. 44, in a case where the second detection region R2 and the operation screen region 212 overlap with each other, the second detection region R2 for the operation screen region 312 may be formed as a region in which the operation (touch operation) for the operation screen region 212 is not accepted. Then, when the touch operation is detected in the second detection region R2, it is possible that only the detecting operation of the swipe-in operation for the operation screen region 312 is performed (and the detecting operation of another operation is not performed). According to this, in a case where the user operation is started from the overlapping region of the second detection region R2 for the operation screen region 312 and another operation screen region 212, it is only determined whether the user operation is the swipe-in operation for the second detection region R2 for the screen region 312. It is not necessary to perform the detecting operation of another operation for the operation screen region 212, so that the operation may be simplified.

Especially, also in a case where the operation screen region 212 and the operation screen region 312 do not overlap with each other (refer to FIG. 44), the second detection region R2 for the operation screen region 312 may be formed as the region in which the operation (touch operation) for another operation screen region 212 is not accepted.

In each of the above-described embodiments, the mode in which various operations are executed by a CPU (CPU incorporated in a system (MFP 10) provided with the operation panel unit 40) in the controller 9 of the MFP 10 is illustrated, but the present invention is not limited thereto, and a CPU may be separately provided in the operation panel unit 40, and the various operations described above may be executed by the CPU in the operation panel unit 40.

Alternatively, an MFP (also referred to as a server built-in type MFP or a server integral type MFP) incorporating not only an image forming device (device provided with an image forming mechanism (printing output unit 3) and the like) but also a server computer (also referred to as a server device)) may execute the operation similar to that in the above-described embodiments. For example, when two devices (image forming device and server device) in the server built-in type MFP share the operation panel, the entire display region of the operation panel is divided (divided into two), and the display screen for the image forming device and the display screen for the server device are separately displayed in one divided region and the other divided region, respectively, the operation similar to that in each of the above-described embodiments may be executed. In this case, the above-described various operations may be executed by the CPU provided in the shared operation panel unit. Alternatively, each CPU of a plurality of devices (image forming device and server device) may realize the above-described various operations. Alternatively, a plurality of CPUs (the CPU of the image forming device and the CPU of the server device) provided in a plurality of devices may cooperate to realize the above-described various operations.

Also, the display device is not limited to the MFP, and may be various other display devices (for example, a tablet terminal and the like).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A display device comprising:
an operation panel that displays various types of information and accepts an operation input; and
a hardware processor that:
displays an operation screen region on an operation panel;
detects, using a swipe-in operation detection region in a vicinity of an edge of the operation screen region among a plurality of edges of the operation screen region, a swipe-in operation from the vicinity of the edge to an inner side of the operation screen region while continuing a touching state with the operation panel;
detects the swipe-in operation by selectively executing:
a first detecting operation where a movement of the swipe-in operation to a further inner side of the operation screen region is detected in a first detection region that is a partial region having a predetermined width and is adjacent to the edge of the operation screen region in an inner region of the operation screen region; and
a second detecting operation where a movement of the swipe-in operation in a direction to the inner side of the operation screen region is detected in a second detection region that has a predetermined width and is formed by extending or moving the first detection region; and
executes, when the operation screen region is displayed on a part of the operation panel, the second detecting operation where the second detection region is used as the swipe-in operation detection region with regard to a specific edge, among the plurality of edges, that does not coincide with a physical edge of the operation panel.

2. The display device according to claim 1, wherein the second detection region is a region obtained by extending the first detection region to an outer side of the operation screen region.

3. The display device according to claim 1, wherein the second detection region is a region obtained by extending the first detection region to an outer side and the inner side of the operation screen region.

4. The display device according to claim 1, wherein the second detection region is a region obtained by moving the first detection region to an outer side of the operation screen region.

5. The display device according to claim 1, wherein the second detection region is a region obtained by extending the first detection region to the inner side of the operation screen region.

6. The display device according to claim 1, wherein the second detection region is a region obtained by moving the first detection region to the inner side of the operation screen region.

7. The display device according to claim 1, wherein
the second detection region is a partially extended region obtained by extending the first detection region in a direction perpendicular to a predetermined direction in a partial range of the specific edge, and
the partial range extends in the predetermined direction.

8. The display device according to claim 7, wherein a position or a size of the partial range is changed using a setting changing operation.

9. The display device according to claim 1, wherein, when the operation screen region is displayed on an entirety of the operation panel, the hardware processor further executes the first detecting operation to use the first detection region as the swipe-in operation detection region with regard to the edge of the operation screen and including the specific edge.

10. The display device according to claim 1, wherein, when the operation screen region is displayed on the part of the operation panel, the hardware processor detects the swipe-in operation using the first detection region as the swipe-in operation detection region with regard to an edge of the operation panel coincident with the physical edge of the operation panel.

11. The display device according to claim 1, wherein the hardware processor detects the swipe-in operation when a difference between a direction of a movement vector of the swipe-in operation and a direction of a vector for detection that indicates a direction of the swipe-in operation detected in the second detection region is smaller than a predetermined degree.

12. The display device according to claim 1, wherein
the hardware processor further displays on the operation panel a first operation screen region as the operation screen region and a second operation screen region different from the first operation screen region, and
the second detection region of the first operation screen region is a region where an operation of the second operation screen region is not accepted when the second detection region overlaps with the second operation screen region.

13. The display device according to claim 1, wherein
the hardware processor further displays on the operation panel a first operation screen region as the operation screen region and a second operation screen region different from the first operation screen region,
the second operation screen region overlaps with a part of the first operation screen region and has a display layer higher than a display layer of the first operation screen region, and
the second detection region of the first operation screen region is a region obtained by eliminating a portion of the first operation screen region that overlaps with the second operation screen region.

14. The display device according to claim 1, wherein
the hardware processor further displays on the operation panel a first operation screen region as the operation screen region and a second operation screen region different from the first operation screen region,
the second operation screen region overlaps with a part of the first operation screen region and has a display layer higher than a display layer of the first operation screen region,
the hardware processor further:
detects the swipe-in operation with regard to the second operation screen region using a second detection region of the second operation screen region, and
detects the swipe-in operation with regard to the first operation screen region using the second detection region of the first operation screen region, and
the second detection region of the first operation screen region is a region obtained by eliminating a portion of the first operation screen region that overlaps with the second operation screen region and a portion of the first operation screen region that overlaps with the second detection region of the second operation screen region.

15. The display device according to claim 1, wherein, when the second detection region of the operation screen region includes a part of the edge of the operation screen region, the hardware processor further detects a screen moving scaling operation over the swipe-in operation when both are a possibility.

16. The display device according to claim 1, wherein the hardware processor further:
displays on the operation panel a first operation screen region as the operation screen region and a second operation screen region different from the first operation screen region, and
detects the swipe-in operation for the first operation screen region over an operation for the second operation screen region when both are a possibility.

17. The display device according to claim 1, wherein
the hardware processor further displays on the operation panel a first operation screen region as the operation screen region and a second operation screen region different from the first operation screen region,
the second detection region of the first operation screen region overlaps with a part of the second operation screen region, and
the hardware processor further:
detects the swipe-in operation for the first operation screen region over an operation for the second operation screen region when:
a touch operation is started from an overlapping region of the second detection region for the first operation screen region and the second operation screen region, and
while the touch operation continues; and
suspends a display changing operation based on the operation for the second operation screen region until the swipe-in operation is detected.

18. The display device according to claim 17, wherein, when the touch operation is started from the overlapping region of the second detection region for the first operation screen region and the second operation screen region, the hardware processor cancels the swipe-in operation and executes a display changing operation according to a predetermined operation without executing a display changing operation according to the swipe-in operation when the predetermined operation for the second operation screen region is detected in a period from a time point when the swipe-in operation is detected until a time point when the touch operation reaches a corresponding operation start position where the display changing operation based on the swipe-in operation should be started.

19. The display device according to claim 1,
wherein the hardware processor further displays on the operation panel a first operation screen region as the operation screen region and a second operation screen region different from the first operation screen region,
the second detection region of the first operation screen region overlaps with a part of the second operation screen region,
the hardware processor further executes a detecting operation for the second operation screen region in parallel with the detecting operation of the swipe-in operation using the second detection region of the first operation screen region, and
when a movement operation starts from an overlapping region of the second detection region for the first operation screen region and the second operation screen region, the hardware processor:
  does not start a display changing operation based on the swipe-in operation until the movement operation reaches a corresponding operation start position that is a position where the display changing operation based on the swipe-in operation should be started even when the swipe-in operation is detected,
  starts a display changing operation based on a specific operation for the second operation screen region when the specific operation is detected, and
  cancels the display changing operation based on the specific operation and starts the display changing operation based on the swipe-in operation when the movement operation reaches the corresponding operation start position after the swipe-in operation is detected and the specific operation is detected.

20. The display device according to claim 17, wherein the hardware processor further notifies that a display changing operation based on the swipe-in operation is possible by displaying a part of a screen that should be displayed in the display changing operation based on the swipe-in operation from a time point when the swipe-in operation is detected until a time point when the touch operation reaches a corresponding operation start position that is a position where the display changing operation based on the swipe-in operation should be started.

21. The display device according to claim 1, wherein the second detection region is disposed in a visualized state on the operation panel.

22. The display device according to claim 21, wherein the hardware processor further visualizes the second detection region by the operation panel in response to detecting that the specific edge is not coincident with the physical edge of the operation panel when a position or size of the operation screen region on the operation panel is changed.

23. A control method of a display device including an operation panel that displays various types of information and accepts an operation input, the control method comprising:
  a) displaying an operation screen region on the operation panel; and
  b) detecting, using a swipe-in operation detection region in a vicinity of an edge of the operation screen region among a plurality of edges of the operation screen region, a swipe-in operation from the vicinity of the edge to an inner side of the operation screen region while continuing a touching state with the operation panel, wherein
  the control method detects the swipe-in operation by selectively executing:
    a first detecting operation where a movement of the swipe-in operation to a further inner side of the operation screen region is detected in a first detection region that is a partial region having a predetermined width and is adjacent to the edge of the operation screen region in an inner region of the operation screen region, and
    a second detecting operation where a movement of the swipe-in operation in a direction to the inner side of the operation screen region is detected in a second detection region that has a predetermined width and is formed by extending or moving the first detection region, and
  when the operation screen region is displayed on a part of the operation panel, the second detecting operation where the second detection region is used as the swipe-in operation detection region is executed with regard to a specific edge, among the plurality of edges, that does not coincide with a physical edge of the operation panel.

24. The control method according to claim 23, wherein, at b), when the second detection region of the operation screen region includes a part of the edge of the operation screen region, executing a screen moving scaling operation over the swipe-in operation when both are a possibility.

25. The control method according to claim 23, wherein
  at a), a first operation screen region as the operation screen region and a second operation screen region different from the first operation screen region are displayed on the operation panel, and
  at b), executing the swipe-in operation over an operation for the second operation screen region when both are a possibility.

26. The control method according to claim 23, further comprising:
  c) updating display contents on the operation panel based on a processing result at b), wherein
  at a), a first operation screen region as the operation screen region and a second operation screen region different from the first operation screen region are displayed on the operation panel, and the second detection region for the first operation screen region overlaps with a part of the second operation screen region,
  at b), executing a detection of the swipe-in operation over an operation for the second operation screen region when a touch operation is started from an overlapping region of the second detection region for the first operation screen region and the second operation screen region and while the touch operation continues, and
  at c), a display changing operation based on the operation for the second operation screen region is suspended until the swipe-in operation is detected.

27. The control method according to claim 26, wherein, at c), when the touch operation is started from the overlapping region of the second detection region for the first operation screen region and the second operation screen region and when a predetermined operation for the second operation screen region is detected in a period from a time point when the swipe-in operation is detected until a time point when the touch operation reaches a corresponding operation start position where a display changing operation based on the swipe-in operation should be started, the display changing operation based on the swipe-in operation is not executed and a display changing operation based on the predetermined operation is executed.

28. The control method according to claim 23, further comprising
  c) updating display contents on the operation panel based on a processing result at b), wherein
  at a), a first operation screen region as the operation screen region and a second operation screen region different from the first operation screen region are displayed on the operation panel, and the second detection region of the first operation screen region overlaps with a part of the second operation screen region,
  at b), a detecting operation for the second operation screen is further executed in parallel with the detecting operation of the swipe-in operation using the second detection region of the first operation screen region, and where a movement operation starts from an overlapping region of the second detection region for the first operation screen region and the second operation screen region, c) includes:
- c-1) not starting a display changing operation based on the swipe-in operation until the movement operation reaches a corresponding operation start position that is a position where the display changing operation based on the swipe-in operation should be started even when the swipe-in operation is detected at b), and starting a display changing operation based on a specific operation for the second operation screen region when the specific operation is detected at b); and
- c-2) canceling the display changing operation based on the specific operation and starting the display changing operation based on the swipe-in operation when the movement operation reaches the corresponding operation start position after the swipe-in operation is detected and the specific operation is detected.

29. The control method according to claim 26, wherein, at c) notifying that a display changing operation based on the swipe-in operation is possible by displaying a part of a screen that should be displayed in the display changing operation based on the swipe-in operation from a time point when the swipe-in operation is detected until a time point when the touch operation reaches a corresponding operation start position that is a position where the display changing operation based on the swipe-in operation should be started.

30. The control method according to claim 26, wherein
at a), a position or a size of the operation screen region is changed, and
at b), the second detection region is visualized by the operation panel in response to detecting that the specific edge is not coincident with the physical edge of the operation panel when the position or the size of the operation screen region is changed at a).

31. A non-transitory recording medium storing a computer readable program causing a computer incorporated in the display device to perform the control method according to claim 23.

* * * * *